United States Patent [19]
Stein et al.

[11] Patent Number: 5,579,115
[45] Date of Patent: Nov. 26, 1996

[54] SCANNING APPARATUS FOR SCANNING A PARTIALLY SUPPORTED MEDIA

[75] Inventors: Amnon Stein, Ramat Gan; Rafail Bronstein, Kfar Saba, both of Israel

[73] Assignee: Scitex Corporation Ltd., Herzliya, Israel

[21] Appl. No.: 1,469

[22] Filed: Jan. 7, 1993

[30] Foreign Application Priority Data

Jan. 12, 1992 [IL] Israel ....................................... 100635

[51] Int. Cl.⁶ ............................... H04N 1/04; H04N 1/21
[52] U.S. Cl. ................... 358/296; 347/139; 347/262; 347/264; 358/491; 358/492
[58] Field of Search ..................... 355/47, 72, 311, 355/317; 347/139, 262, 264, 116, 233, 241, 243, 244, 256, 257, 258, 260; 359/198, 199, 200, 216, 217, 218, 219; 354/4, 5; 358/489, 490, 491, 492

[56] References Cited

U.S. PATENT DOCUMENTS

| | | | |
|---|---|---|---|
| 4,260,997 | 4/1981 | Fukui | 354/5 |
| 4,440,491 | 4/1984 | Takahama | 358/291 X |
| 4,493,548 | 1/1985 | Ateya | 355/312 |
| 4,606,601 | 8/1986 | Starkweather | 359/198 |
| 4,653,875 | 3/1987 | Hines | 359/487 |
| 4,698,647 | 10/1987 | Gerlach | 347/257 |
| 4,712,896 | 12/1987 | Holthusen | 354/5 |
| 4,733,072 | 3/1988 | Lettington | 359/198 |
| 4,796,961 | 1/1989 | Yamada et al. | 359/218 |
| 4,816,923 | 3/1989 | Saotome | 358/489 |
| 5,184,246 | 2/1993 | Schwartz et al. | 359/216 |
| 5,404,187 | 4/1995 | Sterflinger | 347/263 |

FOREIGN PATENT DOCUMENTS

| | | |
|---|---|---|
| 2326282 | 12/1974 | Germany . |
| 2038502 | 7/1980 | United Kingdom . |
| 2197964 | 6/1988 | United Kingdom . |

OTHER PUBLICATIONS

English Abstract of German Reference 2,326,282.

*Primary Examiner*—Brian W. Brown
*Assistant Examiner*—Randy W. Gibson
*Attorney, Agent, or Firm*—Ladas & Parry

[57] ABSTRACT

A scanning system which includes a medium support unit for supporting a medium in a generally curved orientation by contacting substantially less than the entire surface area of the medium and a scanning unit for scanning the medium.

34 Claims, 56 Drawing Sheets

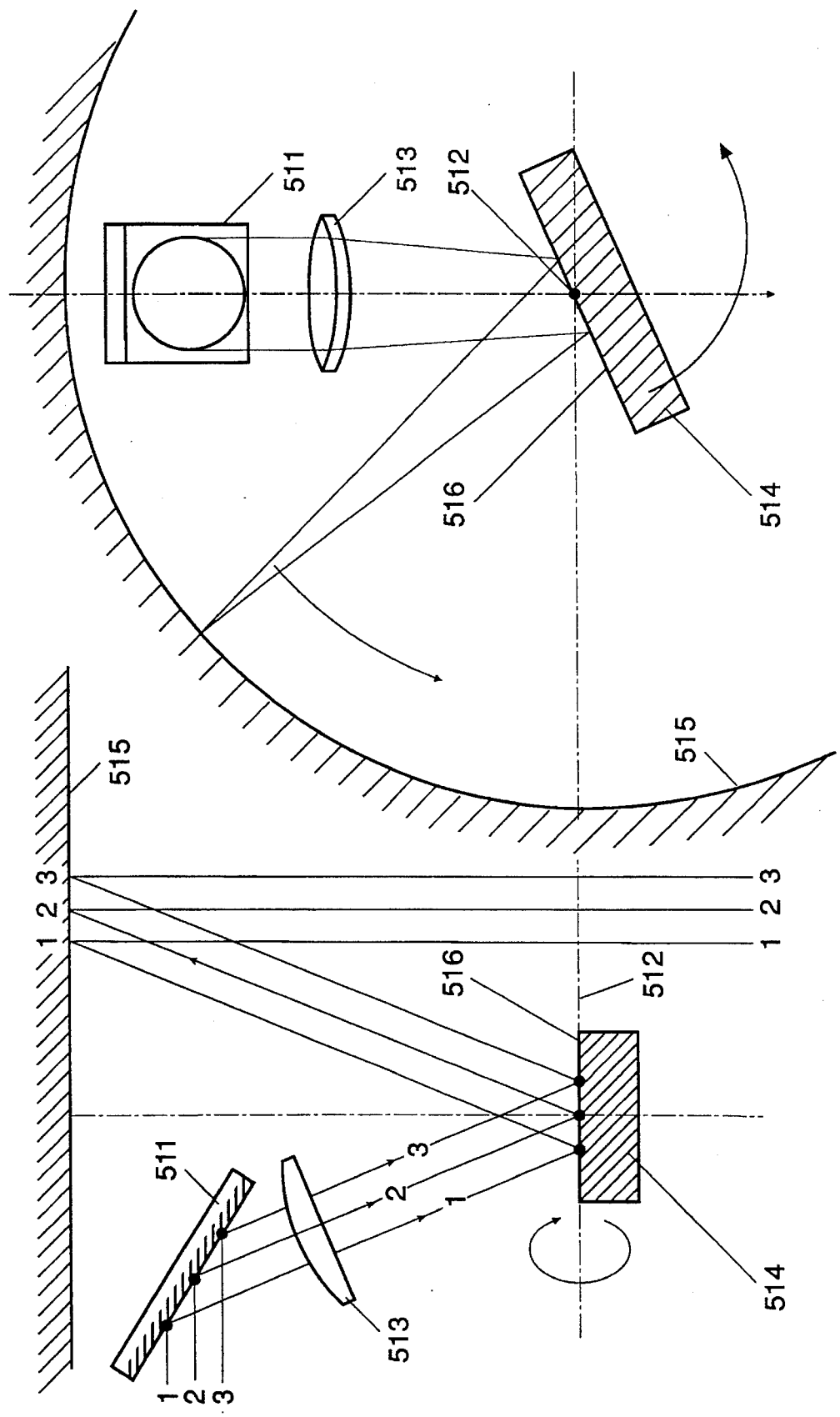

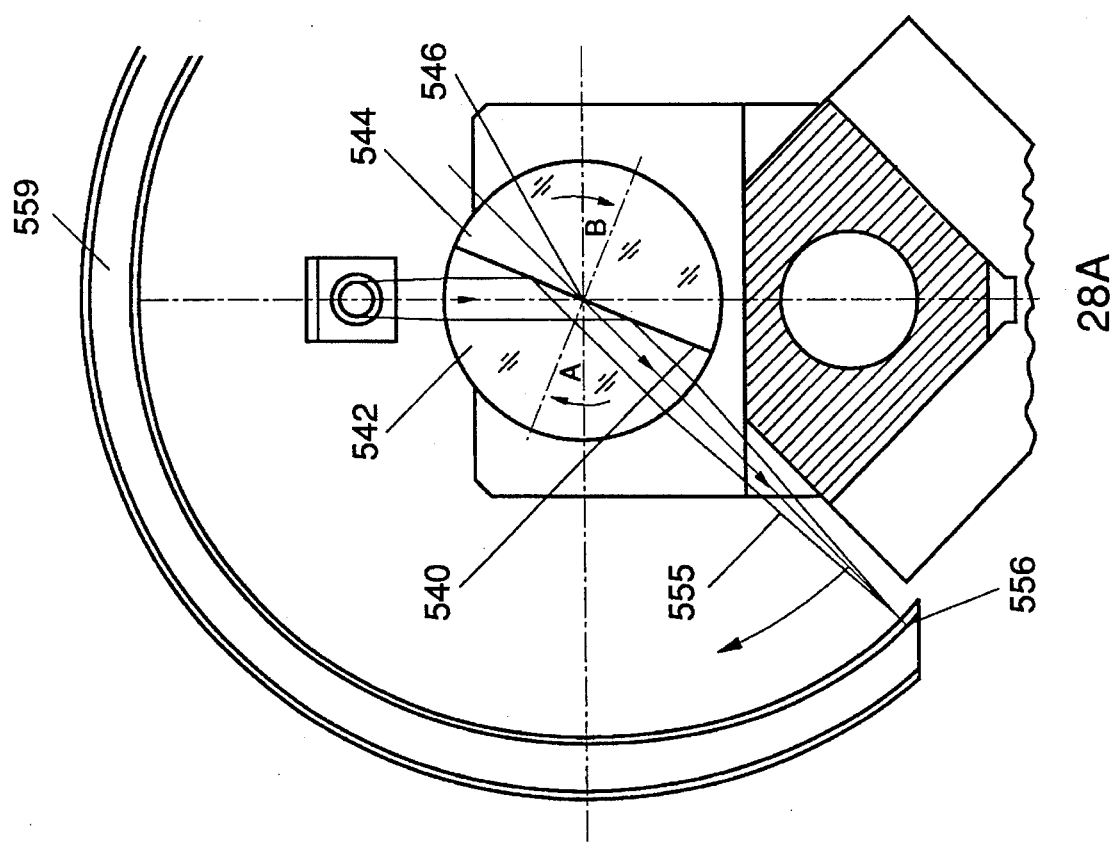
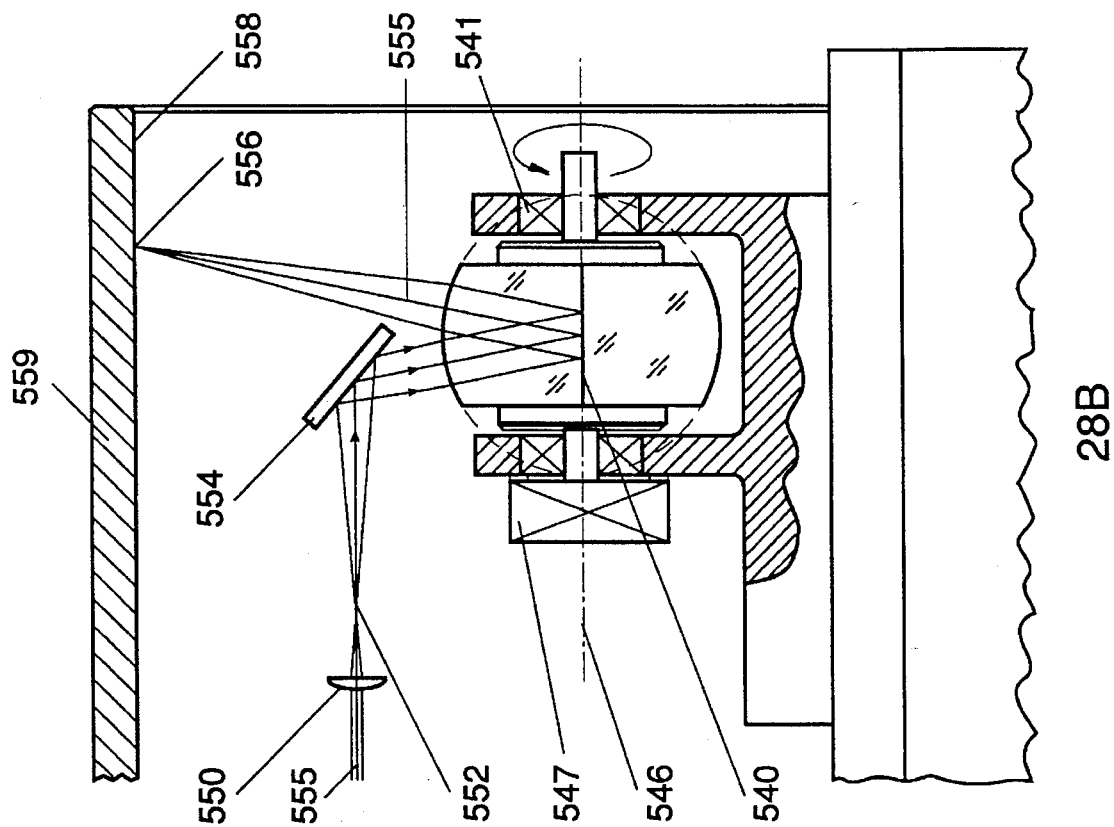

SCANNING APPARATUS FOR SCANNING A PARTIALLY SUPPORTED MEDIA

FIELD OF THE INVENTION

The present invention relates to laser beam scanning apparatus generally and more particularly to laser beam scanning apparatus which is useful in writing apparatus such as a plotter and reading apparatus such as a scanner.

BACKGROUND OF THE INVENTION

Various types of laser beam scanning apparatus are known. In flat bed scanners, a sheet to be scanned, which may be rigid and formed of a material such as glass or metal, or flexible and formed of a material such as film or paper, is arranged in a planar orientation. In drum scanners, the sheet to be scanned is flexible and is arranged in a cylinder.

In state of the art scanners, the flexible object to be scanned is rigidified by a cylindrical member or drum of similar dimensions which is positioned either radially outward (in internal drum scanners) or radially inward (in external drum scanners) of the object to be scanned. In both instances, adjustments must be made for the thickness of the object to be scanned. In external drum scanners, if the area to be scanned is large, the external drum is large and consequently, bringing the drum up to operating speed and subsequently slowing the drum when operation is terminated, are both time-consuming. Also, autoloading of sheets to be scanned is difficult to implement.

U.S. Pat. No. 4,684,228 to Holthusen discloses a transparent cylindrical rigidifying member or drum which supports a sheet on its outer surface, emulsion side inward, such that a spinner may translate along the axis of the drum and scan the sheet. This apparatus enables scanning to take place generally without adjusting for thickness of the sheet. However, the drum must be formed of high quality optical material, which is relatively expensive, so as not to introduce artifacts.

Early patents on internal drum scanners include the following:

A. U.S. Pat. No. 2,394,649 to Young describes a very early internal drum scanner having a 180 degree working area.

B. U.S. Pat. No. 2,253,799, also to Young, describes a facsimile system having a rotating scanner moving longitudinally within a stationary transparent drum. The system includes a directly coupled read/write system.

C. U.S. Pat. No. 3,739,088 to Landsman relates generally to a printing sheet production method and apparatus. The printing sheet is described in detail. The printing sheet production apparatus is described briefly at lines 19–26 of column 5.

D. U.S. Pat. No. 3,816,659 to Landsman describes internal drum scanning apparatus in which the substrate to be scanned is arranged radially inward of a conventional tubelike construction. The scanning mirror is inclined at a 52.5 degree angle, rather than at a 45 degree angle.

In a presentation at the Electro 79 Conference (Apr. 24–26, 1979, New York), published in 1979 in the form of an article in the conference record entitled "Laser platemaking", Robert M. Landsman of Log Etronics, Inc. described an internal drum opto-mechanical scanner which is designed to function both as a reading device and as a writing device. The scanner comprises a single faceted rotating mirror which is air turbine actuated. The Landsman scanner has flat-bed type loading of the substrate (paste-ups to be scanned or sheets to be imaged) in which a carrier resembling a roll top desk cover transforms the configuration of the substrate from planar to cylindrical.

Similar apparatus is described in Landsman, R. M., *A Laser Imaging System for Plate Making and Facsimile*, SPIE, Vol. 223, pp. 2–6. The system described may load a single sheet having a prespecified size such as 17"×24", in which case sheet support discs rotate 180 degrees, or two sheets of the same size, in which case the sheet support discs rotate 360 degrees.

U.S. Pat. No. 4,131,916 to Landsman describes a pneumatically actuated image scanning reader/writer system. As described therein (col. 2, line 46), "(t)he opto-mechanical portion of the system is comprised of three major components, each of generally cylindrical configuration, namely a copy reading station 25, a pneumatically-actuated scanning drive system 10 and an image writing station 28, all of which are assembled in horizontal end-to-end relationship and aligned about a single mechanical and optical axis."

The image writing station is briefly described at lines 45–58 of column 5: "At image writing station 28, the stationary circular end sheets 30, 31 by means of which the edges of a flexible sheet of image receptive material 29 are retained, aligned and supported to form either a partial or complete cylinder, are each provided with a central, circular aperture through which scanning member 14 is free to translate during operation of the apparatus. It would, of course, be possible to automate the loading and unloading of copy sheet 102 and/or image receiving sheet 29, and to provide a capability for simultaneously accommodating more than one such sheet in each station. . . ".

U.S. Pat. No. 4,511,205 to Crane describes a scanning system having a rotatable, axially translatable scanning beam. The patentee states that his scanning system is an improvement of the scanning system described in above-referenced U.S. Pat. No. 4,131,916 and specifically states that his invention "simply provides improved apparatus for translating and rotating the scanning mirrors". The improvement is stated to reside in the provision of a hollow shaft which carries the scanning mirror. Pressurized air is fed into the interior of the shaft and escapes through a turbine which rotates the shaft. The shaft is supported by air bearings from a surrounding housing and the housing is supported by a slide pneumatically supported from a stationary rail. The slide is translated parallel to the axis of the shaft by a lead screw driven by a stepping motor in cooperation with a lead screw nut affixed to the slide.

Polygonal spinners are reviewed in R. J. Sherman, "Polygonal scanners", in *Laser Beam Scanning*, G. F. Marshall (Ed.), Marcel Dekker, N.Y., USA, 1985. State of the art spinners are also described in U.S. Pat. Nos. 4,433,894 to Hanson et al, 4.475,787 to Starkweather and 4,853,709 to Stein et al.

Use of more than one scanning beam for scanning a photosensitive film is known for external drum and flat bed scanners. Methods for generating a plurality of scanning beams and employing them in external drum and flat bed applications are described in the following documents, the disclosures of which are incorporated herein by reference:

Technical Report #384, issued in August, 1978 by Isomet Corporation, P.O.B. 1634, Port Royal Rd., Springfield, Va., USA, and entitled: "Technical report on multibeam laser scanning";

"Applications of multi-beam acousto-modulators in laser-electrophotographic printing and drawing machines", Tokes, S. B., SPIE Proceedings No. 397, 1983;

U.S. Pat. No. 4,577,932 to Gelbart; and Hornbeck, L. J. "Deformable-mirror spatial light modulators", SPIE Critical Reviews Series, Vol. 1150, 1988, pp. 86–102.

Commonly used spinners are also described in the Detailed Description below with reference to FIGS. 23 to 25.

SUMMARY OF THE INVENTION

The present invention seeks to provide scanning apparatus in which a flexible sheet substrate to be scanned is provided. The flexible sheet preferably is rigid enough to independently maintain a configuration of the curved surface of a cylinder even when no supporting surface is provided along a significant portion of the sheet, either radially outward of the sheet or radially inward thereof. Preferably, the portion of the sheet which is not supported includes a writing area or an area to be scanned.

The present invention also seeks to provide scanning apparatus in which compensation need not be made for the thickness of the sheet.

The present invention additionally seeks to provide a spinner which allows a plurality of locations of the sheet to be exposed simultaneously, thereby providing a relatively low rotational velocity.

The present invention further seeks to provide a spinner suitable for use in conjunction with scanning apparatus, such as internal drum scanners, in which the sheet to be scanned is arranged in a cylindrical configuration or in a configuration defining a segment or azimuthal portion of a cylinder, the spinner being characterized in that it is capable of deflecting a plurality of beams having substantially constant relative locations for simultaneously scanning a corresponding plurality of locations on the sheet to be scanned.

The present invention also seeks to provide a scanning device comprising a spinner whose scanning efficiency (duty cycle) is large compared to state of the art spinners.

Engineering design of such a spinner, including selection of facet width, facet to facet angle tolerance, optical surface quality and other parameters may be determined in accordance with known principles of the art, as described in the following documents:

R. J. Sherman, "Polygonal scanners", in *Laser Beam Scanning*, G. F. Marshall (Ed.), Marcel Dekker, N.Y., USA, 1985;

P. Emmel, "System design considerations for laser scanning", SPIE, Vol. 222, Laser Scanning and Recording for Advanced Image and Data Handling, 1980; and Marshall, G. F. "Scanning Devices and Systems", Chapter 6, *Applied Optics and Optical Engineering,* Kingslake, R. and Thompson, B. J., (Eds.), Academic Press, New York, 1980.

The disclosures of all the above documents are incorporated herein by reference.

The present invention also preferably provides a method for automatic loading of sheet material from a sheet canister onto scanning apparatus and for automatic unloading of the sheet material from the scanning apparatus, characterized in that a plurality of registration pins are provided along a curved dimension of the sheet material.

According to a preferred embodiment of the invention, registration pins may also be provided along the dimension of the sheet material arranged parallel to the scanning axis.

Preferably, the scanning apparatus takes into account the dimensions of the sheet to be scanned and automatic loading and unloading apparatus is provided which is operative to automatically adjust loading and unloading parameters in order to take into account the dimensions of the sheet to be scanned.

The present invention also seeks to provide a method and apparatus for automatic positioning of a sheet in a curved orientation.

The present invention further seeks to provide a method and apparatus for automatic adjustment of a scanning device to accommodate a variety of lengths of an axial dimension of a sheet to be scanned.

BRIEF DESCRIPTION OF THE DRAWINGS

The present invention will be understood and appreciated from the following detailed description, taken in conjunction with the drawings in which:

FIGS. 26A and 26B illustrate two orientations of a spinner constructed and operative in accordance with one embodiment of the present invention which may be employed to deflect a plurality of scanning beams;

FIG. 28A is a cross sectional, schematic, illustration of a high duty cycle spinner constructed and operative in accordance with a third and preferred embodiment of the present invention, wherein the cross sectional plane is taken perpendicular to the axis of rotation of the spinner;

FIG. 28B is a cross sectional, schematic, illustration of scanning apparatus including the spinner of FIG. 28A, wherein the cross sectional plane includes the axis of rotation of the spinner;

DETAILED DESCRIPTION OF A PREFERRED EMBODIMENT

The following terms in the present specification are intended to be interpreted as follows:

Medium: A sheet of material having a radiation sensitive coating on at least one surface thereof or being otherwise capable of representing information, such as, but not limited to, a conventional offset plate. In the present specification, the term "plate" is sometimes used for convenience instead of the term "medium", however, use of the term "plate" is not intended to be limiting.

Curved dimension, axial dimension: In the embodiments of the invention shown and described herein, the plate to be scanned has a scanning configuration in which the plate is arranged so as to describe some or all of the curved surface of a cylinder. In the embodiment of FIGS. 1–22C, as shown and described below, a support sheet 314 provides and maintains a curved orientation of the plate. Like the plate, support sheet 314 also has a scanning configuration in which it is arranged so as to describe some or all of the curved surface of a cylinder. The scanning configurations of the plate and of support sheet 314 define curved and axial dimensions thereof. The axial dimension is the dimension of the sheet or plate which lies parallel to the axis of the cylinder when the sheet or plate is arranged in its scanning configuration. The dimension of the sheet or plate which is perpendicular to the axial dimension thereof, is termed herein the curved dimension thereof.

Scanning: The process of translating a reading of writing device over the surface of a plate.

Internal drum scanner: An apparatus for scanning in which the configuration of the plate defines a cylinder or a portion of a cylinder. In state of the art internal drum scanners, the plate is generally supported by a physical drum. According to a preferred embodiment of the internal drum scanner shown and described herein, the plate is not supported by a drum or, more generally, substantially less than the entire surface area of the plate is supported.

Disc: A member which need not be planar and whose outer perimeter is generally circular.

Figure 1A:
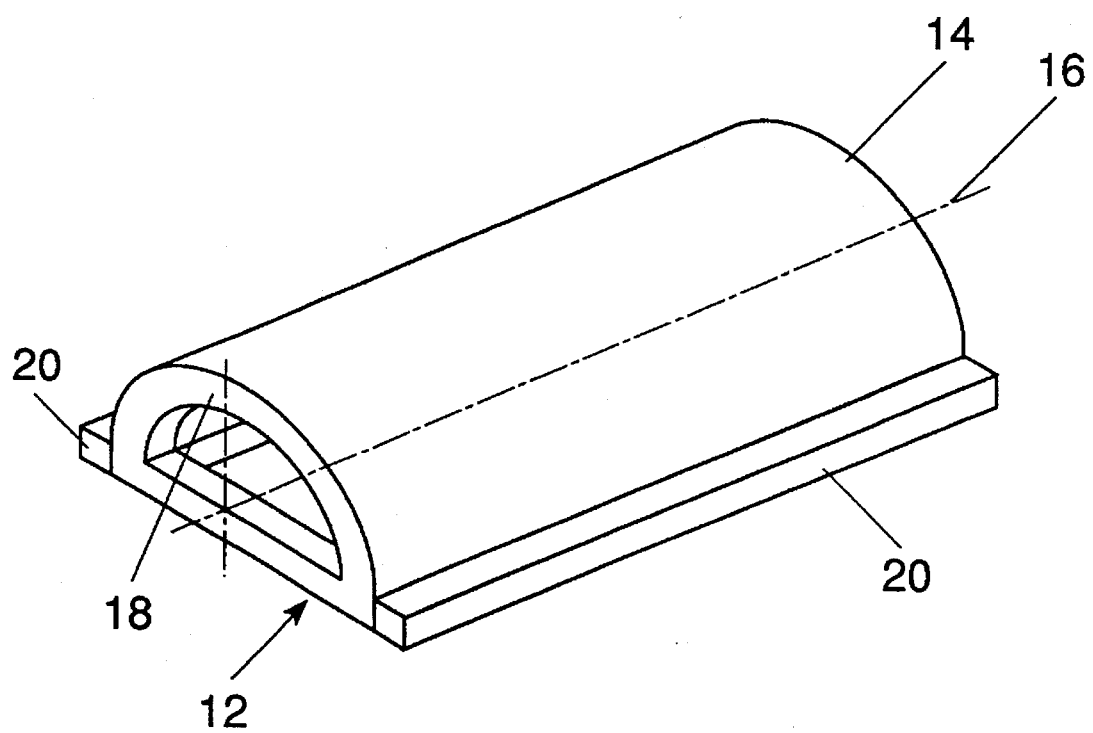
FIG. 1A is a conceptual illustration of apparatus for supporting and maintaining a sheet in a scanning device in which scanning is carried out as in an internal drum scanner, the apparatus being constructed and operative in accordance with a preferred embodiment of the present invention in which substantially less than the entire surface area of the sheet is contacted by sheet support means.
Figure 1B:
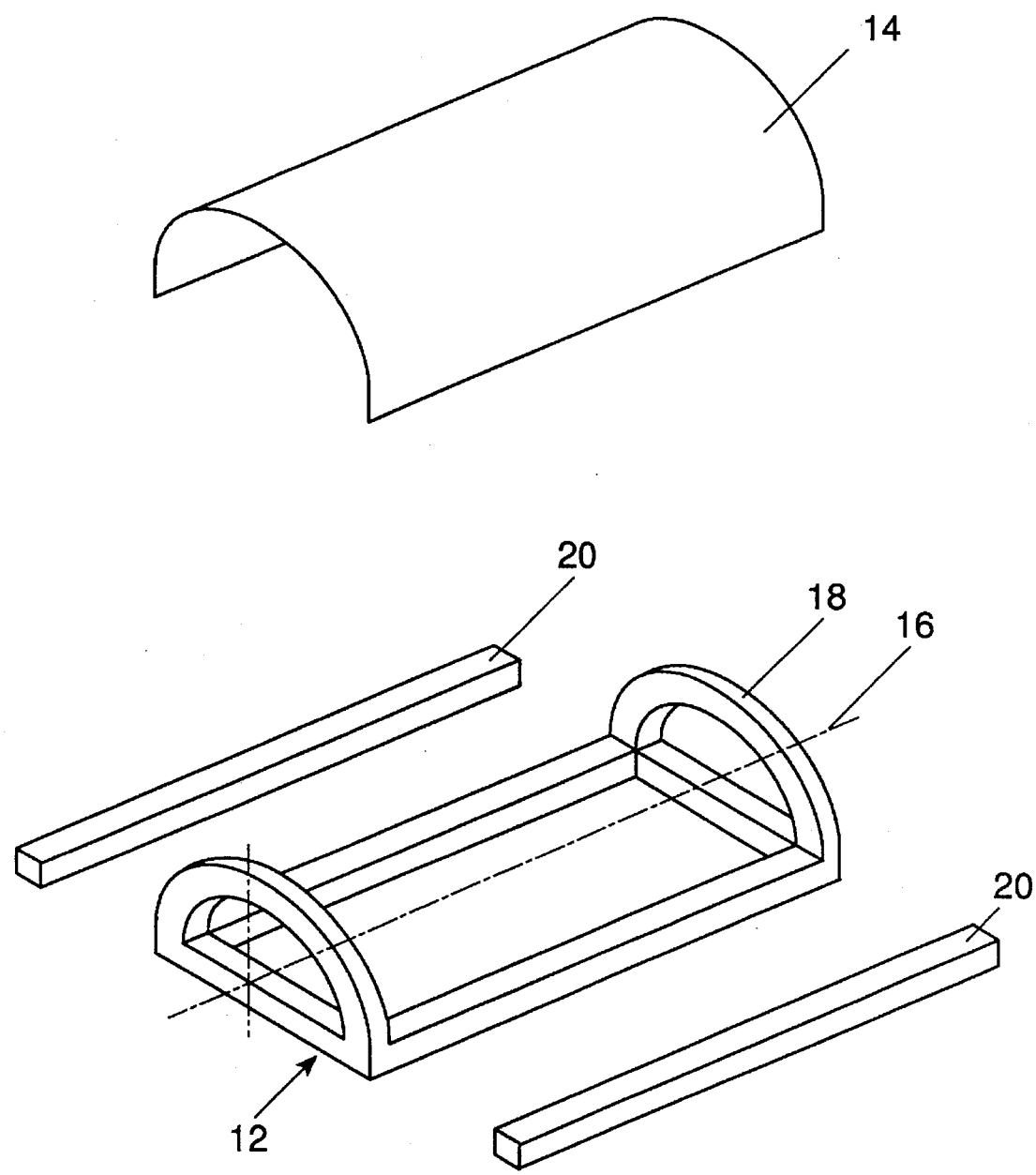
FIG. 1B is an exploded view of the apparatus of FIG. 1A.

Reference is now made to FIGS. 1A–1B which conceptually illustrate plate support apparatus, referenced generally 12, for supporting a plate 14 in a generally cylindrical orientation by contacting substantially less than the entire surface area of the radially inward surface of the plate. Preferably, the radially inward surface of the plate 14 is the radiation sensitive surface thereof. Plate support apparatus 12 is therefore useful in applications in which it is desired to scan plate 14 using a spinner disposed along the axis 16 defined by the cylindrical orientation of the plate 14.

The plate support apparatus 12 comprises plate configuring means 18 for maintaining the plate 14 in a cylindrical orientation or an orientation describing a segment or azimuthal portion of a cylinder and plate securing means 20 for securing the plate 14 to the plate configuring means 18.

A particular feature of plate support apparatus 12 is that it can support plates having a variety of thicknesses such that the distance between the radially inward surface of the plate and the scanning axis 16 is substantially independent of the thickness of the plate. Due to this feature, plates having a wide variety of plate thicknesses may be scanned, without adjusting for variation in plate thickness.

Reference is now made to FIGS. 2–16 which illustrate plate scanning apparatus including plate support apparatus of the type conceptually illustrated in FIG. 1.

Figure 2:
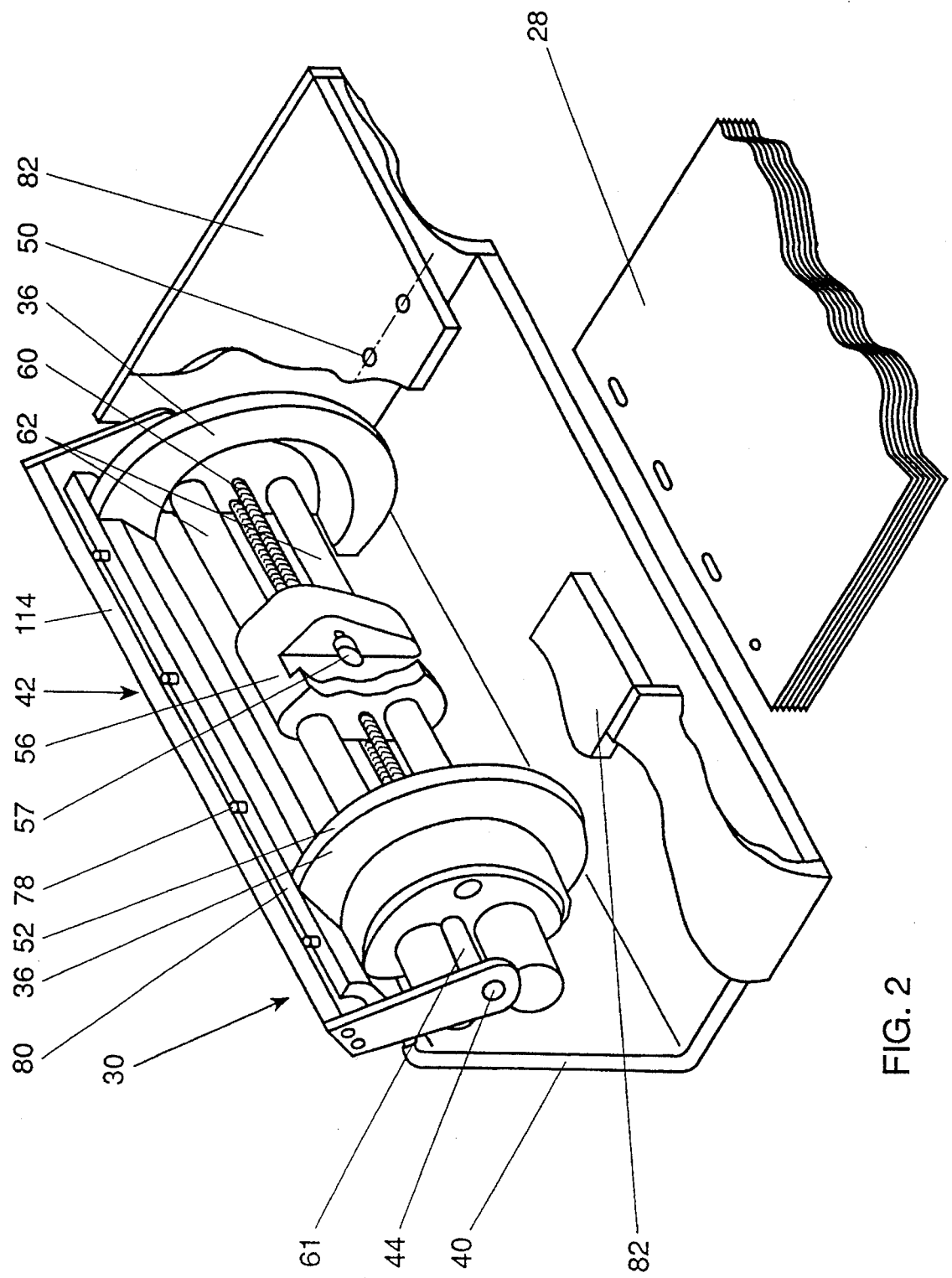
FIG. 2 is a partially cut away, pictorial, illustration of a sheet scanning and automatic sheet loading/unloading system constructed and operative in accordance with a preferred embodiment of the present invention.

Referring principally to FIG. 2, a plurality of plates 28 are stacked, emulsion side down, adjacent plate support apparatus, referenced generally 30. Plate support apparatus 30 is of the type conceptually illustrated in FIGS. 1A–1B and includes two spaced generally circular discs 36, a disc support element 40 extending between and supporting discs 36, and a plate curving element 42. Disc support element 40 is operative to fixedly support discs 36. Plate curving element 42 is mounted for pivoting motion about an axis 44 (FIG. 15), which may be identical to the axis of symmetry of discs 36.

Plate curving element 42 is operative to curve a plate 46 (FIG. 3), which has been arranged tangentially with respect to discs 36, over the annular surfaces of the discs 36, as explained in detail below, thereby providing a cylindrical orientation of the plate 46.

Plate support apparatus 30 also typically comprises means for aligning a plate 28 relative thereto. Preferably, the means for aligning comprises a plurality of registration pins 78 mounted at industry standard determined intervals along a surface 80 of disc support construction 40 which is tangential with respect to the annular edge surfaces 52 of the discs 36. The registration pins 78 are configured and arranged so as to engage, when a plate 28 is in a loading position, (FIG. 3) a plurality of holes provided in plate 28.

The scanning apparatus of FIGS. 2–16 also comprises a conventional scanning carriage 56. The scanning carriage 56 is displaced by a lead screw 60 along linear bearings 62, along the axis 44 of the cylinder defined by the discs 36. The scanning carriage supports a spinner, which preferably comprises a three facet-array spinner, described in detail below with reference to FIG. 38. The carriage of FIG. 2 is shown with a conventional spinner 57, such as a mirror inclined 45 degrees to the axis of rotation 44. As it rotates, the spinner is operative to reflect a modulated focused light beam, thereby to provide a rotating beam which scans, in either a step mode or an helical mode, the required segment of the circular cross section of the cylinder about which the plate is arranged.

Referring now to FIGS. 3–16, which illustrate the apparatus of FIG. 2 in more detail, it is seen that the plurality of plates 28 may be stacked in an open container 70, emulsion side down. Each plate may comprise an emulsion-coated metal sheet, such as an emulsion-coated aluminum sheet having a thickness of approximately 0.15–0.5 mm. A plate lifting device 72, preferably comprising a lifting arm (not shown) for lifting a plurality of vacuum cups 74, is operative to lift a plate 46 from a storage position, indicated in broken lines, to a loading position, indicated in solid lines, in which the plate 46 is arranged generally tangentially relative to the pair of plate support discs 36. Preferably, as shown in FIG. 6, plate lifting device 72 may be displaced, after loading each sheet, to a location somewhat remote from discs 36 and the components associated therewith. The displacement of plate lifting device 72 from one of its various positions to another may be driven by conventional means, such as pneumatic, electrical or hydraulic driving means. A vacuum pump 185 (FIGS. 14–16) provides the necessary vacuum for lifting device 72 and vacuum cups 74.

As explained above, the plate support apparatus 30 of the present embodiment is of the type conceptually illustrated in FIGS. 1A and 1B and includes the two spaced generally circular discs 36 which define a cylinder having a longitudinal axis 44, disc support element 40 onto which discs 36 are mounted and a plate curving element 42. Discs 36 may be of a configuration described below with reference to FIGS. 14–16.

As explained above, plate support apparatus 30 also typically comprises registration pins for aligning the plate 46 relative to plate support apparatus 30 as plate lifting device 72 brings plate 46 into operative engagement with the plate support apparatus 30.

As explained with reference to FIG. 2, the embodiment of FIGS. 4A, 14 and 15 also provides the registration pins 78, along surface 80 of disc support element 40 which is tangential with respect to annular edge surfaces 52 of discs 36. Registration pins 78 provide alignment of the plate 46 and are suitable for use in conjunction with plate 28 having corresponding registration holes along the axial dimension thereof.

Figure 4A:
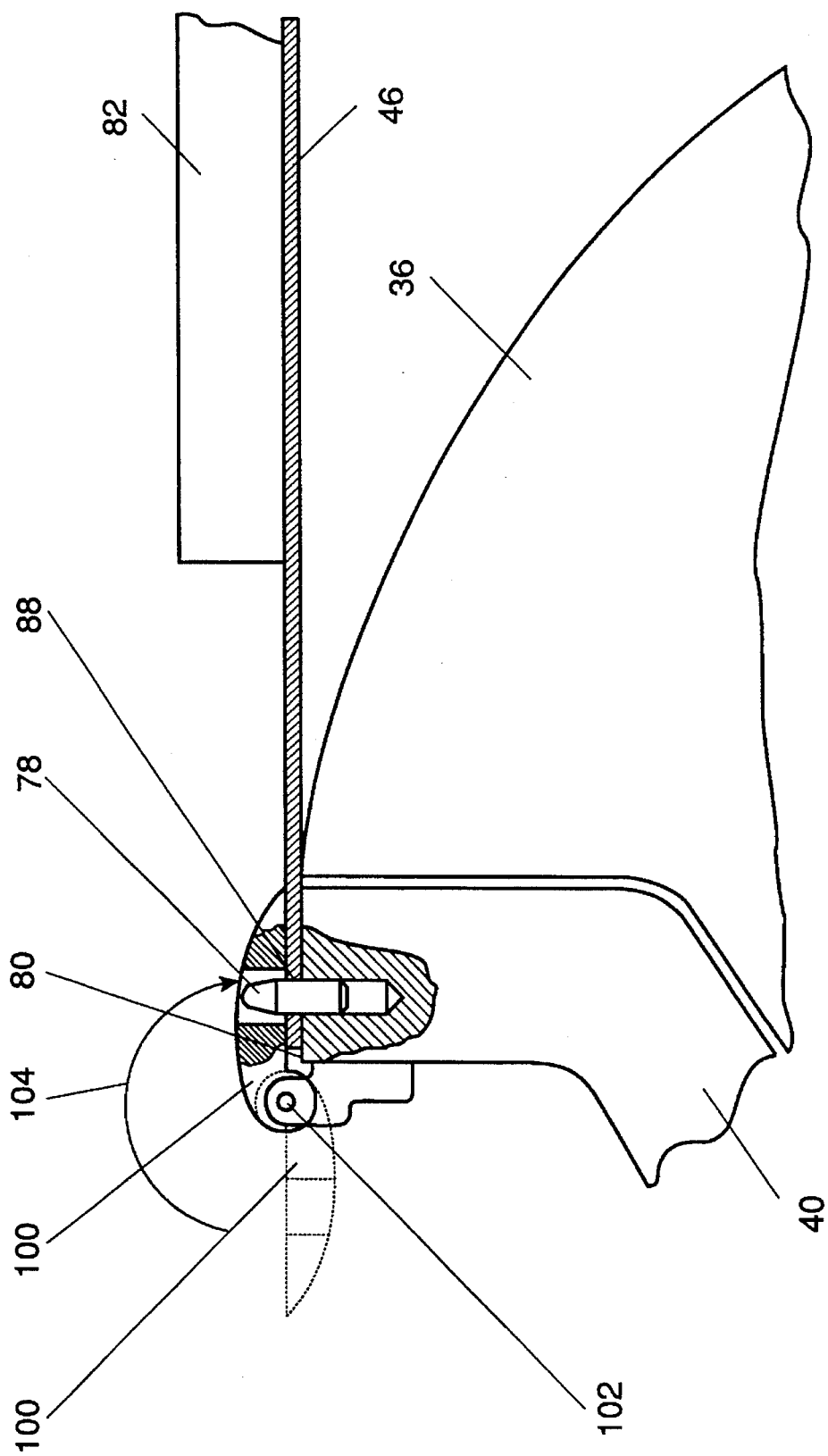
FIG. 4A is a detailed, cross sectional, schematic illustration of part of one embodiment of the apparatus of FIG. 3 including registration pins arranged along an axial dimension of the sheet.
Figure 4B:
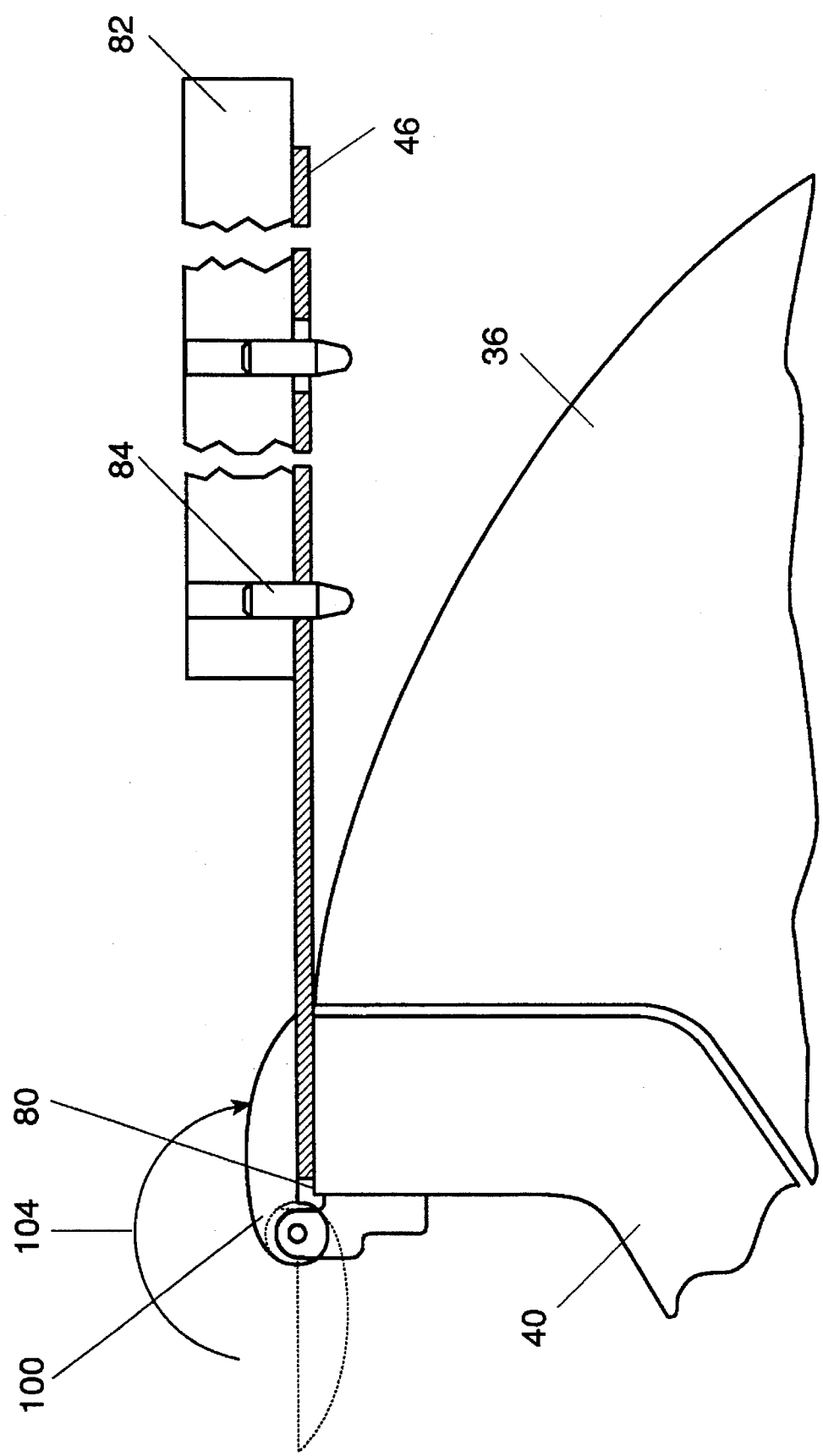
FIG. 4B is a detailed, cross sectional, schematic, illustration of part of an alternative embodiment of the apparatus of FIG. 3 including registration pins arranged along a curved dimension of the sheet.
Figure 16:
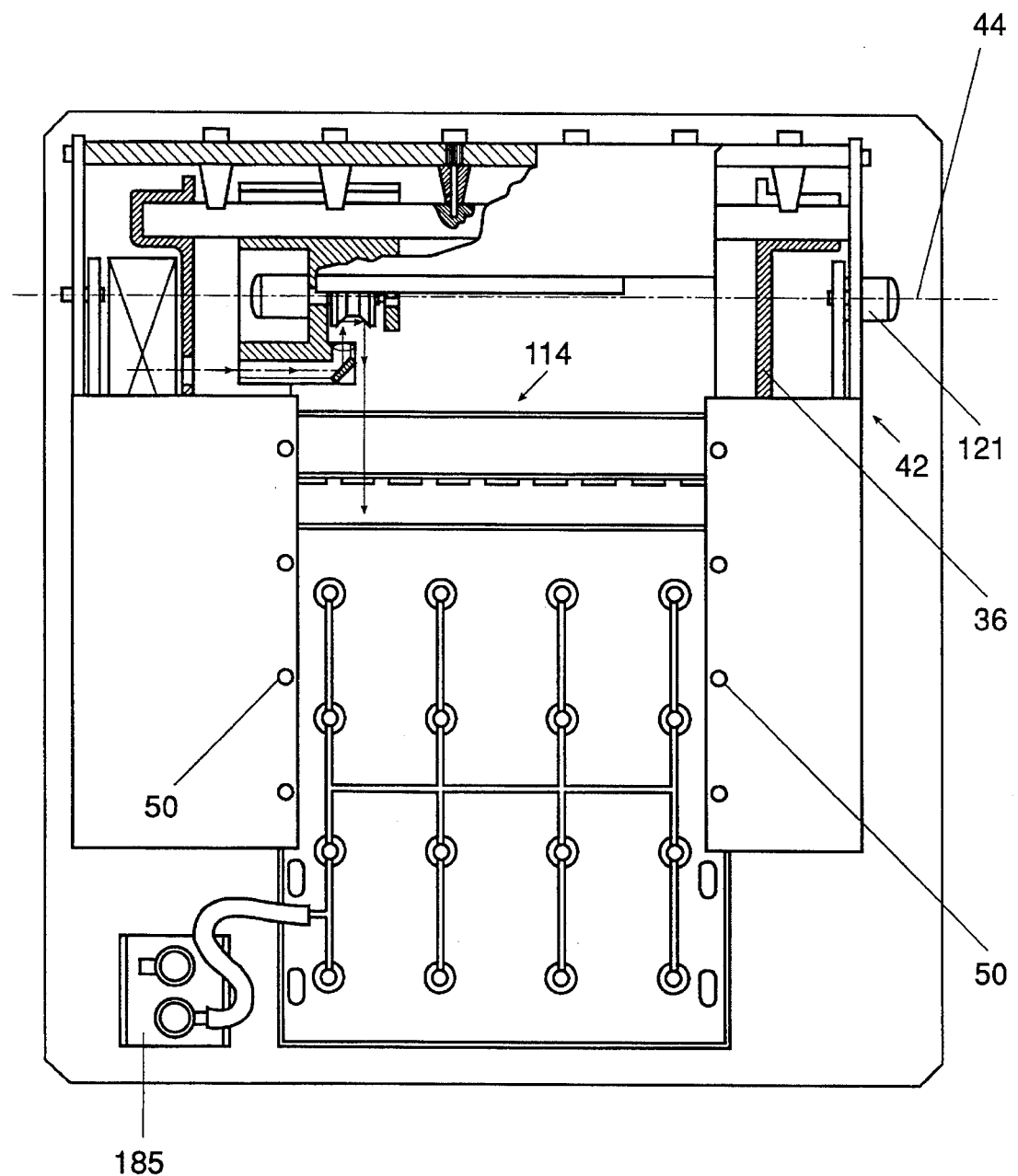
FIG. 16 is a cross sectional illustration, taken along lines XIV—XIV of FIG. 6, of the third stage of operation of the embodiment of FIGS. 4B and 5–13 in which registration pins are arranged along a curved dimension of the sheet.

In the embodiment of FIGS. 4B and 16, an additional support element 82, arranged generally perpendicularly to disc support construction 40 and fixedly attached thereto, is provided with a plurality of registration pins, referenced 84, along a surface thereof which is tangential with respect to annular edge surfaces 52. Registration pins 84 provide alignment of the plate 46 and are suitable for use in conjunction with plate 28 having corresponding registration holes along the curved dimension thereof.

It is a particular feature of the present embodiment that plate support apparatus 30 is capable of supporting plates having a plurality of holes in any suitable plurality of locations. In other words, registration pins may be provided at locations corresponding to substantially any location in the plate 46. In the embodiment of FIG. 4A, the locations of registration pins 78 are arranged to correspond to the locations of a plurality of registration holes disposed along the axial dimension of the plate 46. In the embodiment of FIG. 4B, the locations of registration pins 84 are arranged to correspond to the locations of a plurality of registration holes disposed along the curved dimension of plate 46. Any suitable arrangement of pins, including, for example combinations of the pin arrangements described hereinabove, may be employed.

As seen particularly in FIG. 4A, each registration pin 78 preferably is tapered at its engaging end so as to allow the automatic plate lifting device 72 to automatically position the plate so that the holes 88 will be sufficiently aligned, relative to the tapered ends of the registration pins 78, to drop the plate 46 onto the surface 80 of the structural element 40.

Plate support apparatus 30 also comprises a clamp 100 or other suitable device for securely fastening plate 46, once aligned, to the disc support element 40. In the embodiment of FIG. 4A, a plate securing position of clamp 100, in which clamp 100 clamps over registration pins 78, is indicated in solid lines and a plate releasing position is indicated in broken lines. As shown in FIG. 4A, clamp 100 typically comprises a hinge member 102 which is fixedly associated with disc support member 40 and which enables clamp 100 to pivot in the direction of an arrow 104 in order to arrive at its plate securing position from its plate releasing position.

Figure 9:
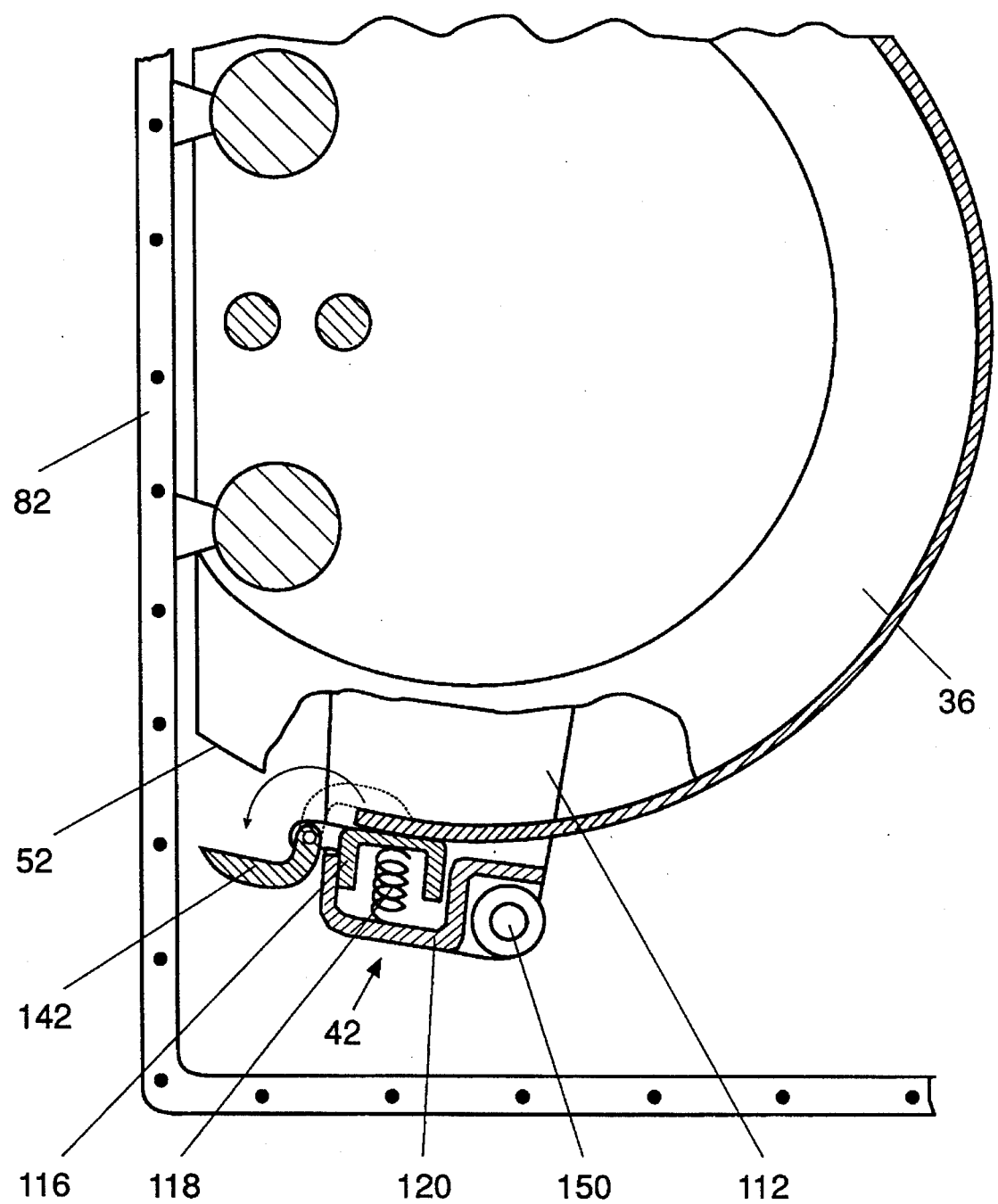
FIG. 9 is a detailed view of some of the elements of the apparatus of FIG. 5.

As explained above, a plate curving element 42 is provided which is operative to curve the plate over the annular edge surfaces 52 of the discs 36. Plate curving element 42 preferably comprises a pair of radial arms 112 (FIGS. 5–7B, 9) and an associated arm connecting assembly 114. The arm connecting assembly 114 preferably comprises an elongate plate curving and engaging member 116 (FIG. 9). Elongate member 116 is caused to slidably and tightly engage the edges of plate support discs 36 by means of a plurality of springs 118 and an associated spring supporting member 120.

The springs 118 serve to maintain plate curving member 116 in tight tangential engagement with the edges of plate support discs 36. Springs 118 also allow plate curving member 116 to pass over protruding elements such as registration pins 78 in the embodiment of FIG. 4A, and clamp 100. The spring supporting member 120 is associated with a motor 121 (FIGS. 14 and 16) which drives the plate curving element 42 such that the arm connecting element 114 travels along the annular edge surfaces 52 of the discs 36.

Figure 8:
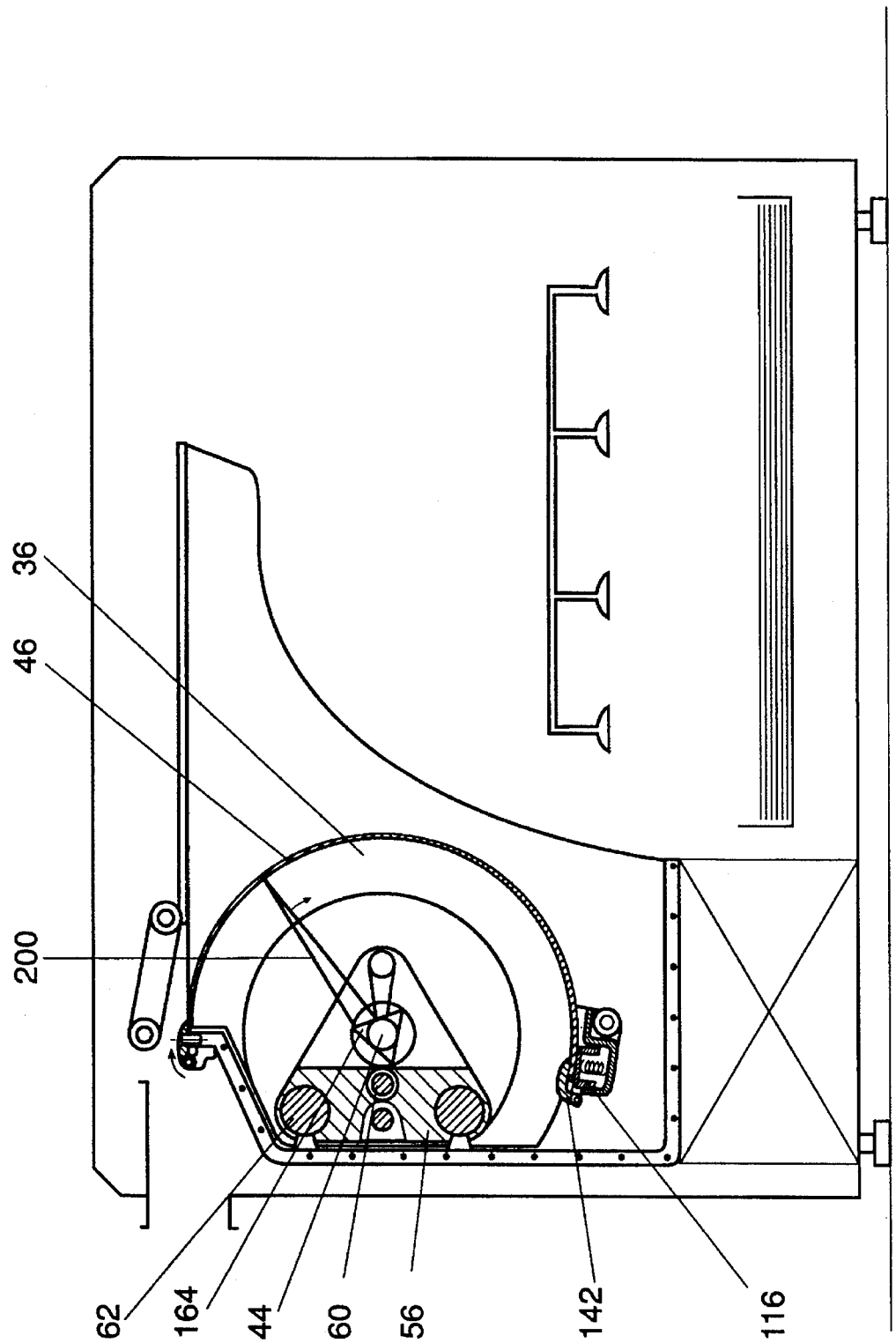

A clamp or other securing member 142 is provided to removably secure an edge of the plate to plate curving member 116 when the plate curving member 116 has reached an extreme clockwise position, as shown in FIG. 8. In FIG. 9, the securing orientation of the clamp 142 is shown in broken lines, whereas the releasing orientation of the clamp 142 is shown in solid lines.

Figure 12:
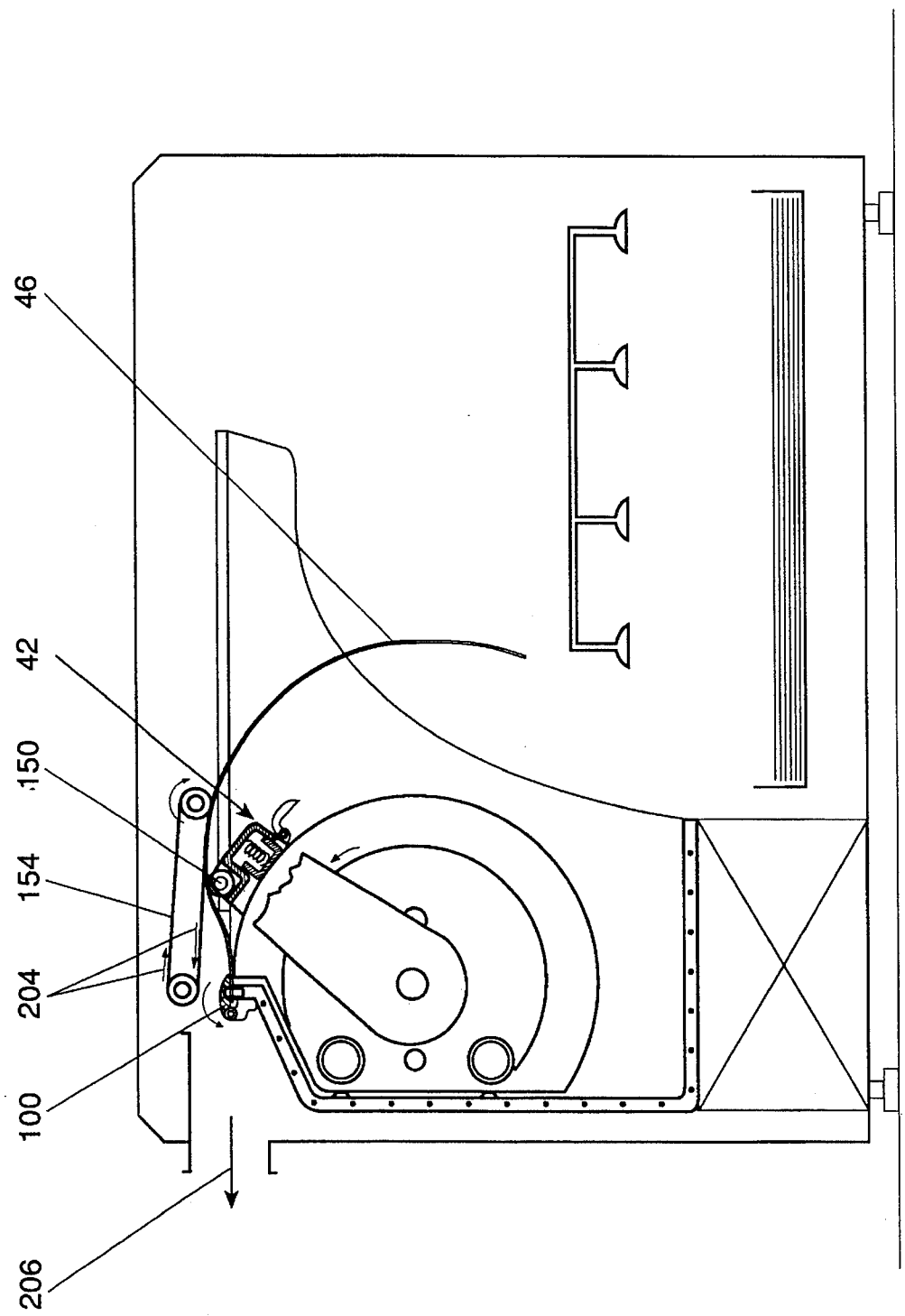
Figure 14:
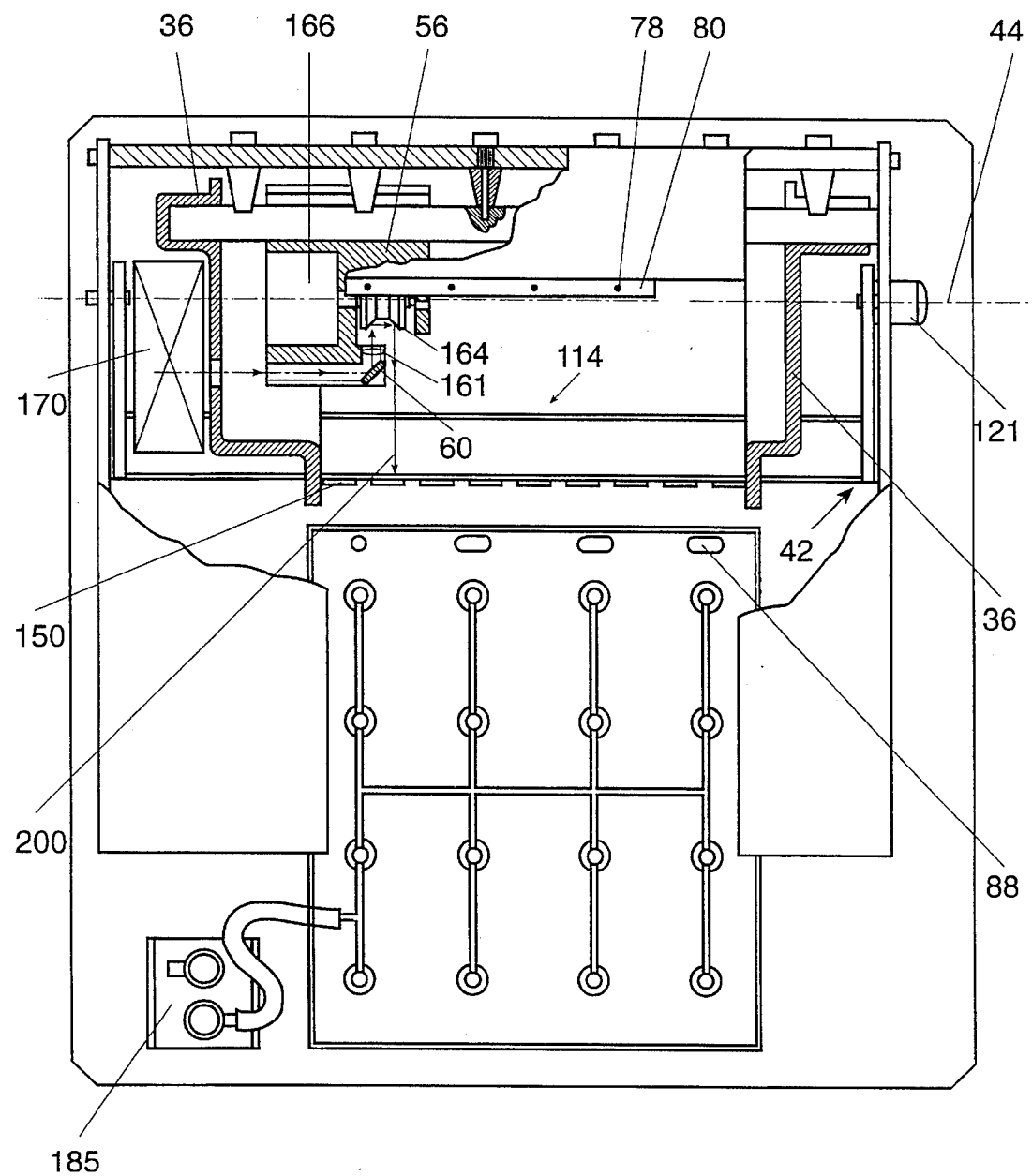
FIG. 14 is a cross sectional illustration, taken along lines XIV—XIV of FIG. 6, of the third stage of operation of the embodiment of FIGS. 4A and 5–13 in which registration pins are arranged along an axial dimension of the sheet.
Figure 15:
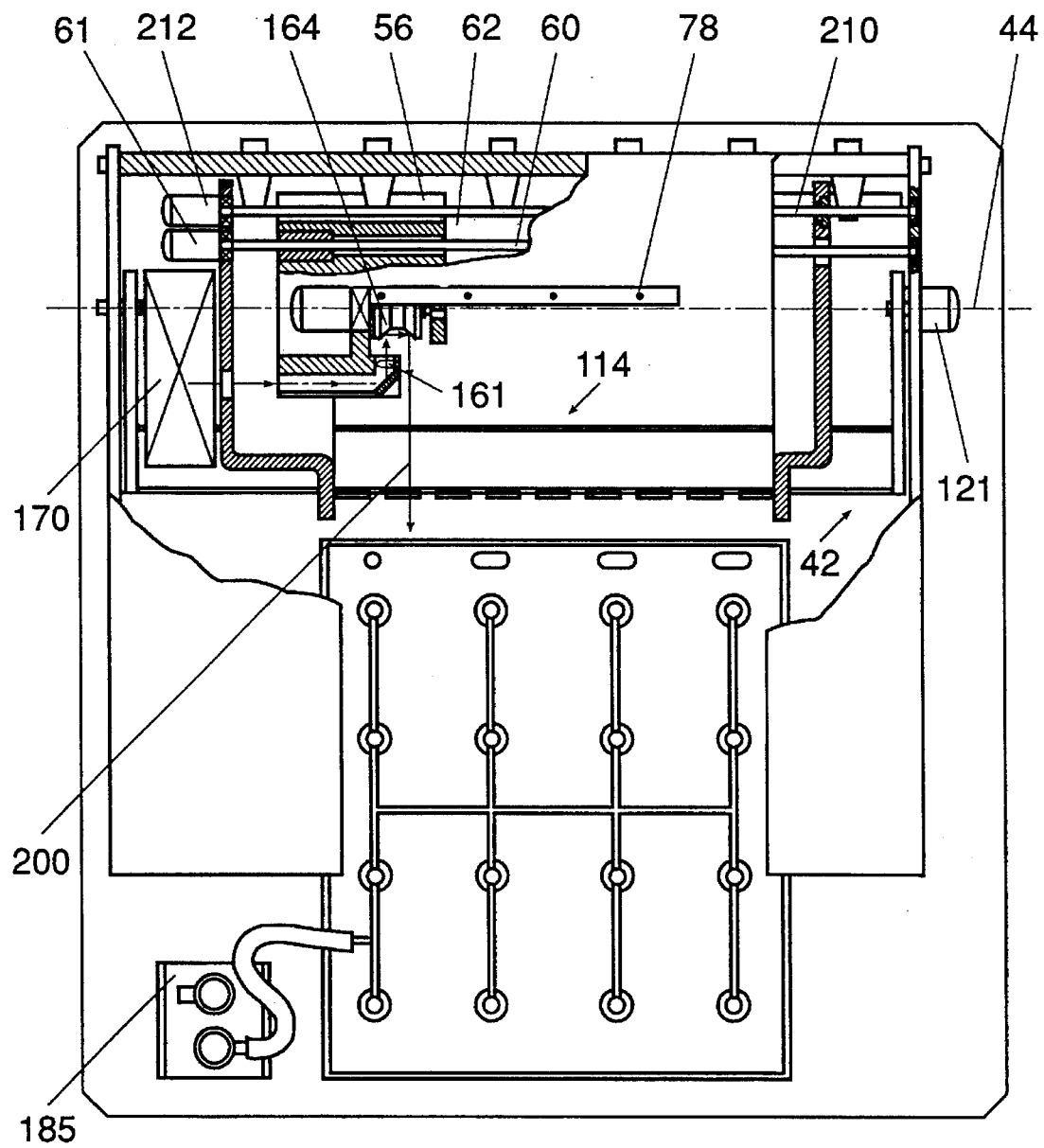
FIG. 15 is a cross sectional illustration of the embodiment of FIGS. 4A, 5–13 when in its third stage of operation, taken along lines XV—XV of FIG. 6.

A plurality of wheels or rollers 150 are provided in association with arm connecting assembly 114, as best seen in FIGS. 9 and 14, for slidably transferring plate 46, once scanned, onto a conveying belt 154 (FIG. 12).

The scanning carriage 56, as shown in FIG. 14, typically comprises a conventional folding mirror 160 and a conventional spinner or a spinner 164 such as described hereinbelow in connection with FIGS. 38A–38C and associated conventional spinner motor 166. These elements are in optical communication with an optical unit 170 including a laser such as model 2003-750L, commercially available from Uniphase Corporation Ltd., San Jose, Calif., USA, and a modulator (not shown) such as Model No. 1208, manufactured by Isomet Corporation, Va., USA and, if necessary, conventional beam expanding lenses (not shown). The optical unit 170 may be fixedly associated with one of the discs 36. Optical unit 170 provides a modulated light beam, oriented parallel to the cylinder axis 44, which is focused by the focusing lens 161 and subsequently impinges upon the rotating spinner 164. This can be generally seen in prior art FIGS. 23–25, wherein a spinner is indicated by numeral 510.

Spinner 164 preferably comprises a three facet-array spinner, described in detail below with reference to FIG. 38. Alternatively, spinner 164 may comprise a conventional spinner such as a flat mirror, commercially available under Catalog no. 02 MPG 007 from Melles Oriot, Irvine, Calif., USA, arranged at a 45 degree angle to the scanning axis 44.

Axial displacement of the scanning carriage 56 along the axis 44 is provided by a suitable scanner carriage driving member, (not shown) which may be entirely conventional. The relationship between the magnitudes of the axial and rotational components of the scanning carriage may be selected in accordance with the following equation:

$a = N \times n / R$ where:
$a$ = the axial translation in mm for a single revolution of the spinner about the axis of the scanner;
$N$ = number of facet arrays of the spinner. For example, the spinner of FIGS. 37B–37D has three facet arrays;
$n$ = number of scanning beams; and
$R$ = scanning resolution in lines pep mm.

Figure 3:
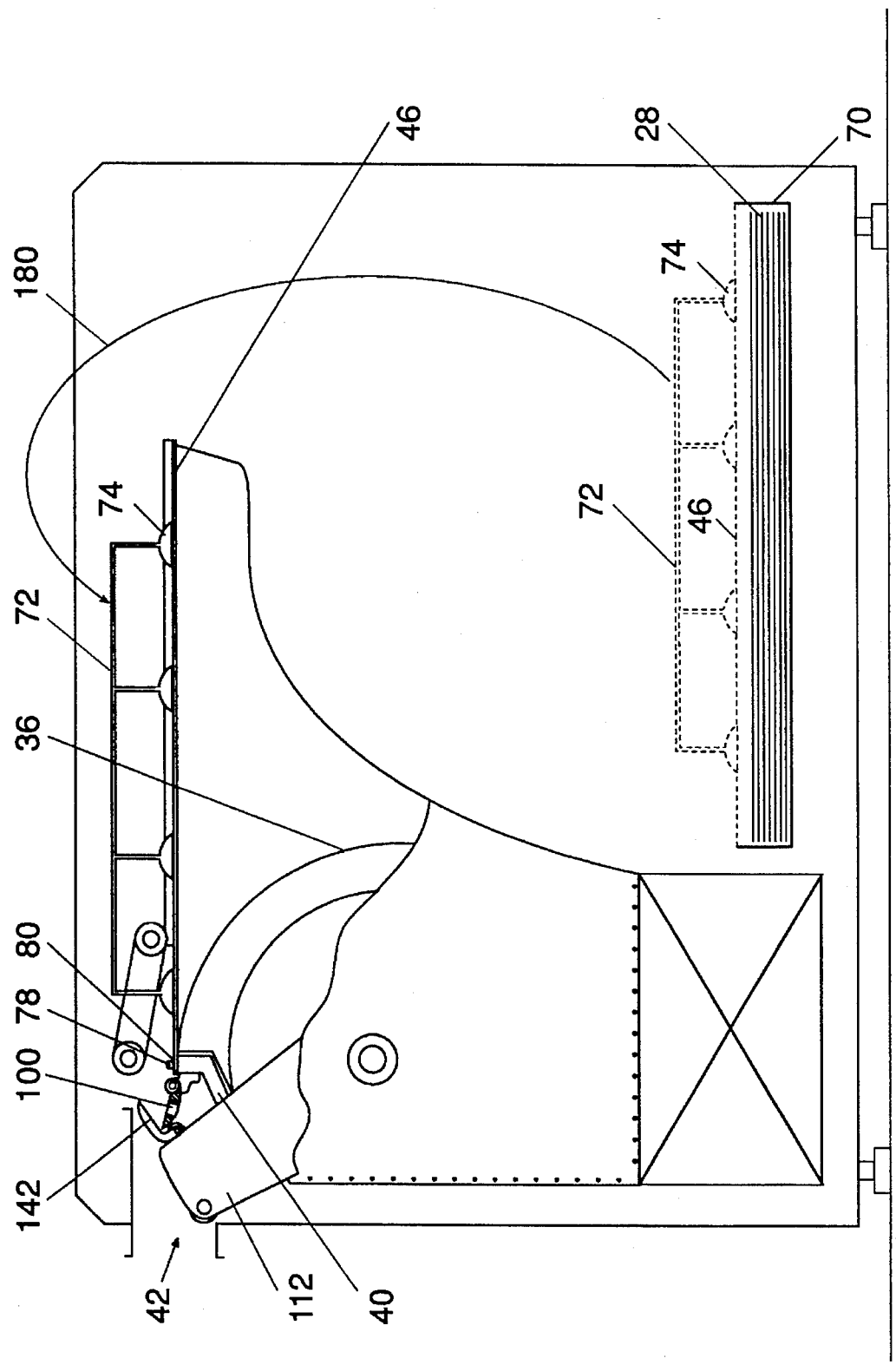
FIG. 3 is a side view, schematic, illustration of the sheet scanning and automatic sheet loading/unloading system of FIG. 2 in a first stage of operation.

A preferred mode of operation of the plate scanning device of FIGS. 2–16, including automatic loading, scanning and automatic unloading is now described:

Initially, as shown in FIG. 3, a plurality of plates is stacked in standard plate storage device 70, emulsion side down. Plate lifting device 72 lifts plate 46 from a storage position, indicated in broken lines in FIG. 3, to a loading position, indicated in solid lines in FIG. 3, in which the plate 46 is arranged to be generally tangential relative to plate support discs 36. A typical lifting path is represented in FIG. 3 by an arrow 180. In the embodiment of FIG. 3, the path of the plate lifting device 72 is such that the plate 46 is dropped onto the registration pins 78 from above, as shown in FIG. 4A. Alternatively, plate 46 may be mounted below registration pins 84, as in the embodiment of FIG. 4B.

Preferably, once the plate 46 is positioned such that the holes therein are located approximately above the corresponding registration pins 78 (FIG. 4A), plate lifting device 72 wiggles or vibrates the plate 46 in a plane (not shown) parallel to and elevated relative to the plane tangential to the discs 36 and including the top surface 80 of the disc support 40. The parameters of the vibration are selected to ensure that the plate 46 will eventually be positioned so that the holes therein engage the corresponding registration pins 78.

Once the registration pins 78 (FIG. 4A) or 84 (FIG. 4B) precisely engage holes provided in plate 46, clamp 100 pivots in the direction of arrow 104, thereby to fasten plate 46 to the top surface 80 of the disc support 40, as indicated in solid lines in FIGS. 4A and 4B.

Figure 5:
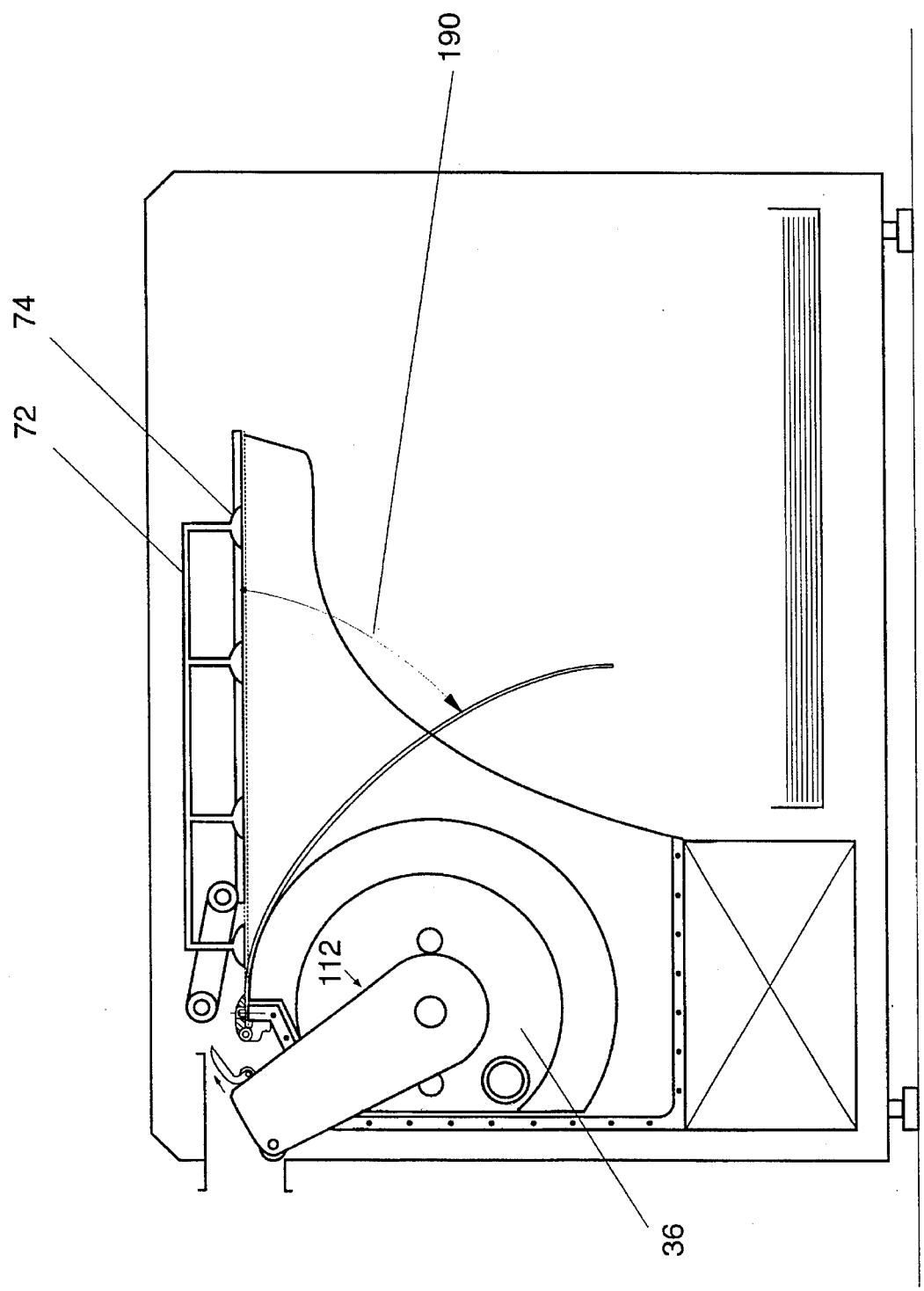
FIGS. 5, 6, 7A, 7B and 8 are side view schematic illustrations of the system of FIG. 3 in second to fifth stages of operation, respectively.
Figure 6:
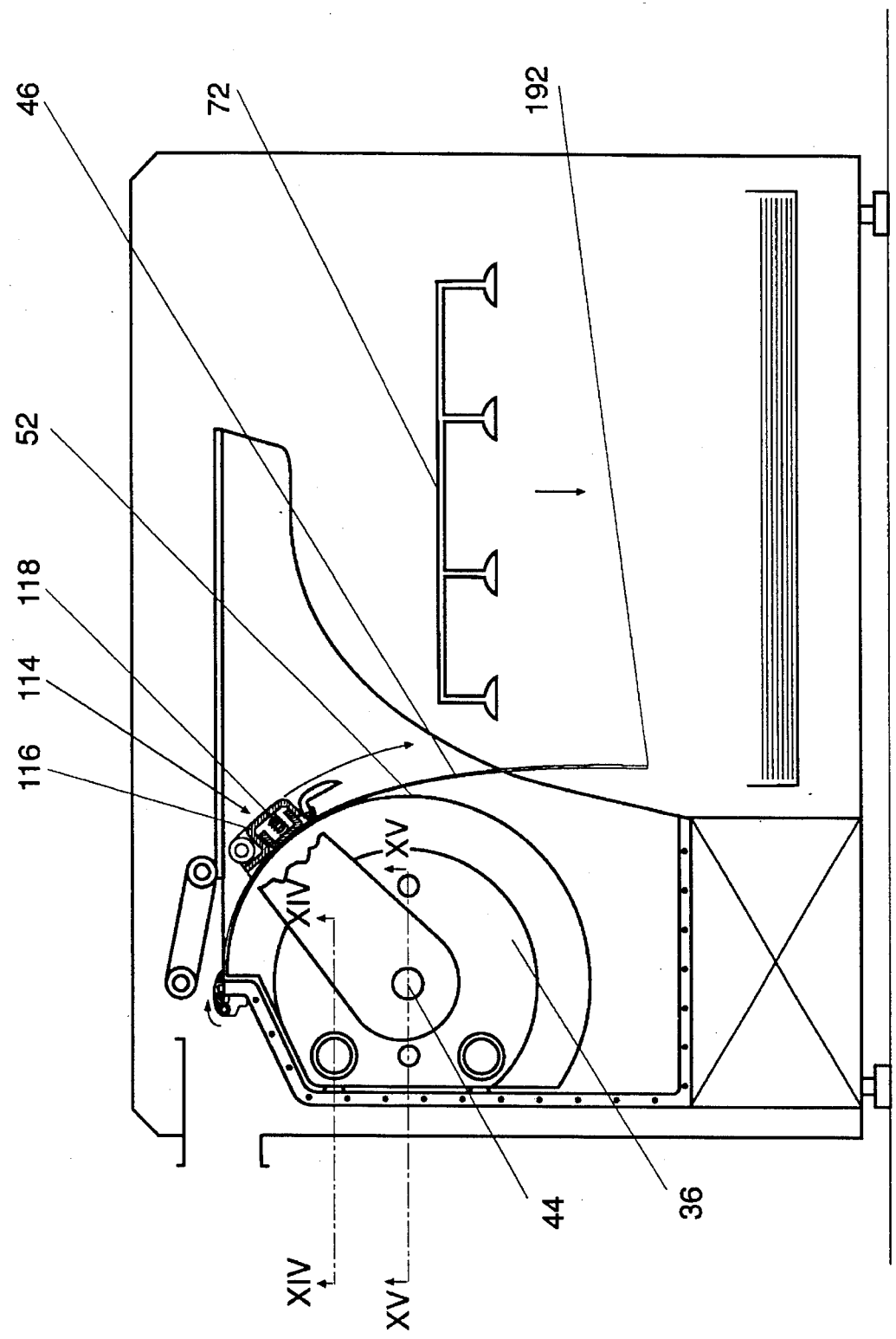

The vacuum supplied to vacuum cups 74 is now terminated, causing the free end of the plate to fall in the direction of arrow 190, as shown in FIG. 5. At this point, the plate lifting device 72 may be distanced from the discs 36 and components associated therewith, as shown in FIG. 6.

Arm connecting element 114 now pivots about axis 44 along the annular edge surfaces 52 of the discs 36 toward a free edge 192 of the plate 46, in a first direction such as clockwise, as may be seen by comparing FIG. 6 to FIG. 5. Plate curving member 116 is maintained in tight tangential engagement with plate support discs 36 by springs 118. The pivot motion of the plate curving element 42 about axis 44 results in the plate 46 being wrapped tightly over plate support discs 36 so as to define a cylinder whose ends are defined by plate support discs 36.

Figure 7A:
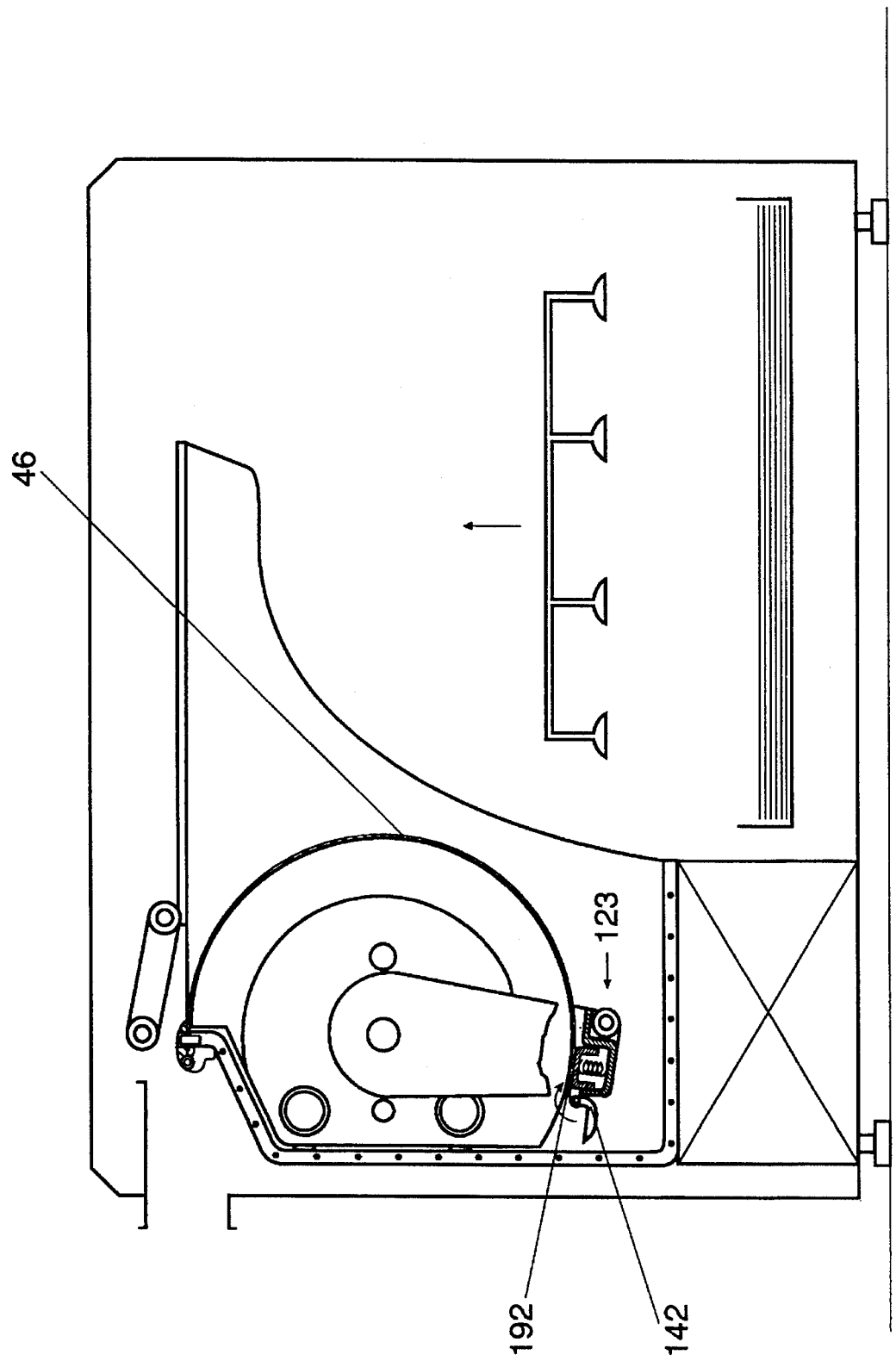
Figure 7B:
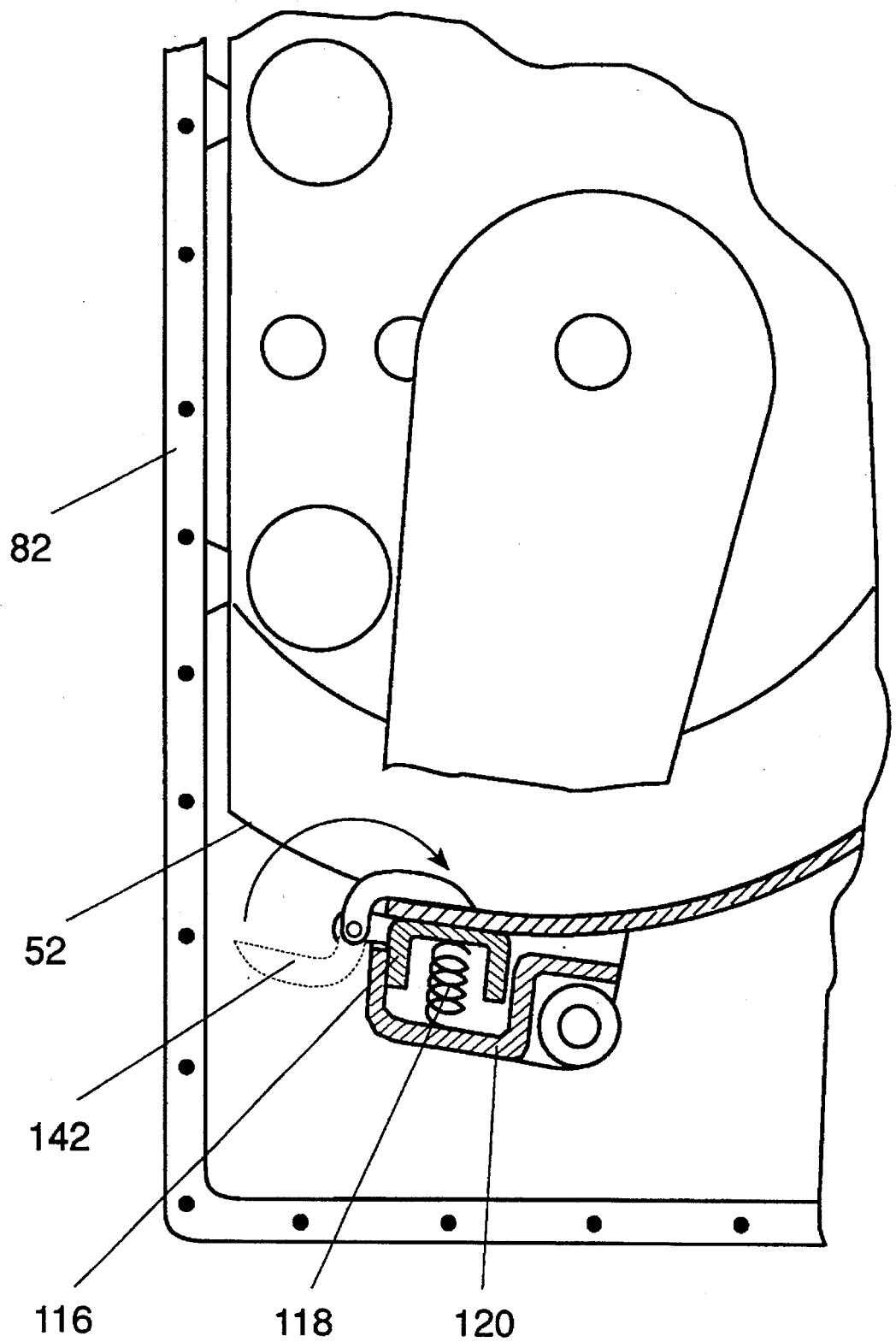

At its extreme clockwise position, shown in FIGS. 7A and 7B, arm connecting element 114 reaches the free edge 192 of the plate 46. At this point, all four edges of the plate 46 are secured to the annular edge surfaces 52 of plate support discs 36. Clamp 142 secures the free edge of the plate 46 to plate curving member 116 as shown in FIG. 7B in solid lines.

Plate curving element 42 now becomes stationary and scanning of the plate begins. Scanning carriage 56 is translated by lead screw 60 and an associated motor 61 (FIG. 15) along linear guides 62, in a direction parallel to the axis 44. A scanning beam 200 is provided by a conventional stationary optics system 170 (FIG. 14) and is operative to scan the entire writing area of the plate as the spinner 164, mounted on carriage 56, is displaced along the axis 44 one or more times.

Figure 10:
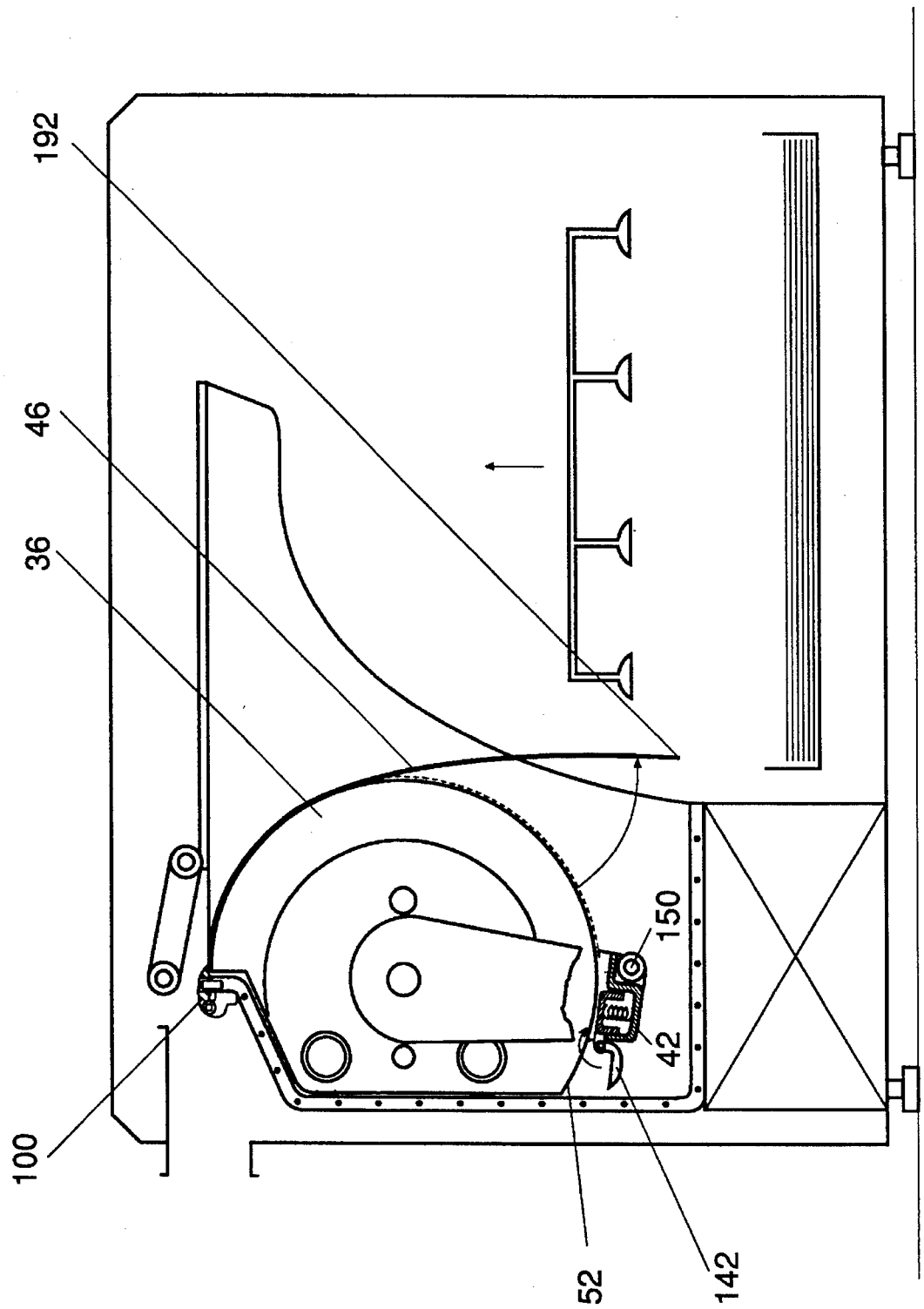
FIGS. 10–13 are side view, schematic, illustrations of the system of FIG. 3 in sixth to ninth stages of operation, respectively.

Once the entire plate has been scanned, clamp 142 reverts to its releasing position, as shown in FIGS. 9 and 10. Arm connecting assembly 114 is now moved slightly clockwise along annular disc edge surfaces 52 and slightly beyond the adjacent edge 192 of the plate 46, in order to release it from engagement with the plate support discs 36. Consequently, the now free edge 192 of the plate 46 falls as illustrated in FIG. 10. The plate is now secured to plate support discs 36 only at the edge opposite free edge 192, by means of clamp 100.

Figure 11:
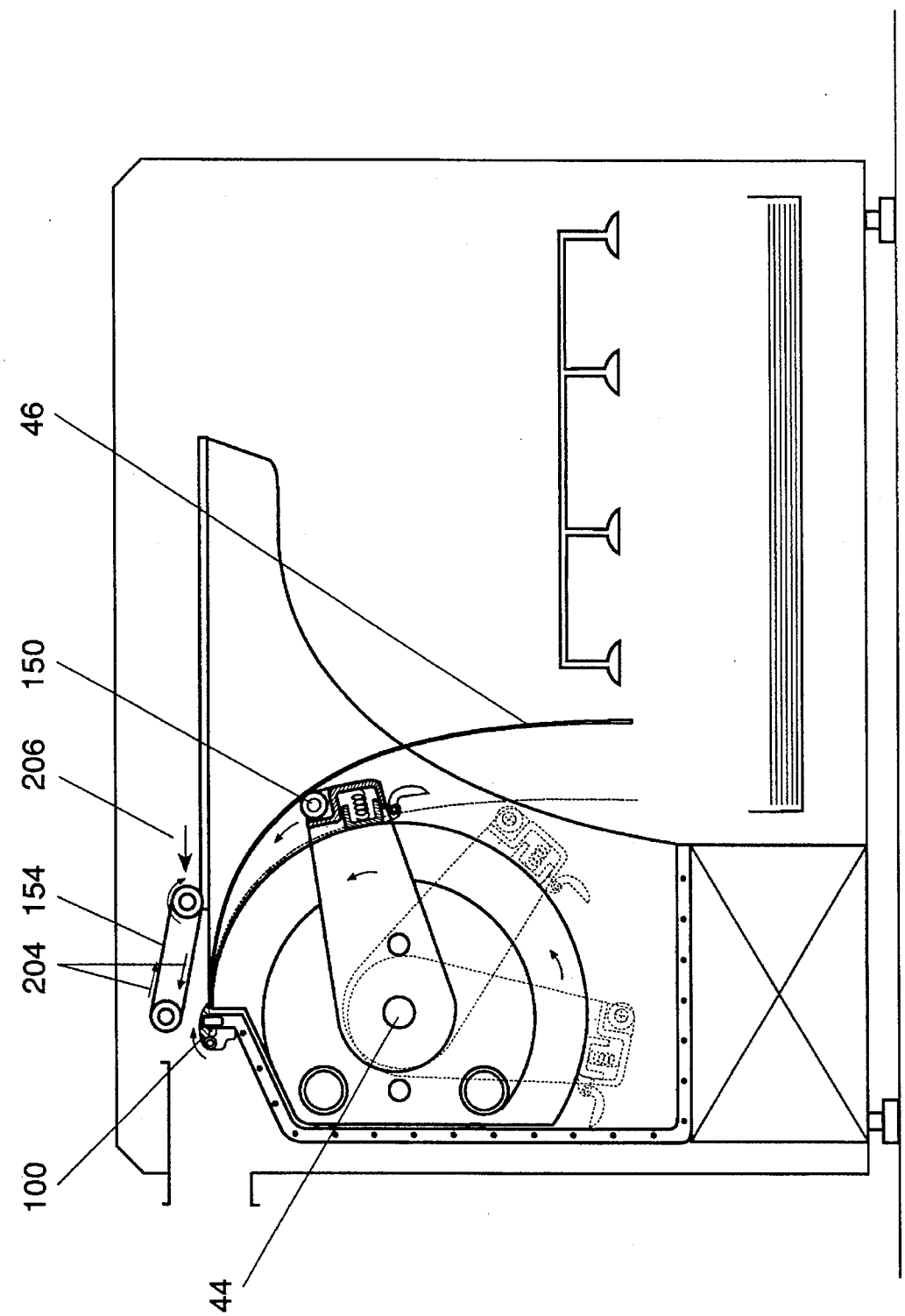
Figure 13:
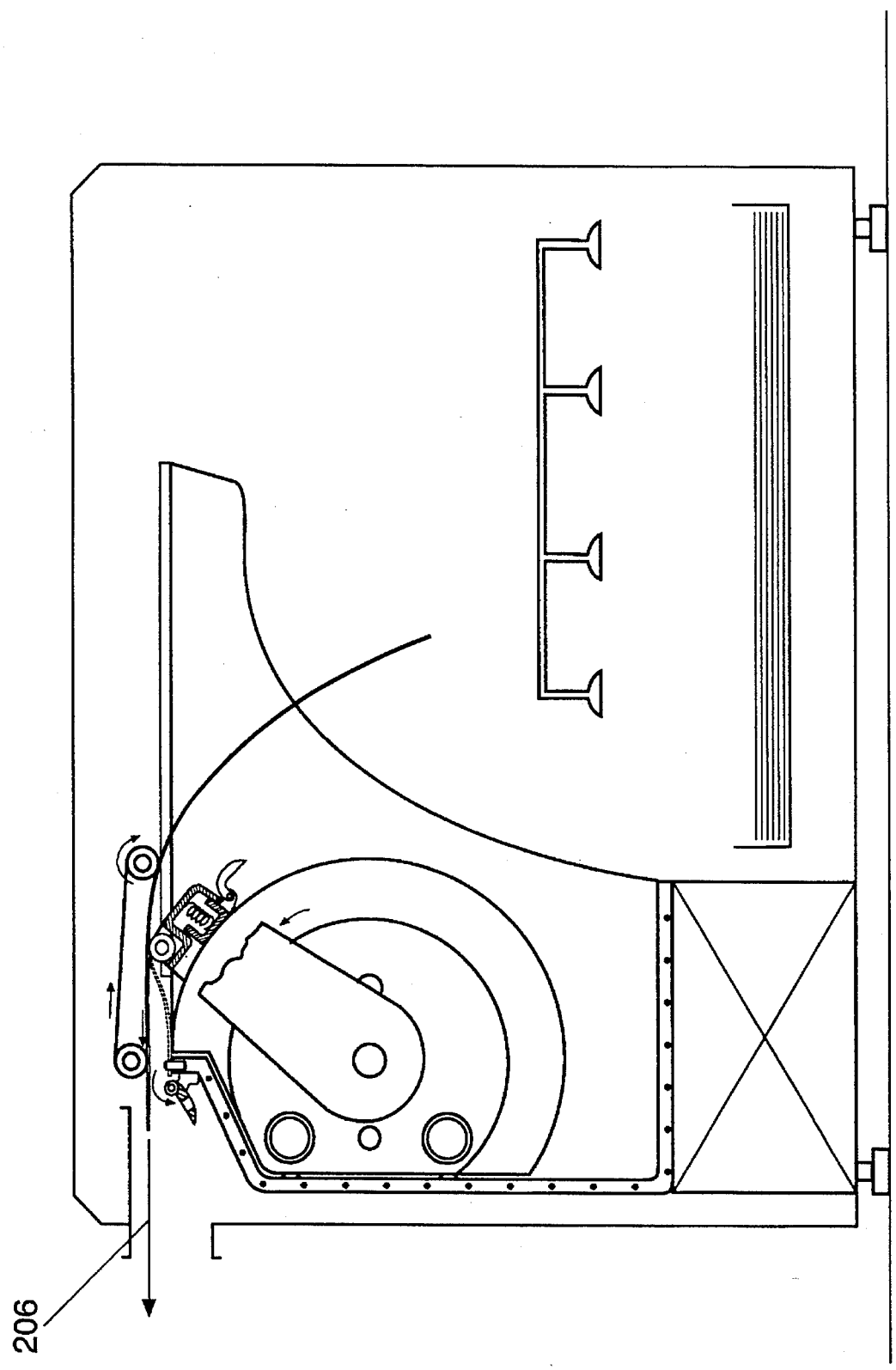

Rotation of plate curving element 42 about axis 44 in an opposite direction, such as a counterclockwise direction is now initiated, as illustrated in FIG. 11. In due course, as illustrated in solid line, the rollers 150 lift the plate 46 and urge the plate 46 against the conveying belt 154, as illustrated in FIG. 12. At this point, clamp 100 reverts to its plate releasing orientation, the conveying belt rotates in the direction of the arrows 204, and the plate is guided along the conveying belt and away from the plate scanning device in the direction of arrow 206 (FIGS. 12 and 13).

Once the plate is entirely released, the plate curving element 42 rotates counterclockwise so as to return to its initial position as illustrated in FIG. 3 and an additional plate may be loaded.

According to a preferred embodiment of the present invention, the distance between the two discs 36 is user-selectable so as to accommodate plates having a variety of axial dimensions. This may be implemented by mounting one disc 36 to be translatable, such as the right disc in FIG. 14, which may be translated along the longitudinal cylinder axis 44. A lead screw 210 and associated motor 212 (FIG. 15) may be provided to drive the slidable disc along scanning carriage linear bearings 62.

Reference is now made to FIGS. 17–22C which illustrate plate scanning apparatus constructed and operative in accordance with another preferred embodiment of the present invention. The plate scanning apparatus includes plate support apparatus, referenced generally 300, which resembles the plate support apparatus 30 of the embodiment of FIGS. 2–16 in that it includes a pair of discs 308 and 310, similar to discs 36 of the embodiment of FIGS. 2–16, which contact substantially less than the entire surface area of the radially inward, radiation sensitive surface of the plate.

However, in the embodiment of FIGS. 17–22C, unlike in the preceding embodiment described hereinabove with reference to FIGS. 2–16, a flexible substrate or support sheet member 314 is provided which has a first, cylindrical orientation and a second, planar orientation. Substrate 314 is mounted on discs 308 and 310 which are rotatably mounted with respect to a stationary disc support element 320, unlike discs 36 of FIGS. 2–16 which are stationary and are fixedly mounted on disc support element 40. When substrate 314 is in its planar orientation, registration means, such as registration pins, may be accurately provided along the curved dimension of the substrate 314, as explained below.

Substrate 314 may be mounted on discs 308 and 310 by attaching an axial edge of substrate 314 thereto and rotating discs 308 and 310 in a first direction, such as clockwise, as described in detail below. Once mounted, substrate 314 may be disposed radially outward with respect to a plate 322 placed thereon and in touching engagement therewith. The plate 322 is secured by engagement of substrate 314 with discs 308 and 310.

Substrate 314 thus maintains a curved orientation of the plate 322. Substrate 314 may be unwound from discs 308 and 310 by detaching an axial edge of substrate 314 therefrom and rotating discs 308 and 310 in a second direction, such as counterclockwise, as described in detail below.

The plate scanning apparatus of FIGS. 17–22C is now described in detail. The plate scanning apparatus comprises a normally open container or plate magazine 330 in which unexposed plates are stored, preferably being stacked one on top of the other, emulsion side upward. A plate pick-up device 332 (FIG. 18) which may comprise a vacuum cup array including a plurality of vacuum cups 334, is operative to bring a plate, such as the uppermost plate 322 of the stack, to a raised orientation as shown in FIG. 18B.

The pair of plate edge support members or discs 308 and 310, seen most clearly in FIGS. 19–22C, are provided facing one another at a separation D from one another, where the separation D corresponds generally to the axial dimension of the plate 322. Preferably, the separation D is slightly less than the axial dimension of the plate, such that the plate may be securely mounted onto the annular edge surfaces of discs 308 and 310 and substantially the entirety of the plate, apart from the extreme edges thereof, may be scanned. Separation D may, for example, be slightly less than 1050 mm, or slightly less than 500 mm, depending on the axial dimension of the plate employed.

Figure 17:
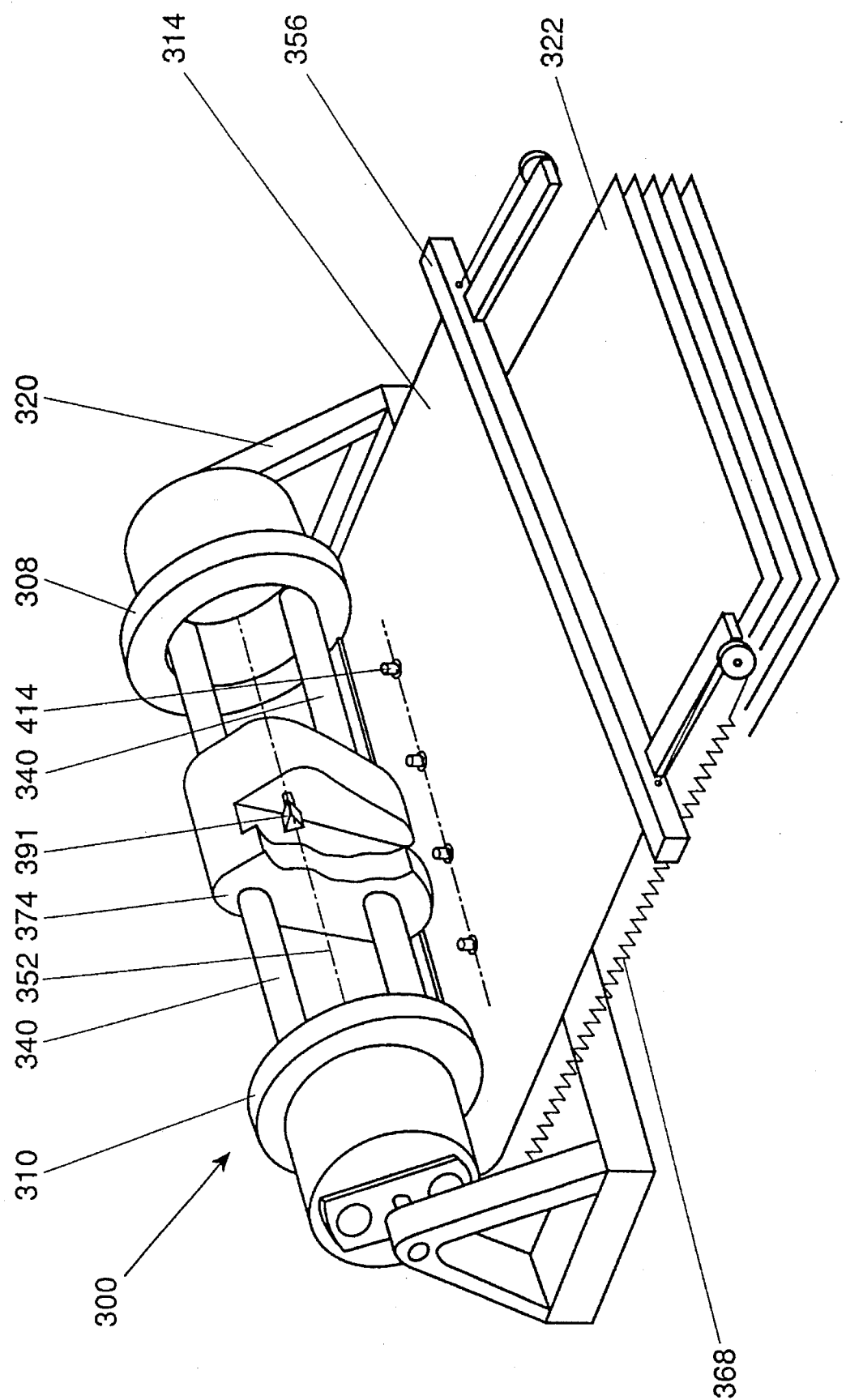
FIG. 17 is a pictorial illustration of sheet scanning and sheet loading/unloading apparatus constructed and operative in accordance with a second embodiment of the present invention and including a flexible substrate supporting the surface area of the sheet.

According to a preferred embodiment of the present invention, separation D is user-selectable so as to accommodate plates of different first dimensions. Accordingly, one of the discs, such as disc 308 in FIG. 21, may be slidably mounted along disc guiding rods 340 (FIG. 17).

A disc driving system, which may comprise a lead screw 342, associated bearings 344 and 346 and a motor 348, drives slidable disc 308 along the disc guiding rods 340. A nut 350 threadably attaches disc 308 to lead screw 342. Bearings 344 and 346 may respectively comprise bearings identified by catalog numbers NSK-6201-ZZ and NSK 7201A-DF, commercially available from NSK Corporation, Ann Arbor, Mich., USA.

It is appreciated that the two discs 308 and 310 define the two end surfaces of an imaginary cylinder having an axis of symmetry 352 of length D. The circumference of the discs 308 and 310 is selected to accommodate the curved dimension of the plate 322. Any suitable wrap angle, such as but not limited to 180 degrees or 270 degrees, may be employed.

As explained above, a flexible substrate or support sheet member 314 is provided for wrapping around the discs 308 and 310. Substrate 314 may be formed of a generally flexible, non-resilient material such as stainless steel or titanium. First and second elongate substrate support elements 354 and 356 (FIG. 18A) are provided for fixed attachment to axial edges of substrate 314. First substrate support element 354 is fixedly attached to at least one of the discs 308 and 310, such as disc 310. According to a preferred embodiment of the present invention, first substrate support element 354 is fixedly attached to disc 310 and is slidably attached to disc 308, in order to allow the separation D between the discs 308 and 310 to be selected by a user.

Second substrate support element 356 is arranged to slide along a pair of guiding rails 364 which guide substrate 314 from its cylindrical orientation to its planar orientation. Preferably, guiding rails 364 are arranged on both sides of plate container 330, as best seen in FIGS. 19–22C and the distance between them exceeds the axial dimension of the plate 322. Therefore, the plate 322 may pass between guiding rails 364 without interference when it is raised by plate pick-up device 332.

The motion of second substrate support element 356 along guiding rails 364 may be regulated in any suitable manner. In the illustrated embodiment, shown for example in FIGS. 18A, 20 and 21, second substrate support element 356 is pulled along guiding rails 364 by a pair of cables 366 attached to both ends of each guiding rail 364. Cables 366 are attached to the free end of a pair of springs 368 via a pair of rollers 370. The fixed ends of springs 368 are fixedly attached to the left end of guiding rails 364. The springs are operative to apply a tensioning force which tends to cause substrate support element 356 to move to the right, in the sense of FIG. 18A.

A scanning carriage 374 is mounted so as to be displaceable along the axis 352 of the cylinder defined by the discs 308 and 310. The scanning carriage may be slidably mounted on disc guiding rods 340. A scanning carriage driving system, which may comprise a lead screw 376, bearings 378 and 380 at both ends of lead screw 376 and a motor 388 (FIG. 21), drives the scanning carriage 374 along axis 352. A nut 390 threadably attaches scanning carriage 374 to lead screw 376. Bearings 378 and 380 may respectively comprise bearings identified by catalog numbers NSK-6201-ZZ and NSK 7201A-DF, commercially available from NSK Corporation, Ann Arbor, Mich., USA.

The scanning carriage 374 may be generally identical to scanning carriage 56 of the embodiment of FIGS. 2–16 and may comprise any suitable linear sliding bearing engagement means, such as linear bushings LBE-SOUU-OP, commercially available from Nippon-Thompson Co., Ltd., Tokyo 108, Japan. As in the embodiment of FIGS. 2–16, the spinner of scanning carriage 374 preferably comprises a conventional spinner 391. Alternatively, the spinner may be constructed and operative in accordance with one of the embodiments of FIGS. 26A–38, described below.

Plate removing apparatus is preferably provided to automatically remove plate 322 from plate support apparatus 300. Plate removal may be effected by any suitable method. For example, two suction cups 358 and associated hinges 360 may extend from the inner surface of each of the discs 308 and 310, such that the suction cups face the plate. The hinges 360 are fixedly associated with the inner surface of the disc 310 and their pivot axes are arranged parallel to the axis 352 of the scanner.

Plate conveying apparatus such as a roller array 363 and an associated conveyor belt 365 are provided for distancing the scanned plate 322 from the plate support apparatus 300. The roller array 363 and conveying belt 365 may be located directly above the vacuum pick-up array 332 and the plate magazine 330. The operation of this apparatus will be described hereinbelow.

Figure 19:
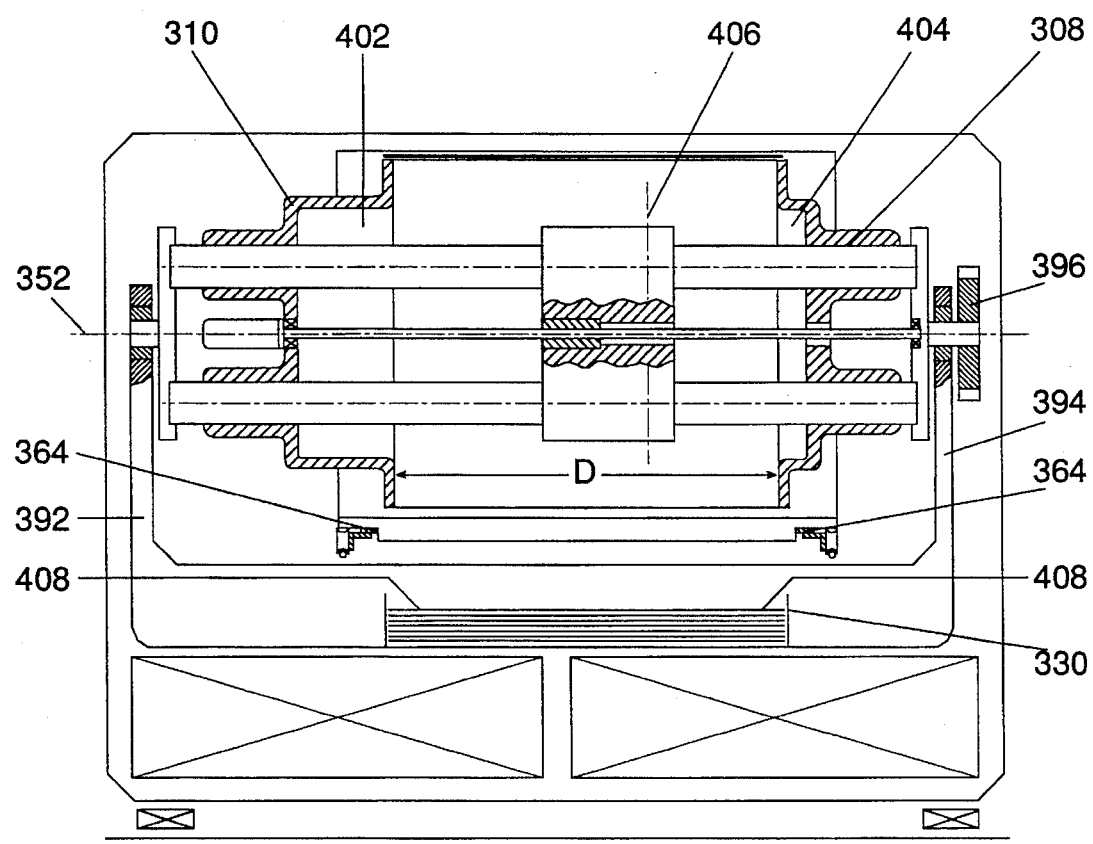
FIG. 19 is a partially cut away, front view, schematic, illustration of the apparatus of FIGS. 18A–18I.
Figure 20:
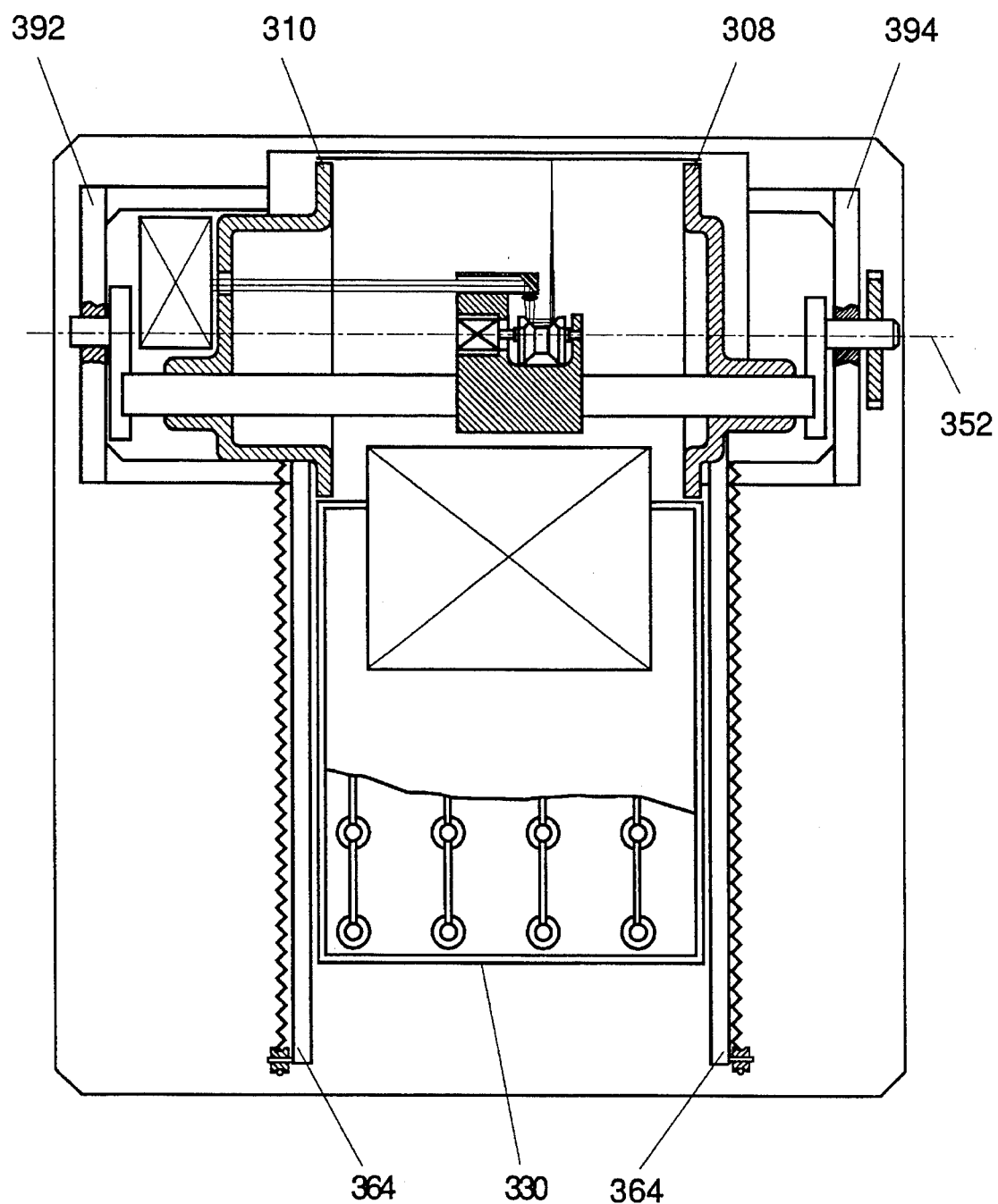
FIG. 20 is a cross sectional illustration of the apparatus of FIG. 18F, taken along the lines XX—XX of FIG. 18F.
Figure 21:
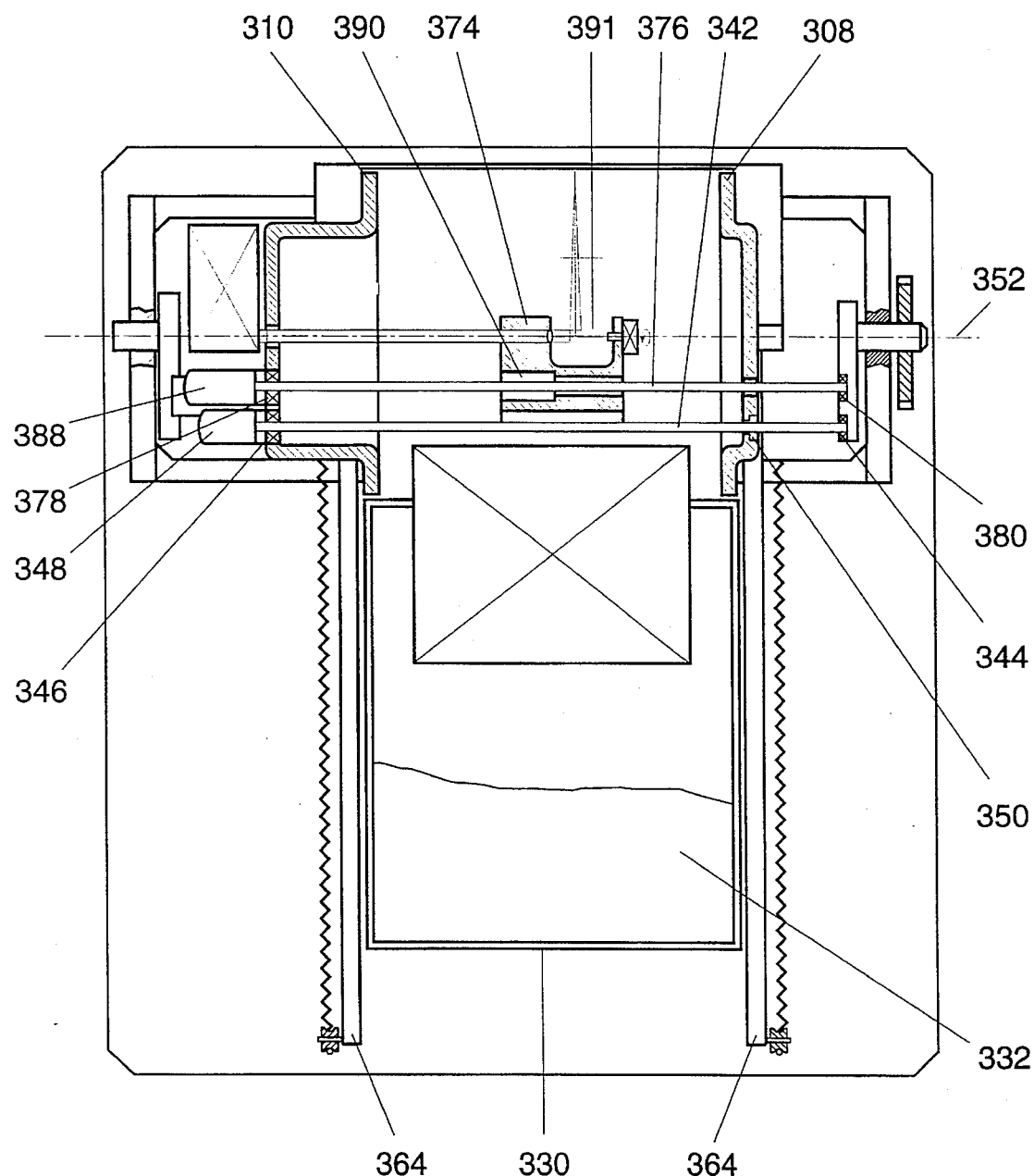
FIG. 21 is a cross sectional illustration of the apparatus of FIG. 18F, taken along the lines XXI—XXI of FIG. 18F.

The rotatable components, comprising discs 308 and 310, substrate 314, disc guiding rods 340 and scanning carriage 374, are rotatably mounted on the stationary, non-rotating base member 320 which defines a pair of preferably integrally formed upstanding members 392 and 394 (FIG. 19). Preferably, disc guiding rods 340 are fixedly associated with a driving wheel 396 which is rotatably mounted relative to upstanding member 394. Driving wheel 396 is operative to cause rotation of all the rotatable elements about the axis 352 and may be actuated by any suitable means such as an electric motor or electric gear motor.

A preferred configuration of discs 308 and 310 is now described with reference particularly to FIGS. 19–22A. As shown, the pair of discs 308 and 310 preferably have a generally circular outer perimeter and define scanning carriage receiving recesses 402 and 404 respectively. Typically, as shown, the scanning plane 406, in which the scanning beam rotates, is not symmetrically disposed relative to the body of the scanning carriage 374. Therefore, in the illustrated embodiment, recess 402 is larger than recess 404. Generally, the depths of the recesses are such that when the scanning carriage is fully seated in either of recesses 402 and 404, the scanning plane 406 is preferably located very close to a curved edge of the plate 322.

Discs 308 and 310 may be formed of any suitable material such as cast aluminum or any other suitable cast metal. The portions of the discs which require precision exceeding the precision of the casting process may be machined.

It is apppeciated that, although in the illustrated embodiment, the axis of potation of the discs 308 and 310 coincides with the scanning axis about which spinner 391 rotates, this need not be the case. According to an alternative embodiment, the axis of potation of the discs 308 and 310 is parallel to but does not coincide with the scanning axis 352.

Figure 18A:
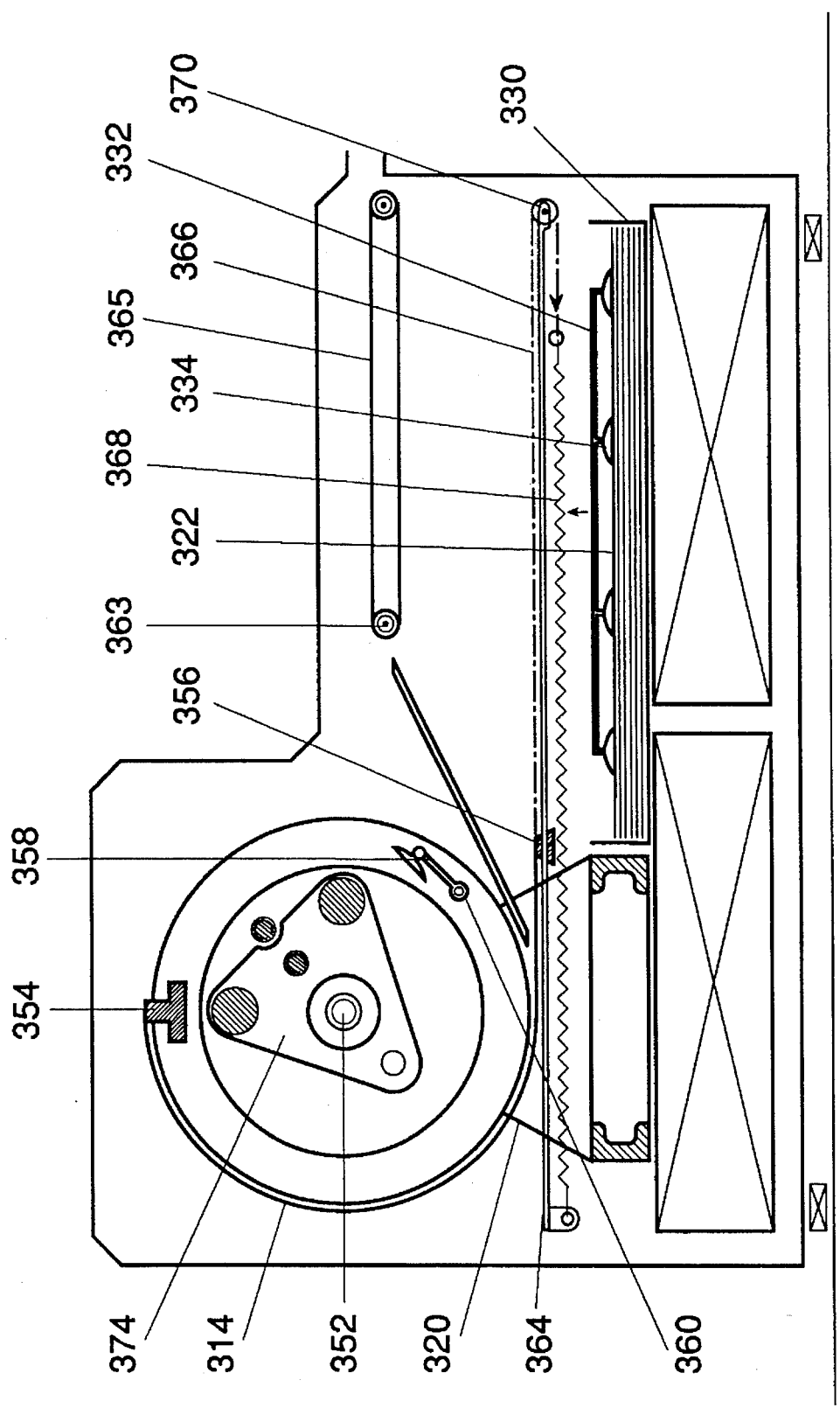
FIGS. 18A–18I are side view, schematic, illustrations of various stages of operation of the sheet scanning and sheet loading/unloading apparatus of FIG. 17.
Figure 18B:
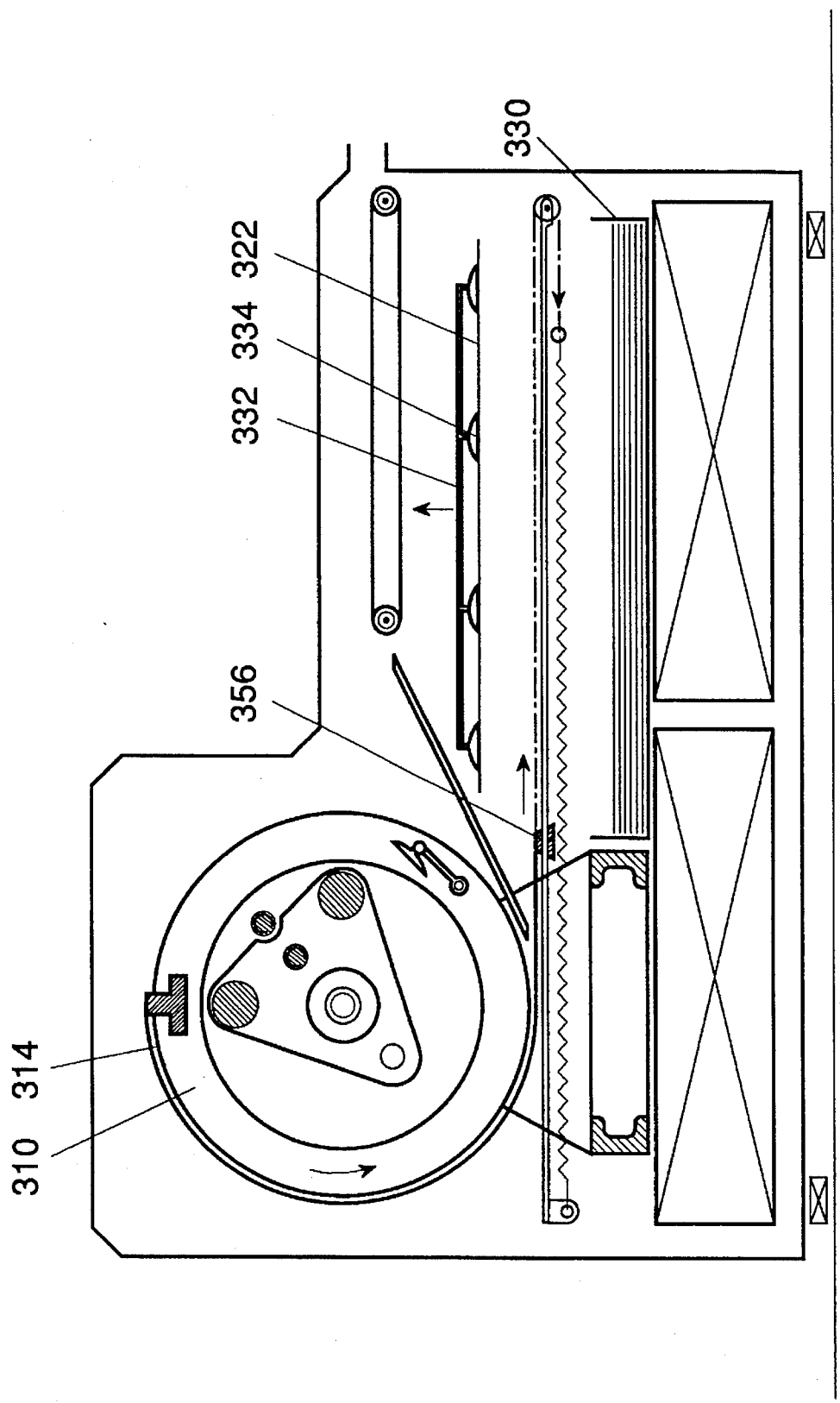

A detailed description of preferred stages of operation of the apparatus of FIGS. 17–22A is now provided with reference mainly to FIGS. 18A–18I. Initially, the plates to be scanned are stacked in container 330, emulsion side up. Discs 308 and 310 rotate about disc potation axis 352 in a first direction such as clockwise, in the sense of FIGS. 18A–18I, until they reach the position shown in FIG. 18A, in which the substrate 314 and substrate support element 356 have been distanced from the plate container 330 and from the plate pick-up device 332. Pick-up device 332 may now descend toward the container 330, and pick up the top plate 322, as shown in FIG. 18A.

Figure 18C:
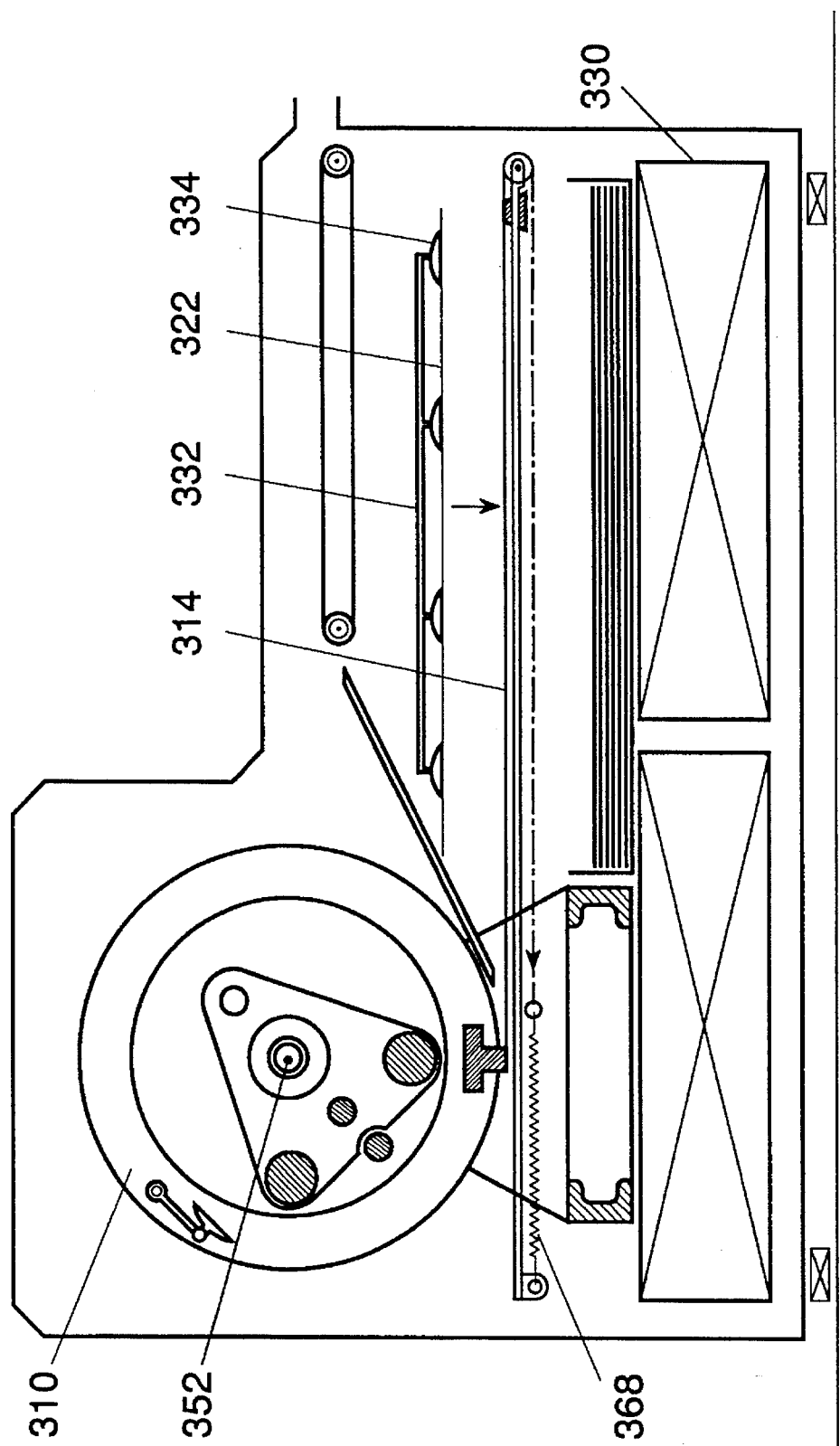
Figure 18D:
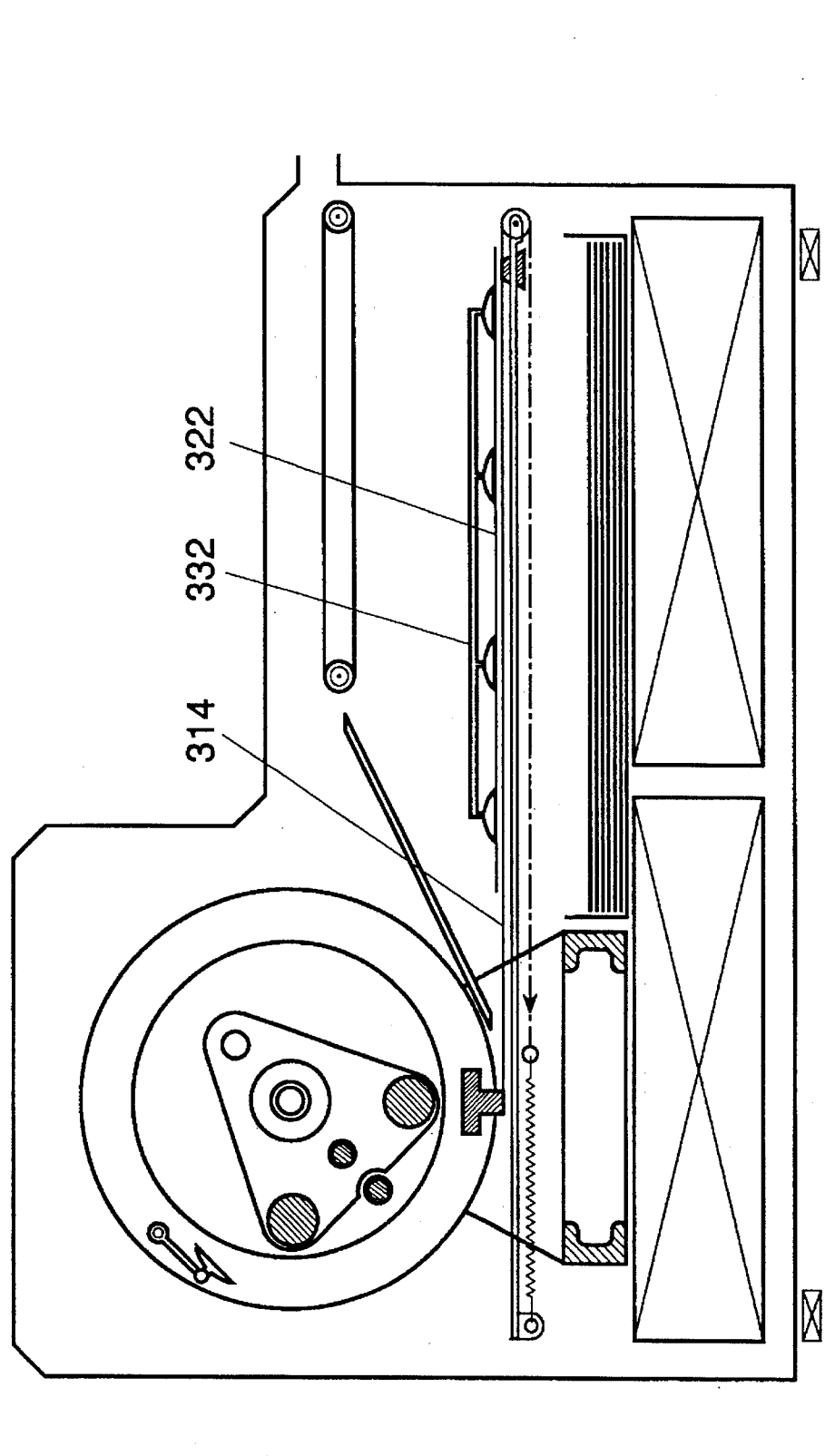
Figure 18E:
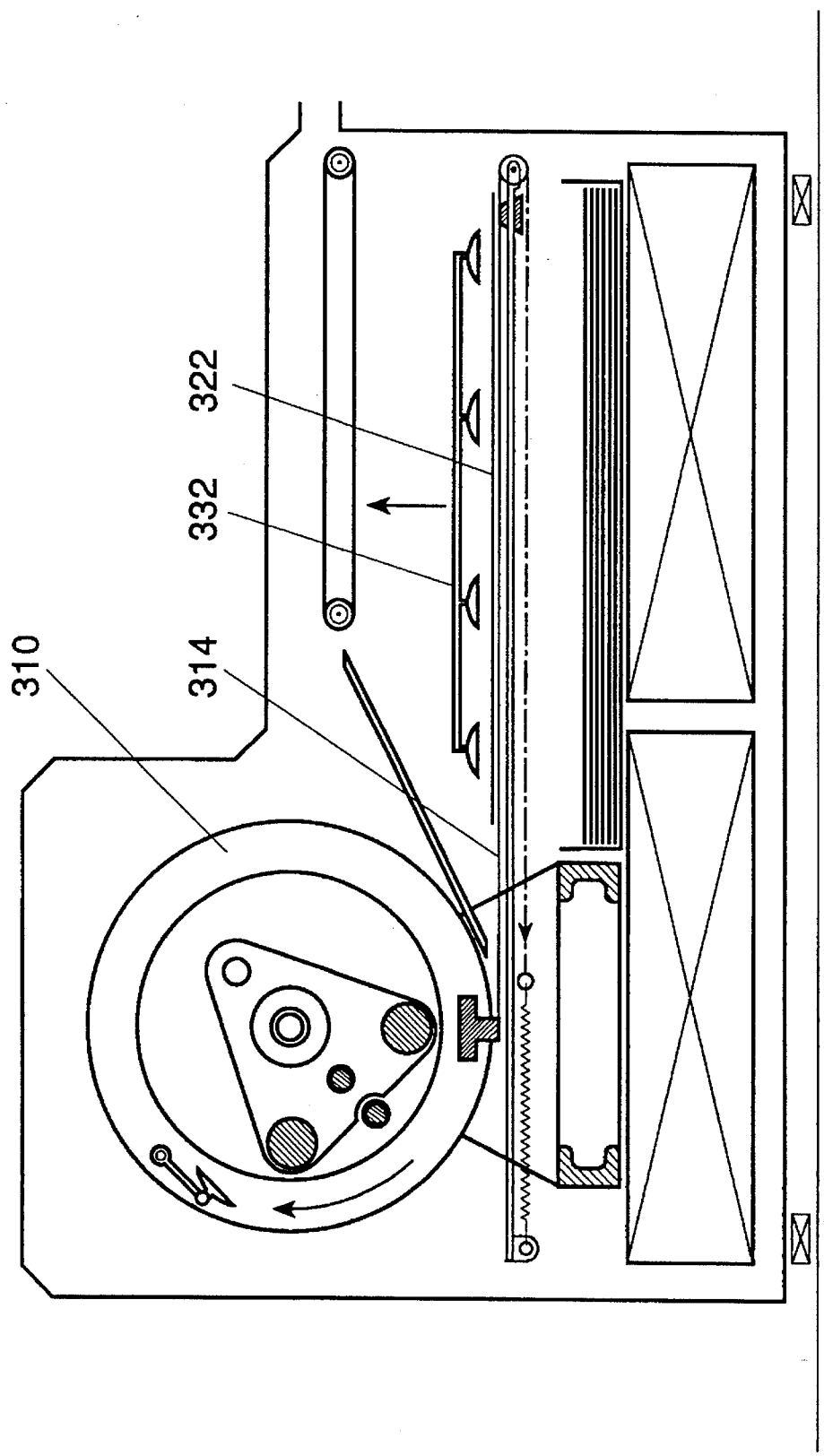

Discs 308 and 310 now rotate about disc rotation axis 352 in a second direction such as counterclockwise, and the substrate 314 is thereby unwound from discs 310 and slides to the right, in the illustrated embodiment, due to the contraction of springs 368, until substrate 314 is disposed under the elevated plate 322 and the springs 368 are in their fully contracted of released state, as shown in FIG. 18C. Pick-up device 332 now lowers the elevated plate 322 onto substrate 314, as shown in FIG. 18D.

According to a preferred embodiment, registration pins 414 (FIGS. 22A and 22B) are provided in substrate 314 to correspond to the registration holes normally provided in conventional offset plates. According to this embodiment, the motion of pick-up device 332 when lowering the elevated plate 322 has a horizontal vibratory component in order to ensure correct alignment of plate 322 as it is lowered onto substrate 314. Each registration pin 414 preferably is tapered at its top so as to allow the pick-up device 332 to automatically position the plate such that the registration holes will be sufficiently aligned, relative to the tapered tops of the registration pins 414, to drop the plate 322 onto the substrate 314.

Figure 22A:
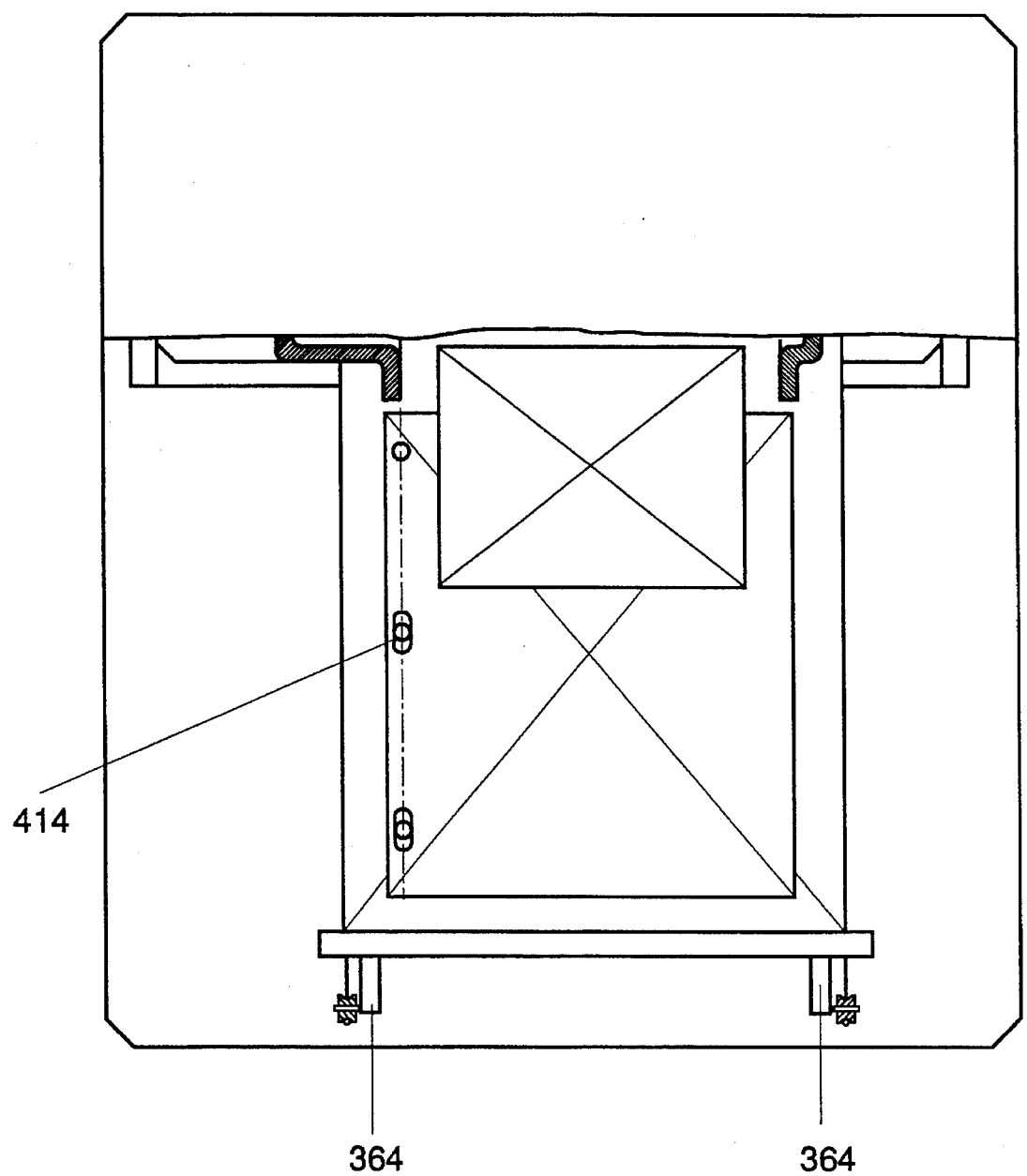
FIGS. 22A and 22B are cross sectional illustrations of the apparatus of FIG. 18I, taken along the lines XXII—XXII of FIG. 18I, having registration pins and holes in three different locations of the substrate and sheet respectively.
Figure 22B:
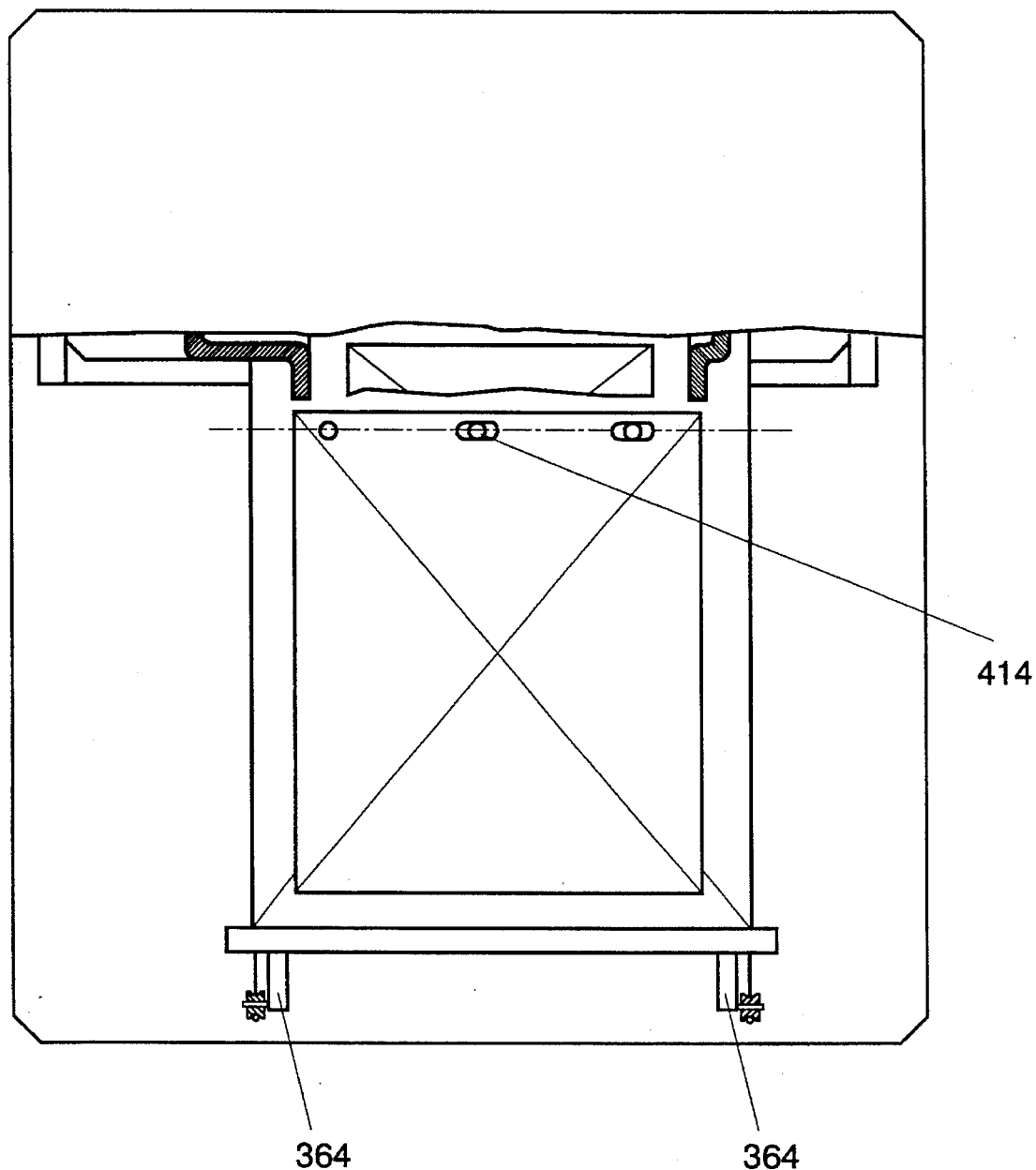

Registration pins may be provided along the curved dimension of the substrate, as illustrated in FIG. 22A. Alternatively, registration pins may be provided along the axial dimension of the substrate, at either end thereof, as illustrated in FIG. 22B.

Once the elevated plate 322 has been lowered onto substrate 314, pick-up device 332 is raised, as shown in FIG.

18E. Discs 308 and 310 are now rotated in a first direction such as clockwise by driving wheel 396 (FIG. 19), thereby curving the substrate 314 and associated plate 322 around the annular edge surfaces of discs 308 and 310, as shown in FIG. 18F.

Figure 18F:
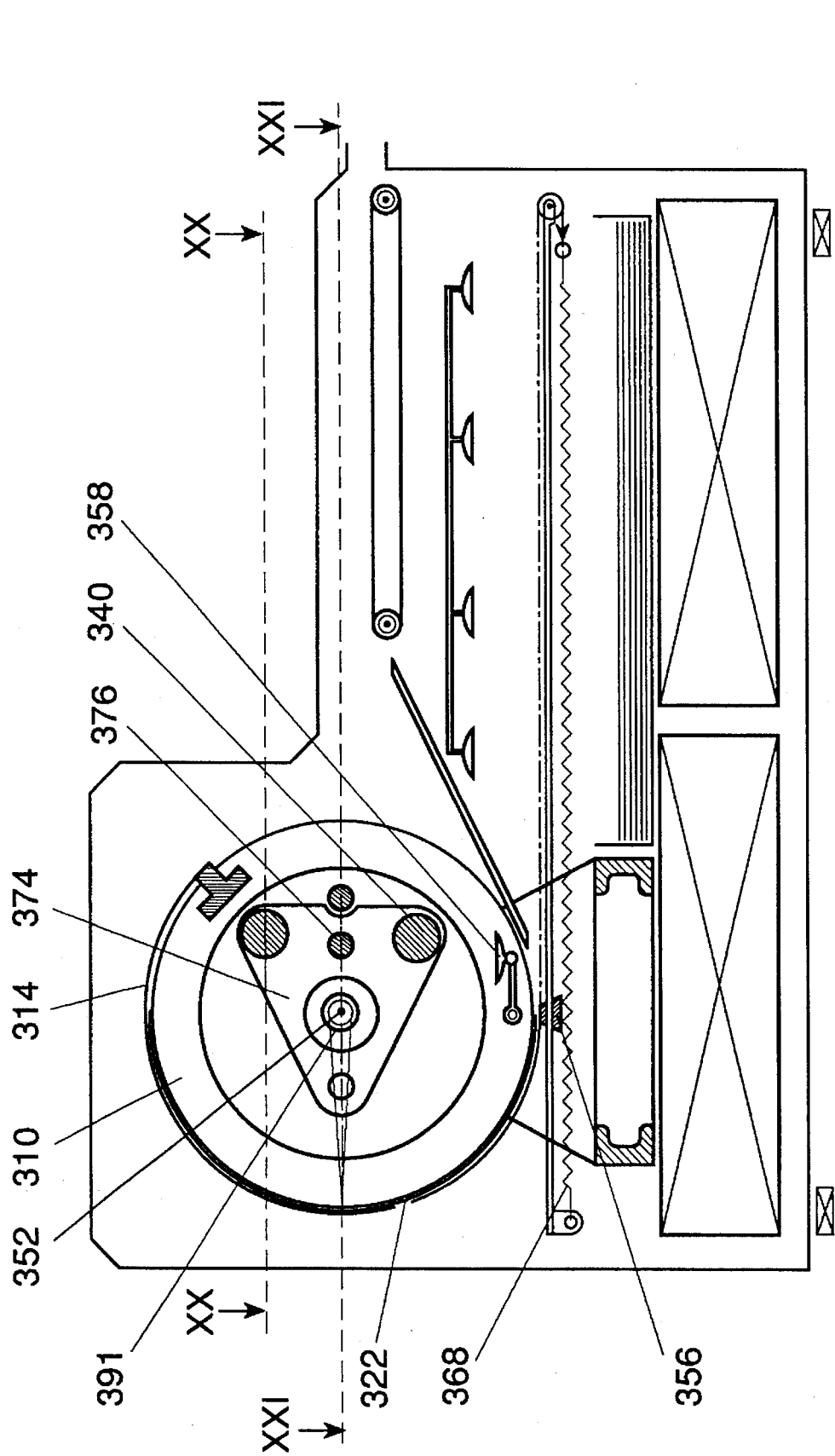

Due to the rotation of discs 308 and 310, springs 368 are fully extended in the orientation of FIG. 18F, and substrate support element 356 is in its extreme left position, generally tangential to discs 308 and 310. In FIG. 18F, the plate 322 is arranged in a generally cylindrical orientation, emulsion side inward. The plate 322 is, therefore, ready for the scanning process.

To scan the plate, the scanning carriage 374 is moved by lead screw 376 along the scanning axis 352, guided by guiding rods 340. Simultaneously, the spinner 391 rotates and provides a modulated scanning beam which passes in a suitable pattern of motion, such as spiral motion or stepwise circular motion, over substantially the entire inner surface of plate 322.

Figure 18G:
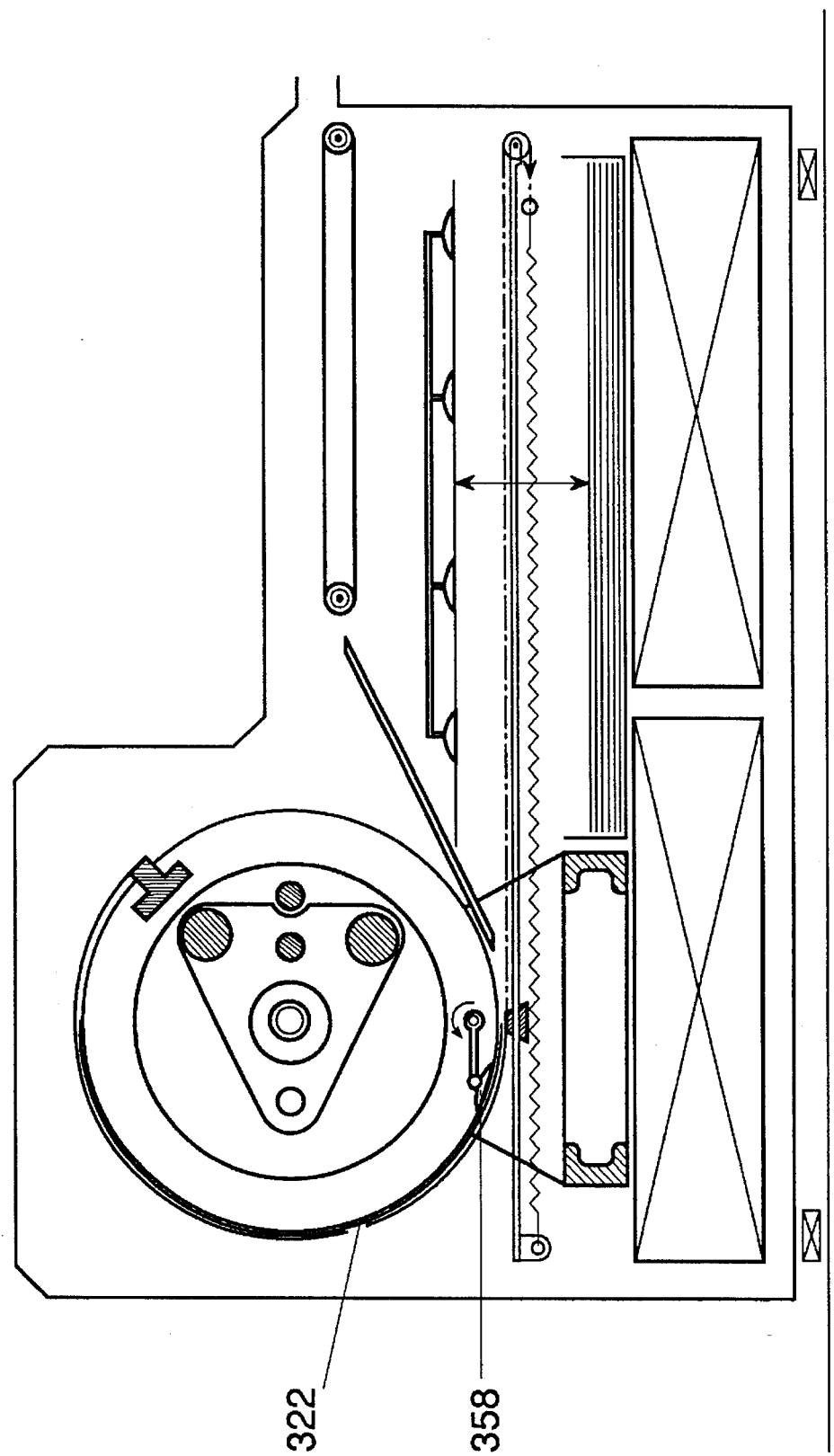

Duping scanning, vacuum cups 358 are positioned so as not to interfere with the scanning, as shown in FIG. 18F. When scanning has been completed, vacuum cups 358 rotate in a suitable direction about their pivot axis, such as counterclockwise, and attach to the radially inward surface of the scanned plate 322, as shown in FIG. 18G.

Figure 18H:
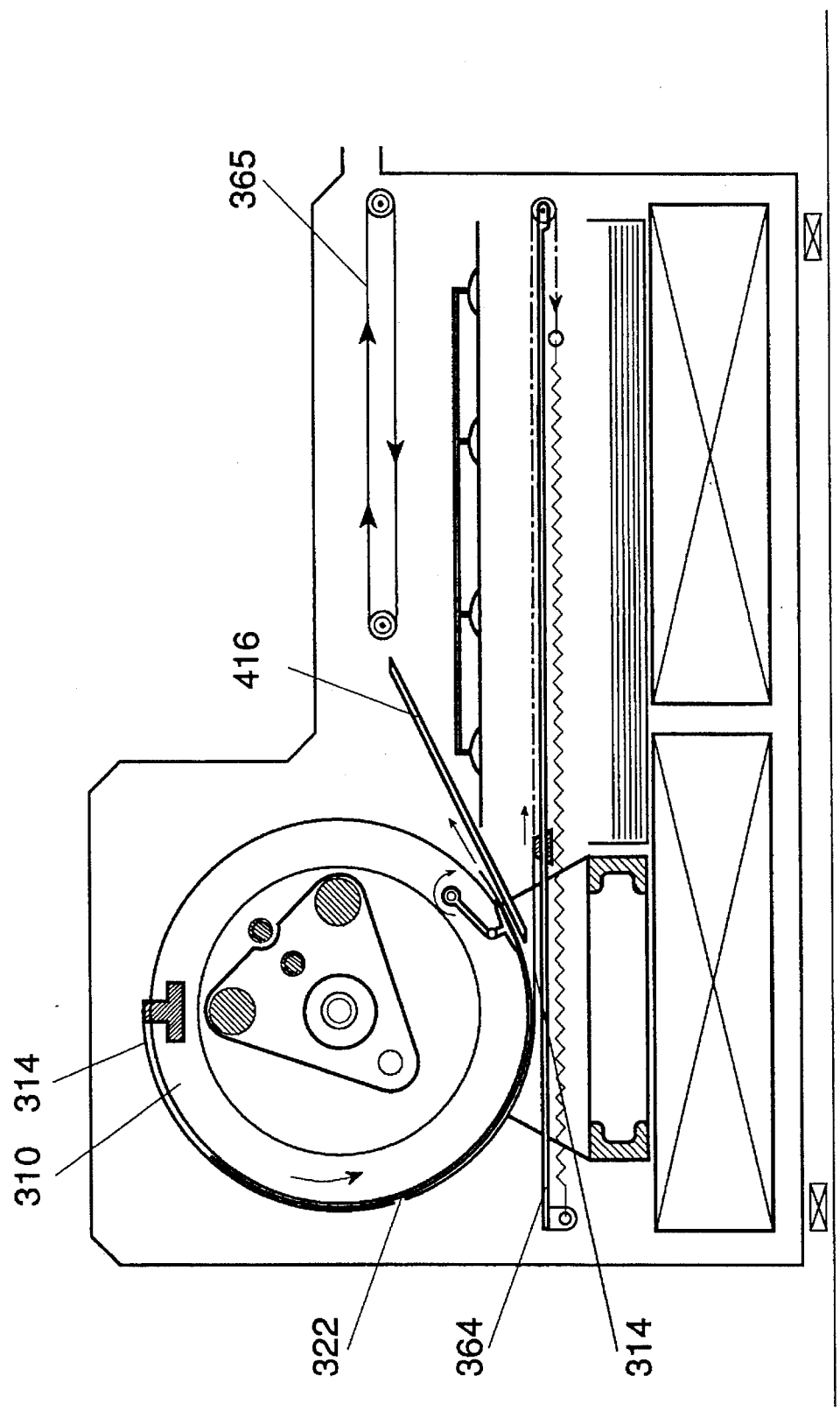

Discs 308 and 310 rotate in a suitable direction such as counterclockwise until they reach the position shown in FIG. 18H. In FIG. 18H, it is seen that as a result of the counterclockwise rotation of the discs, the substrate 314 slides toward the right along guiding rails 364 until it becomes detached from discs 308 and 310. The scanned plate 322 is caused, initially by the operation of vacuum cups 358 and thereafter by rotation of the discs 308 and 310, to slide along a suitably positioned inclined plane 416 onto conveying belt 365.

Figure 18I:
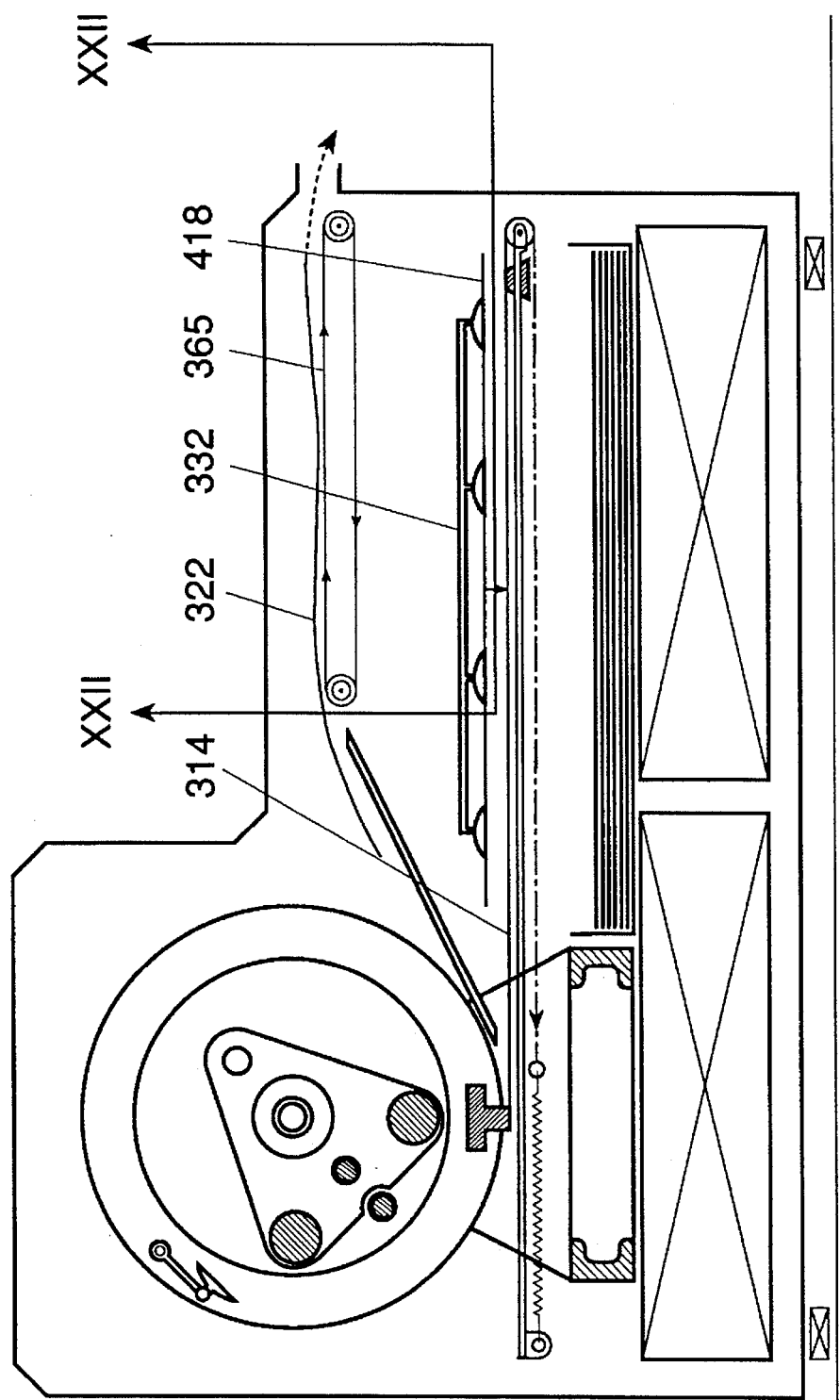

As shown in FIG. 18I, plate 322 moves along conveying belt 365 to the right, preferably directly to a processing unit (not shown) such as a Mercury plate processor, commercially available from Hotsell, Leeds, England. The substrate 314 continues sliding rightward, in the illustrated embodiment, until it reaches a position in which an additional plate to be scanned 418 may be loaded onto it. Preferably, as seen, plate 418 has already been picked up by pick-up device 332 and is ready to be lowered onto the substrate 314, thereby allowing substantially continuous operation of the apparatus of FIGS. 17–22B.

Figure 23:
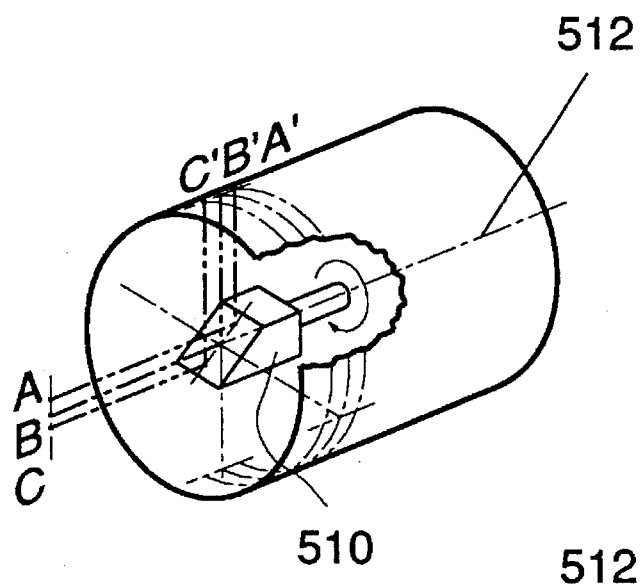
FIGS. 23–25 respectively illustrate three rotational orientations of a state of the art spinner which provides a plurality of beams unsuitable for scanning a plurality of locations within a sheet to be scanned arranged in a cylindrical configuration.
Figure 24:
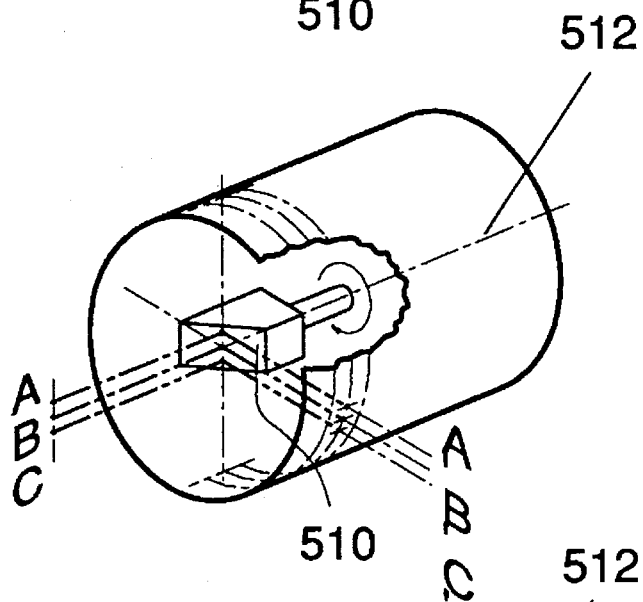

Reference is now made generally to FIGS. 26A–39 which illustrate spinners constructed and operative in accordance with alternative embodiments of the present invention, any of which are suitable for use in conjunction with the scanning apparatus of FIGS. 2–16 and with the scanning apparatus of FIGS. 17–22B. First, reference is briefly made to FIGS. 23–25 which illustrate a prior art spinner 510 which is generally unsuitable for simultaneously deflecting a plurality of scanning beams. In FIG. 23, spinner 510 is in a first orientation relative to the drum. Three vertically spaced beams, A, B, and C, are shown impinging upon the spinner 510. The images of the beams A, B and C on the inner surface of the drum are indicated as A', B' and C' respectively. In FIG. 24, spinner 510 is in a second orientation relative to beams A, B and C, rotated about the axis of symmetry 512 of the drum by 90 degrees relative to the first orientation of the spinner shown in FIG. 23. As shown in FIG. 24, the relative positions of A', B' and C' have been changed.

Figure 25:
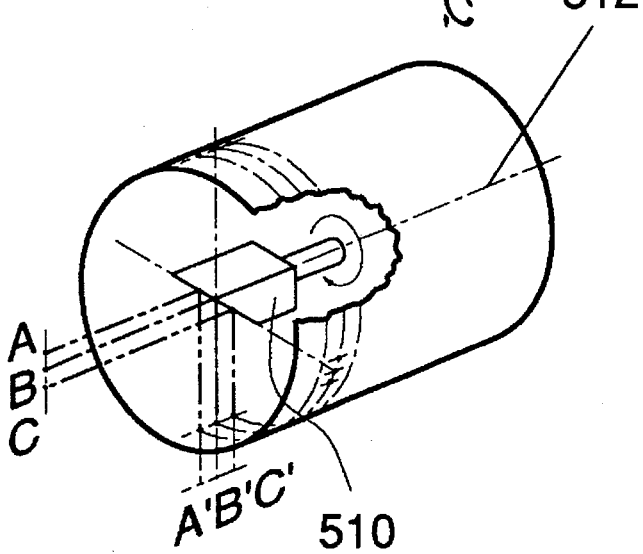

In FIG. 25, spinner 510 is in a third orientation relative to beams A, B and C, rotated about axis 512 by 90 degrees relative to the second orientation of the spinner shown in FIG. 24. As shown in FIG. 25, the relative positions of A', B' and C' have altered again. In other words, the circumferential paths of the images of parallel beams impinging upon the state of the art spinner 510 are not parallel and the relative order of the paths of the images is reversed each time the state of the art spinner 510 completes half a turn about the axis 512.

Reference is made to FIGS. 26A and 26B which illustrate two orientations of internal drum scanning apparatus in which the spinner 510 is replaced by a spinner 514 having a single mirrored surface 516 and arranged such that the axis of symmetry 512 defined by the generally cylindrical configuration of a plate 515 to be scanned lies in the plane of a single mirrored surface 516.

The spinner 514 is capable of reflecting multiple beams without changing their mutually parallel orientation, as can be seen from consideration of FIGS. 26A and 26B. However, the theoretical maximum value for the duty cycle of such a spinner is only 50%, because only one side of the mirror is reflective.

The duty cycle (scanning efficiency) of a scanning system is the ratio between the time, in the course of a single rotation of the spinner, which is actually utilized for scanning, and the total time required for the spinner to complete a single rotation.

Spinners having a single mirrored surface and which rotate about an axis which lies in the plane of the single mirrored surface are described in the above-referenced publication by Marshall, particularly pages 227–230, the disclosure of which is incorporated herein by reference.

Figure 27A:
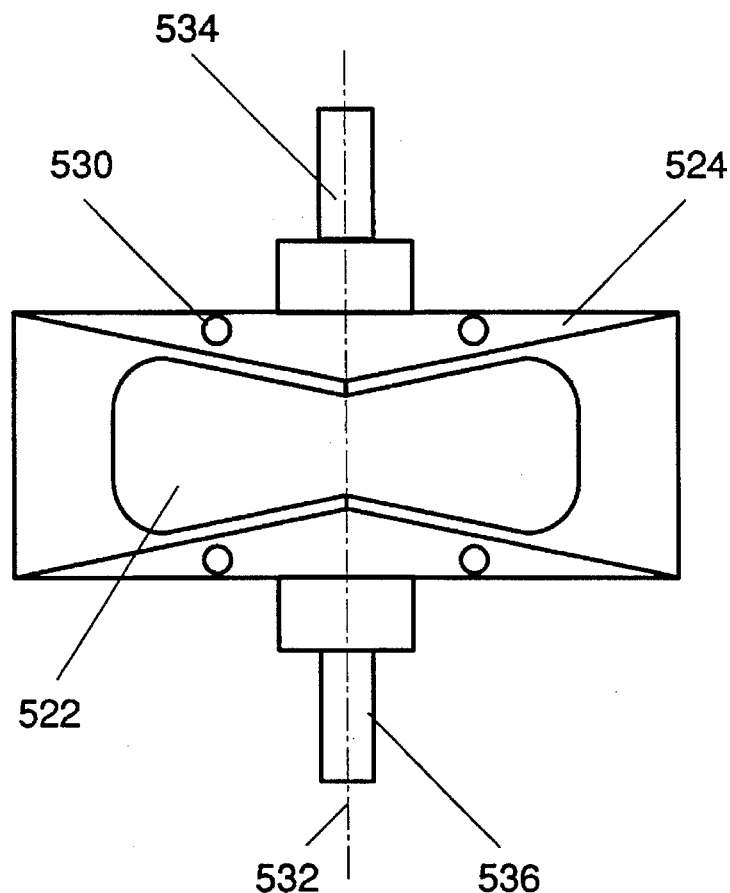
FIG. 27A is a top view, schematic, illustration of a spinner constructed and operative in accordance with a second alternative embodiment of the present invention.
Figure 27B:
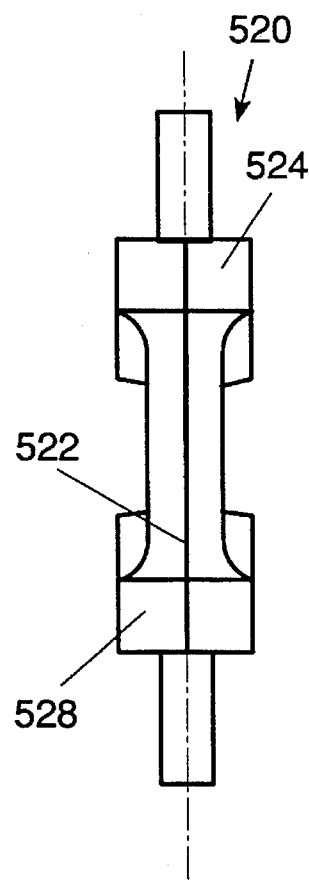
FIG. 27B is a front view, schematic, illustration of the spinner of FIG. 27A.
Figure 27C:
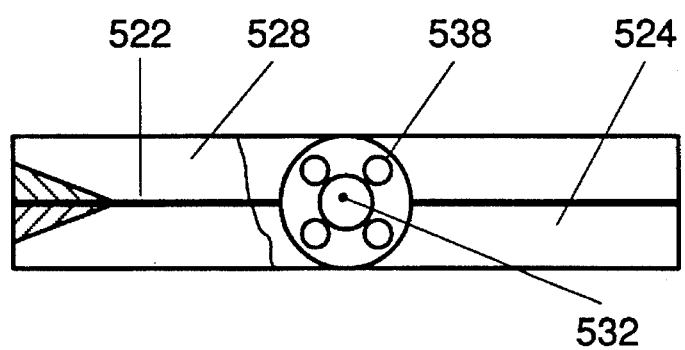
FIG. 27C is a side view, schematic, illustration of the spinner of FIG. 27A.

Reference is now made to FIGS. 27A–27C which illustrate a spinner 520 comprising a very thin double mirror or pellicle 522, formed of a suitable material such as beryllium foil and being approximately 10–25 microns thick. Pellicle 522 may be supported by a rigid support member comprising a top support portion 524 and a bottom support portion 528 which are fixedly associated with pellicle 522 by any suitable means such as screws 530. Rotation of pellicle 522 and support members 524 and 528 about axis 532 is provided by elongate axle members 534 and 536 which are connected to top and bottom mirror support portions 524 and 528 respectively by suitable means such as screws 538.

Theoretically, the duty cycle of scanning apparatus constructed and operative in accordance with the embodiment of FIGS. 27A–27C is double that of the spinner of FIGS. 26A and 26B. However, in practice, the surface of the mirror may be distorted in the course of rotation due to aerodynamic forces. Consequently, the optical quality of spinner 520 may be relatively low. To improve the optical quality of spinner 520, rotation speed may be reduced by providing a large number of writing beams as in the scanning device described in the above-referenced document by L. Hornbeck.

Figure 28C:
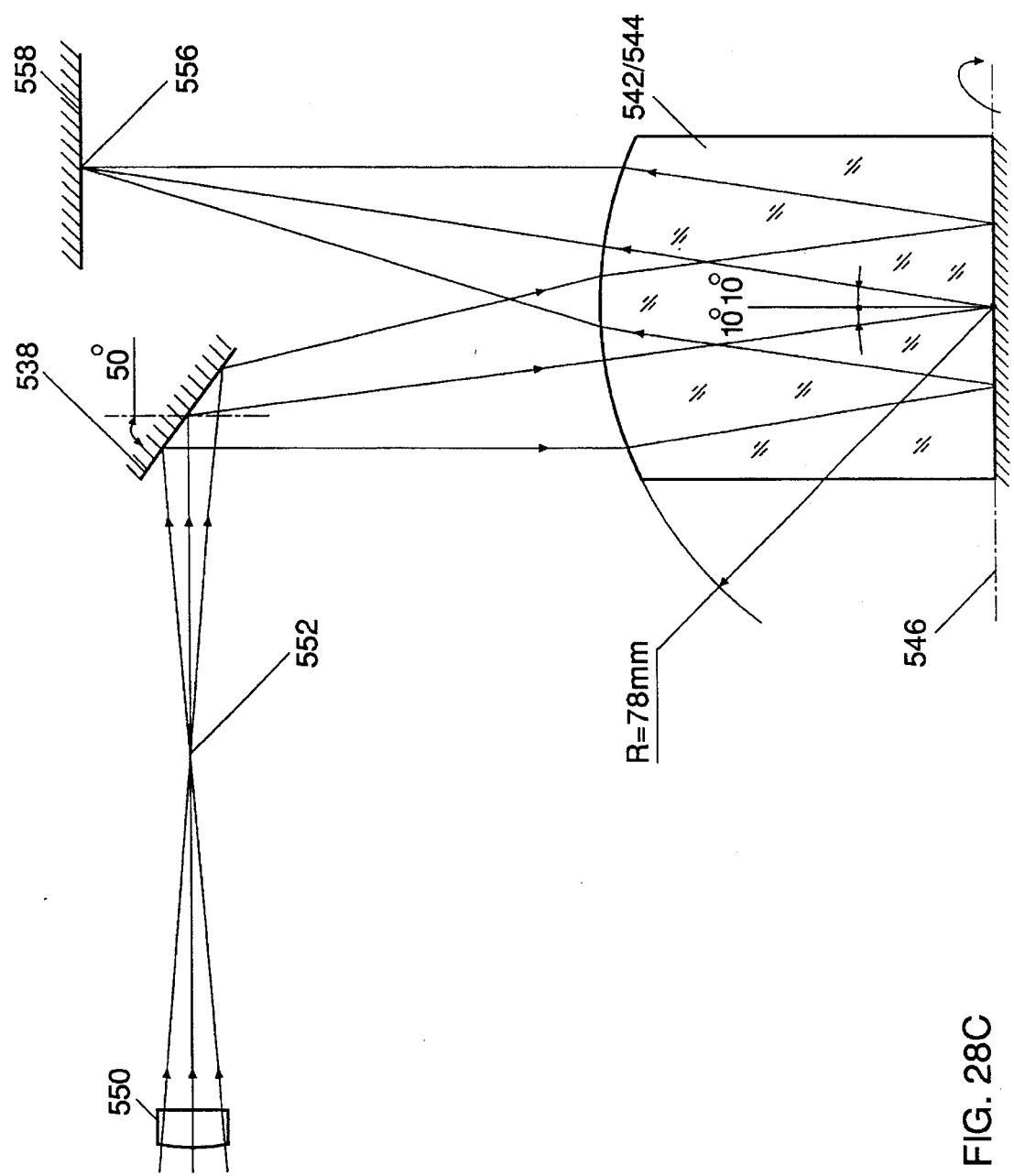
FIG. 28C is a schematic illustration of typical dimensions for the high duty cycle spinner of FIGS. 28A–28B suitable for scanning sheets whose curved dimension is 1050 mm using a sheet wrap angle of 270 degrees.

Reference is now made to FIGS. 28A–28C which illustrate scanning apparatus including a spinner which is a variation of the thin-mirror spinner of FIGS. 27A–27C. The spinner of FIGS. 28A–28C comprises a thin mirror 540 supported by two transparent truncated half-spheres 542 and 544 which are arranged on both sides of the thin double mirror 540 so as to form, together, a rotating sphere mounted on bearings 541. Mirror 540 and associated half-spheres 542 and 544 are rotated by a motor 547 about an axis 546 which lies in the plane of the mirror 540. Mirror 540 may be manufactured by any suitable method such as vacuum deposition or sputtering. The half-spheres 542 and 544 may be formed of any suitable material such as glass or acrylic.

The scanning apparatus of FIGS. 28A–28C also comprises a focussing lens 550 such as Cat. No. 01 LPX 110, commercially available from Melles Griot, having a focal plane 552, and a folding mirror 554 such as Cat. No. 02 MPG 007, commercially available from Melles Griot. The folding mirror 554 may be mounted at an angle of approximately 50 to 55 degrees relative to the normal to axis 546 and may be positioned at any point intermediate the focussing lens 550 and the spherical spinner.

Operation of the scanning apparatus of FIGS. 28A–28C may be as follows: A modulated light beam 555, traveling parallel to the axis 546 about which the spinner rotates, is provided by a conventional optics unit (not shown) and is focussed by lens 550 at its focus 552. The focussed spot is then reimaged by the spherical spinner, at a suitable ratio such as a 1 to 1 ratio, to a scanning spot 556 on a plate 558 to be scanned which may be supported in any suitable manner such as by a substrate 559, as in the embodiment of FIGS. 17–22B above. The spherical spinner rotates about spinning axis 546. During this rotation, the beam is reflected by the reflecting surface of mirror 540. The scanning spot passes over the surface to be scanned.

EXAMPLE

Sample detailed computations of various parameters useful in constructing the scanning apparatus of FIGS. 28A–28C are as follows:
Scanned area (mm×mm): 1050×1050
Resolution (points/inch): 1000
Pixel to pixel distance (micron): 25
Dot overlap: 50%
Scanning dot size (micron): 38

A square scanning area is chosen whose length corresponds to the longer plate dimension, such as a 1050 mm×1050 mm square. Any other suitable scanning area may be chosen instead. The wrap angle (active scanning angle) is chosen to be 270 degrees, so that the scanned length, which is equal to the sheet length, is ¾ of the circumference, because $270/360=3/4$. Since ¾ of the circumference must be 1050 mm, the circumference must be 1400 mm. The corresponding diameter of plate supporting discs such as discs 308 and 310 of the embodiment of FIGS. 17–22B and discs 36 of the embodiment of FIGS. 2–16, is 446 mm and the corresponding radius is 223 mm.

If the focal length of lens 550 is 50 mm and the lens magnification of the spherical spinner is unity (1), then the angles of the various components of the apparatus of FIGS. 28A–28B may be as indicated on FIG. 28C. Since the reflection is performed at a 10 degree angle, the distance between the image and principal plane of the spherical lens is 223 mm/sin 80°=228 mm, and the focal length of the spherical spinner is 114 mm. In the preceding discussion, the numerical values for the focal length and for the diameter are rounded up to the next integer.

The spinner or spherical lens may be formed of any suitable material such as BK7 glass. Using formulas provided in pages 1–10 of Catalog 4 obtainable from Melles Griot Corporation, the radius for a BK7 sphere may be computed to be 78 mm.

Final system parameters and results of paraxial ray tracing, computed by use of the Super OSLO program, commercially available from Sinclair Optics, Rochester, N.Y., USA, are appended hereto and are referenced Appendix A.

Figure 29A:
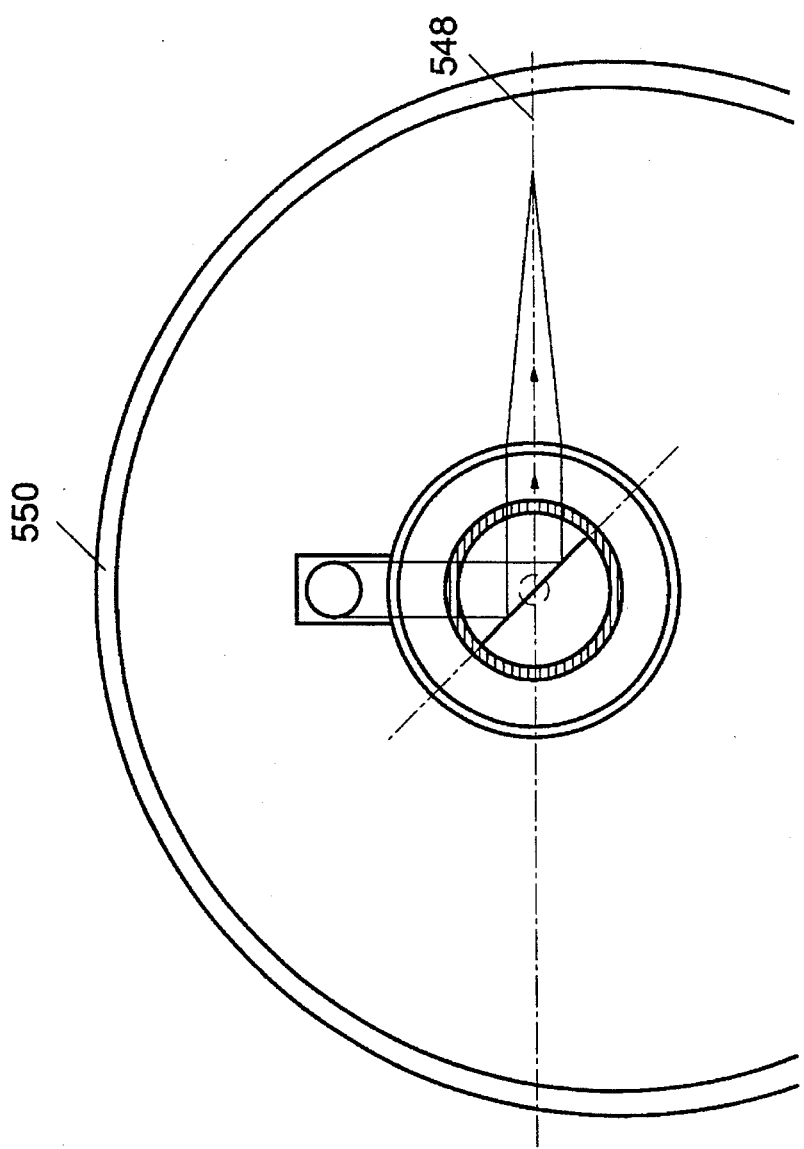
FIG. 29A is a cross sectional illustration of a spinner constructed and operative in accordance with a fourth alternative embodiment of the present invention, the cross section taken perpendicular to the axis of rotation of the spinner.
Figure 29B:
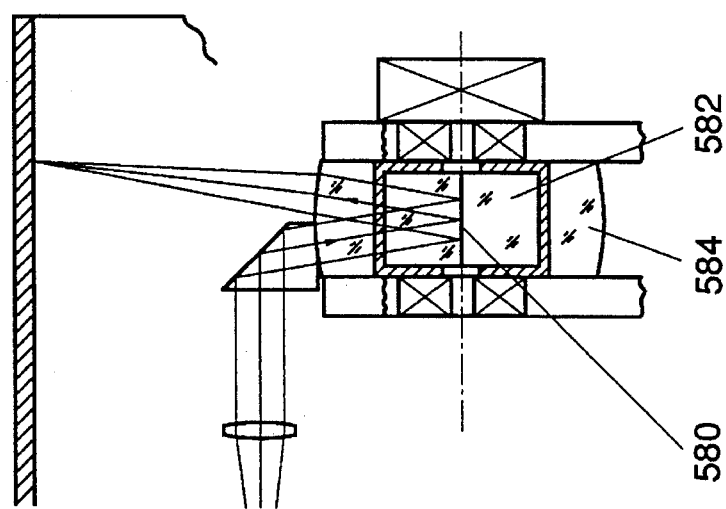
FIG. 29B is a cross sectional, schematic, illustration of the spinner of FIG. 29A, the plane of the cross section including the axis of rotation of the spinner.

Reference is now made to FIGS. 29A–29B which illustrate a multibeam spinner constructed and operative in accordance with another preferred embodiment of the invention in which a thin double sided mirror or pellicle 580 is provided within a rotating generally cylindrical transparent element 582 which may be formed of any suitable transparent material such as glass. Whereas the pellicle of FIGS. 28A–28C is circular due to the generally spherical configuration of the associated transparent element, the pellicle of FIGS. 29A and 29B is rectangular due to the generally cylindrical configuration of the associated transparent element 582.

The cylinder 582 is disposed interiorly of and spaced from a static transparent, hollow and generally cylindrical element 584. The interior of cylindrical element 584 is filled with an index matching liquid having a refractive index which is typically generally equal to the refractive index of cylinder 582. A suitable liquid is Formula Code 5040, commercially available from Cargille Laboratories Inc., Cedar Grove, N.J., USA. The index matching fluid serves to provide optical communication between the spherical hollow element 584 and the inner cylinder 582.

Reference is now made to FIGS. 30–33 which illustrate a further embodiment of a spinner 600 constructed and operative in accordance with a preferred embodiment of the present invention. The spinner 600 comprises a plurality of facet arrays, such as a pair of facet arrays 602 and 604. Each facet array comprises a pair of facet surfaces 606 and 608 arranged at an angle of 90 degrees from one another such that an imaginary line of intersection 609 between the facets 606 and 608 perpendicularly intersects the axis 610 of the spinner. In the illustrated embodiment, the angles $alpha_1$ and $alpha_2$ between respective facets 606 and 608 and the axis 610 of the spinner are each 45 degrees, however this need not be the case. Due to engineering considerations, facets 606 and 608 do not intersect in practice and instead a connecting surface 612 is provided therebetween.

According to a preferred embodiment of the invention, the number of facet arrays exceeds two, as shown and described in detail below. As the number of facet arrays increases, the segment or azimuthal portion of the generally cylindrical surface to be scanned by each of the facet arrays decreases.

Figure 30:
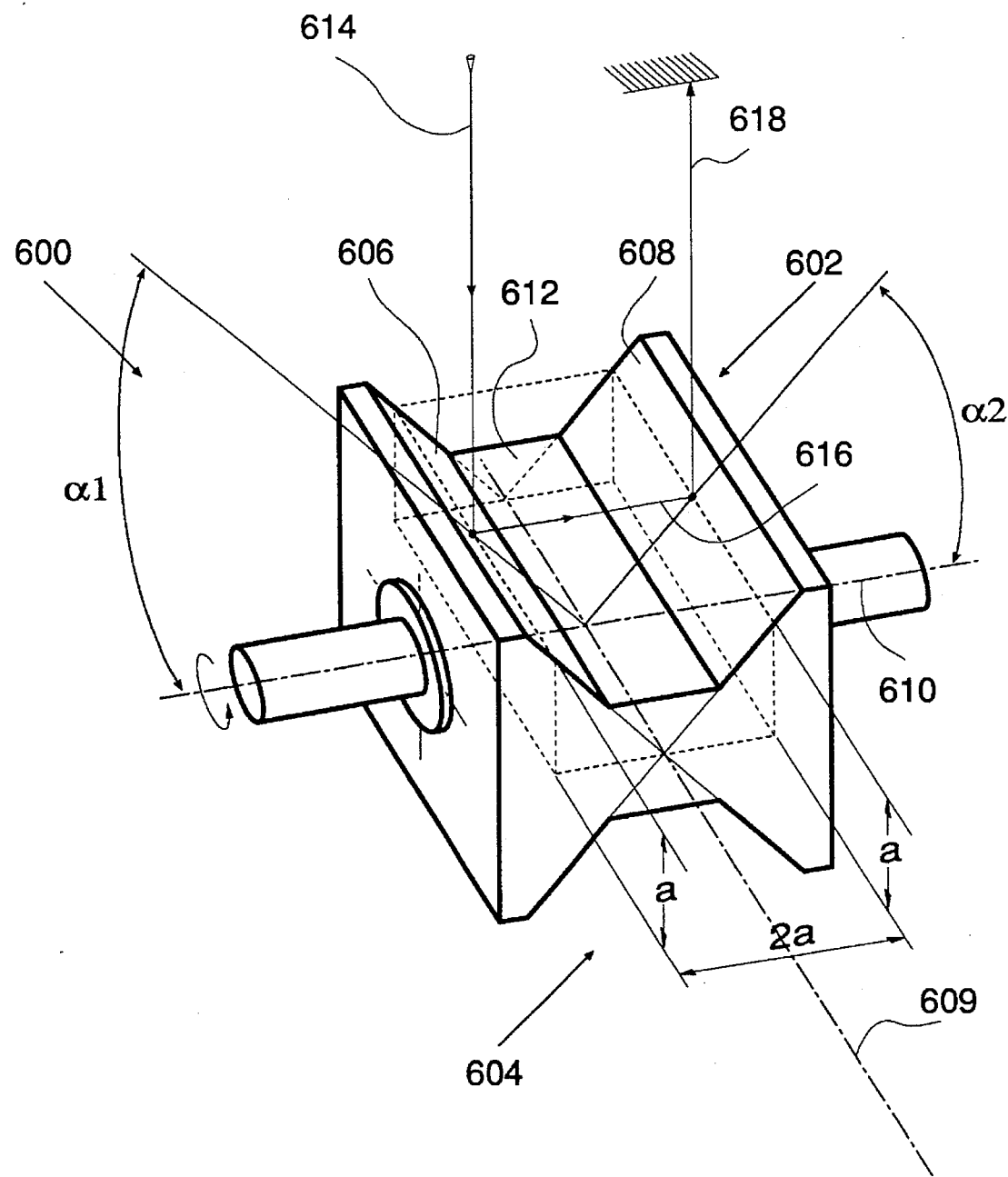
FIGS. 30–33 are optical diagrams of a high duty cycle spinner having two facet arrays and being constructed and operative in accordance with a preferred embodiment of the present invention.
Figure 31:
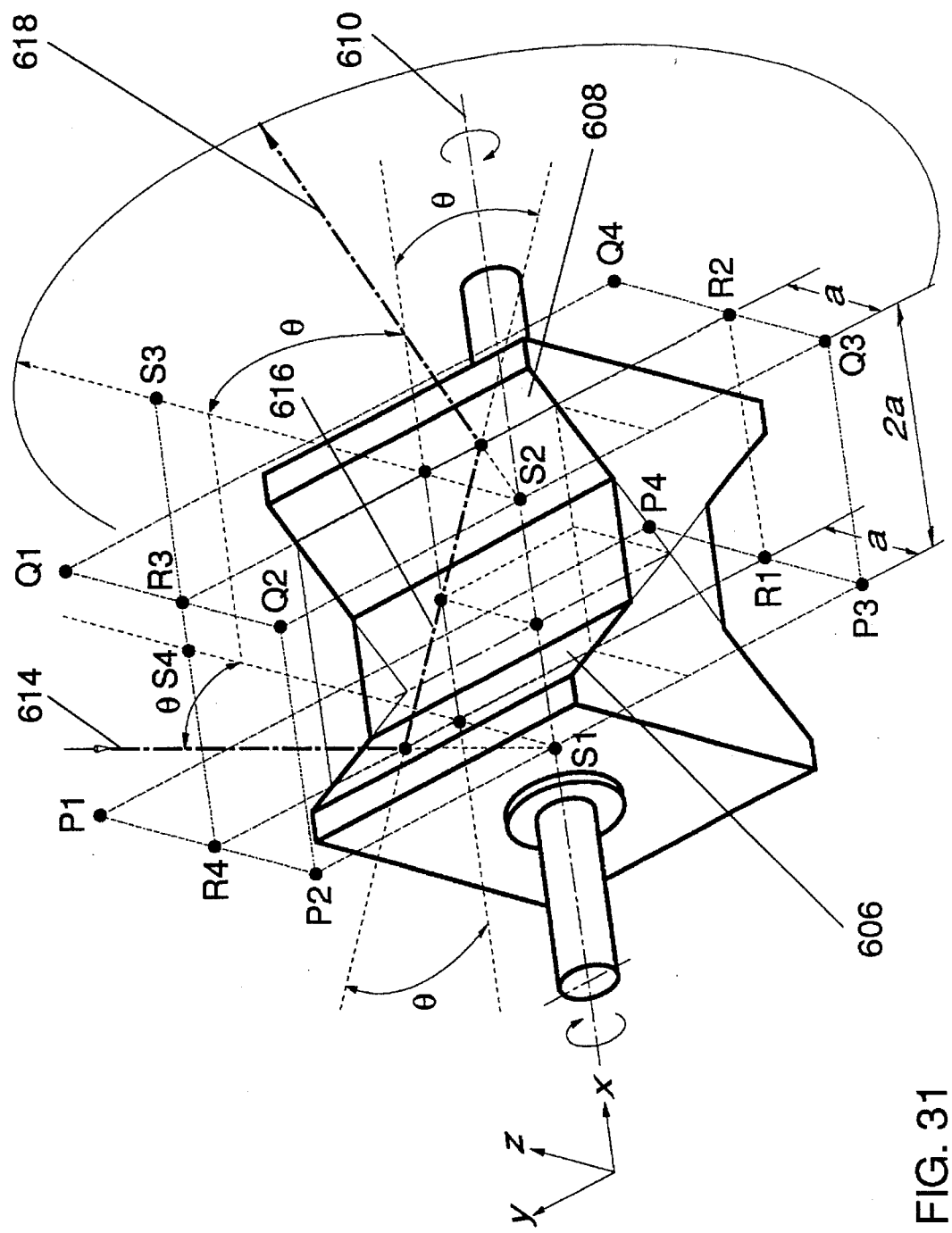

Reference is now made to FIG. 31 which illustrates rotation of the spinner about axis 610 by an angle theta relative to the position of the spinner in FIG. 30.

As shown in FIG. 30 a stationary input beam 614 impinges upon facet 606. A beam 616 is reflected from facet 606 toward facet 608. An output beam 618 is reflected from facet 608 toward the plate.

In FIG. 31, four planes P, Q, R and S are defined by points P1, P2, P3 and P4; Q1, Q2, Q3 and Q4; R1, R2, R3 and R4; and S1, S2, S3 and S4, respectively. The stationary incident beam 614 remains in plane P throughout the rotation of the spinner. As the spinner rotates by an angle theta about axis 610, as seen by comparing FIGS. 30 and 31, beam 614, which is stationary, forms an angle theta with plane S, because plane S is perpendicular to facets 606 and 608 and rotates with the spinner. Beam 616 remains in plane R and rotates by an angle theta relative to axis 610. Output scanning beam 618 remains in plane Q and forms an angle theta with plane S. Therefore, the total scanned angle between input beam 614 and output beam 618 is two theta. For example, as shown in FIG. 37C, for a 45 degree rotation angle of the spinner, a 90 degree scanned angle is obtained.

Figure 32:
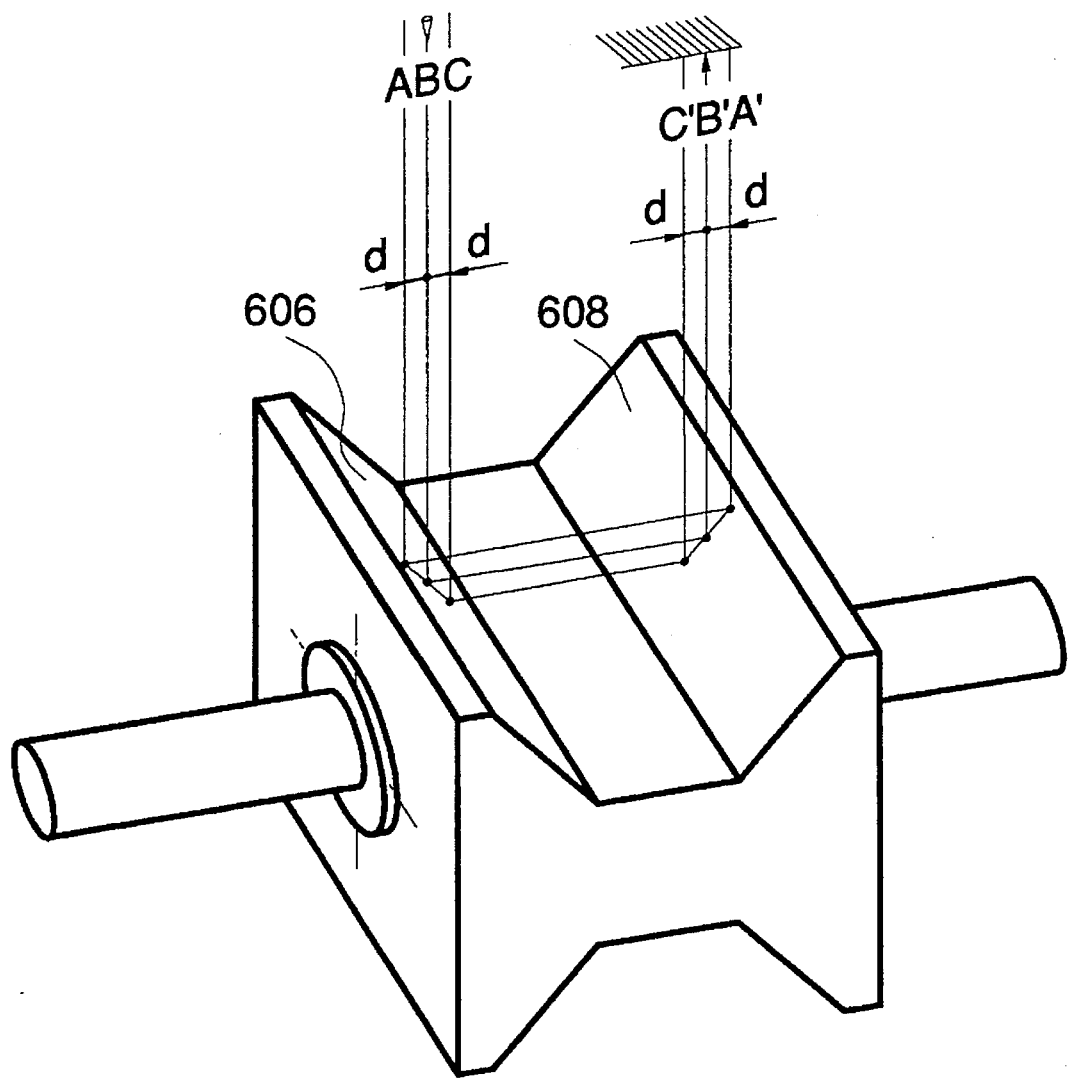
Figure 33:
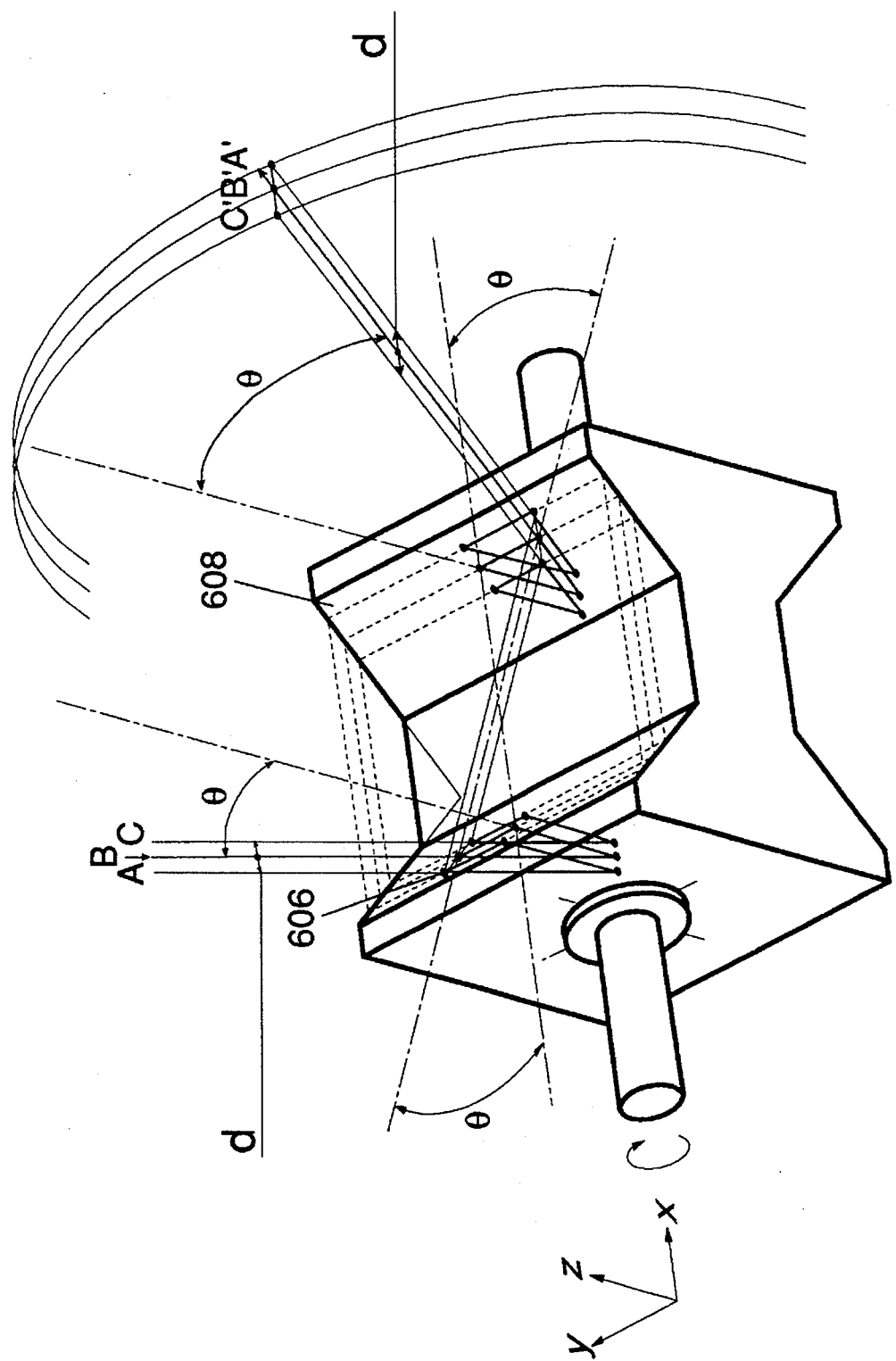

Reference is now made to FIGS. 32 and 33 which are optical diagrams of multibeam operation of the spinner of FIGS. 30–31 in the orientations of FIGS. 30 and 31 respectively. In other words, the orientation of FIG. 33 is shifted by an angle theta about axis 610 relative to the orientation of FIG. 32. Three input beams, referenced A, B and C, are shown impinging upon facet 606 of FIG. 32.

The corresponding output beams which serve to scan the generally cylindrical surface to be scanned are respectively referenced A', B' and C'. In contrast to the apparatus illustrated in FIGS. 23–25, it is seen that the relative positions of A', B' and C' in FIG. 32 are the same as in FIG. 33. Also, the distance d between corresponding points along paths A' and B' and B' and C' is the same as the distance d between input beams A, B and C.

It is noted that in order to make the scan path circular, the length L of the optical path (back focal length) should be constant for all scanning angles theta. At the initial scanning position in which theta =0, shown in FIG. 30, the length L of the scanning path is given in terms of a (defined in FIG. 30), by:

$$L=a+2a+a=4a$$

where a is the distance between the incidence point of input beam 614 on facet 606 and the rotation axis 610.

Generally, at a scanning position corresponding to a spinner rotation angle of theta, the length of the scanning path is:

$$L=a-(a/\cos(\theta)-a)+2a/\cos(\theta)+a-(a/\cos(\theta)-a)$$

If this expression is simplified, the expressions which are a function of angle theta cancel, and L is found to be a+2a+a=4a. In other words, the length of the scanning path does not depend on the spinner rotation angle and remains constant as the spinner rotates.

Generally, it is the case that for first and second reflecting surfaces defining a 90 degree angle therebetween and being arranged such that an imaginary line of intersection therebetween perpendicularly intersects the axis of rotation of the spinner, L remains constant.

In the above described embodiment, the plate wrap angle is 180 degrees and a spinner having a single facet array theoretically scans a 720 degree azimuth in a single rotation, giving a duty cycle of 180/720=25%. Similarly, the theoretical duty cycles for a spinner having two facet arrays and a spinner having four facet arrays are 50% and 100%, respectively. For three facets, a wrap angle of 240° gives a theoretical duty cycle of 100%. Due to the time required to make the transition between facet arrays, the cycles are in actual practice somewhat less than the above theoretical values.

Figure 37A:
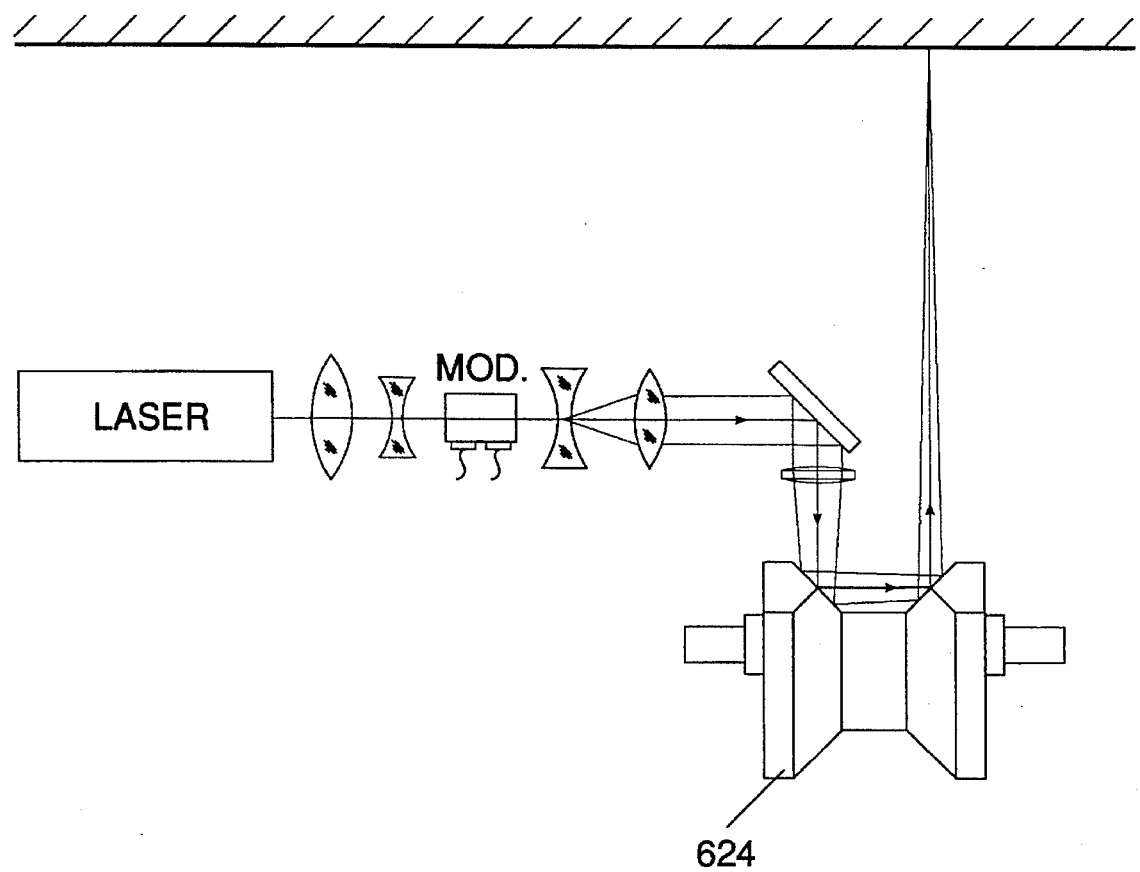
FIG. 37A is a conceptual illustration of an optical layout of high duty cycle scanning apparatus suitable for a 180 degree sheet wrap angle, constructed and operative in accordance with an alternative embodiment of the present invention and including a spinner having three facet arrays.
Figure 37B:
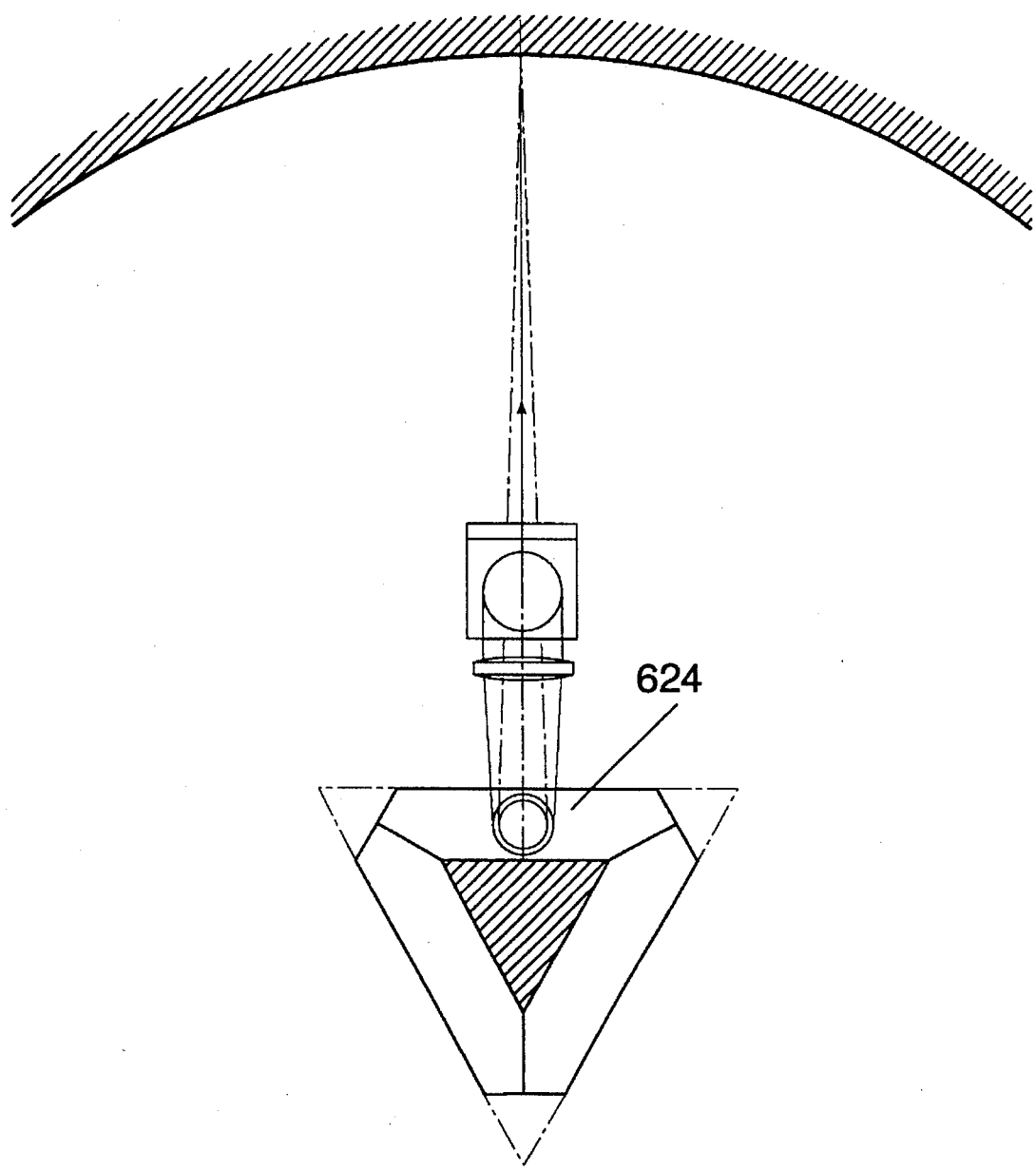
FIG. 37B is a cross sectional view of the spinner of FIG. 37A in a first scanning position.
Figure 37C:
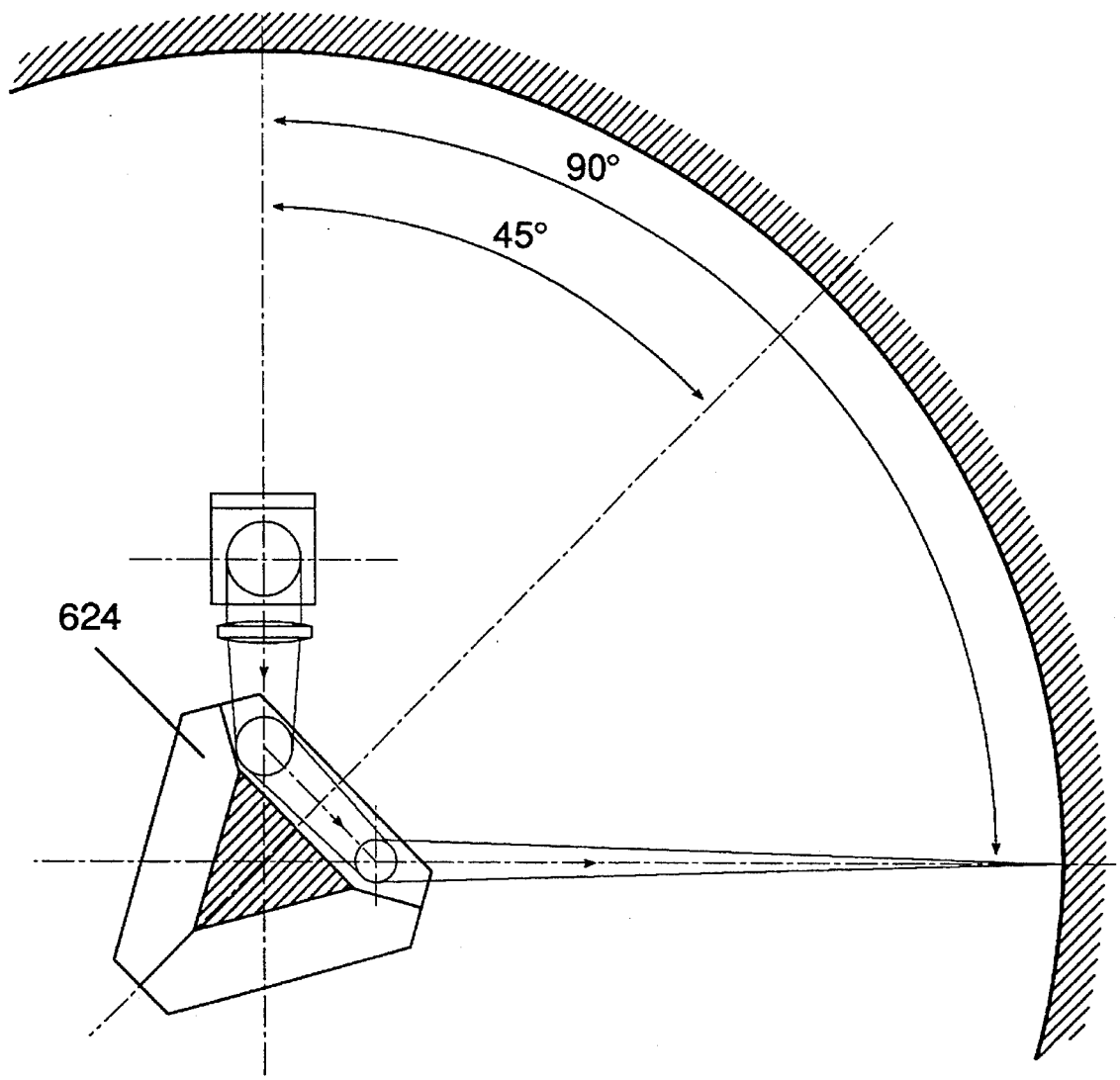
FIG. 37C is a cross sectional view of the spinner of FIG. 37A with the spinner in a second scanning position shifted 45 degrees from the first scanning position of FIG. 37B.
Figure 37D:
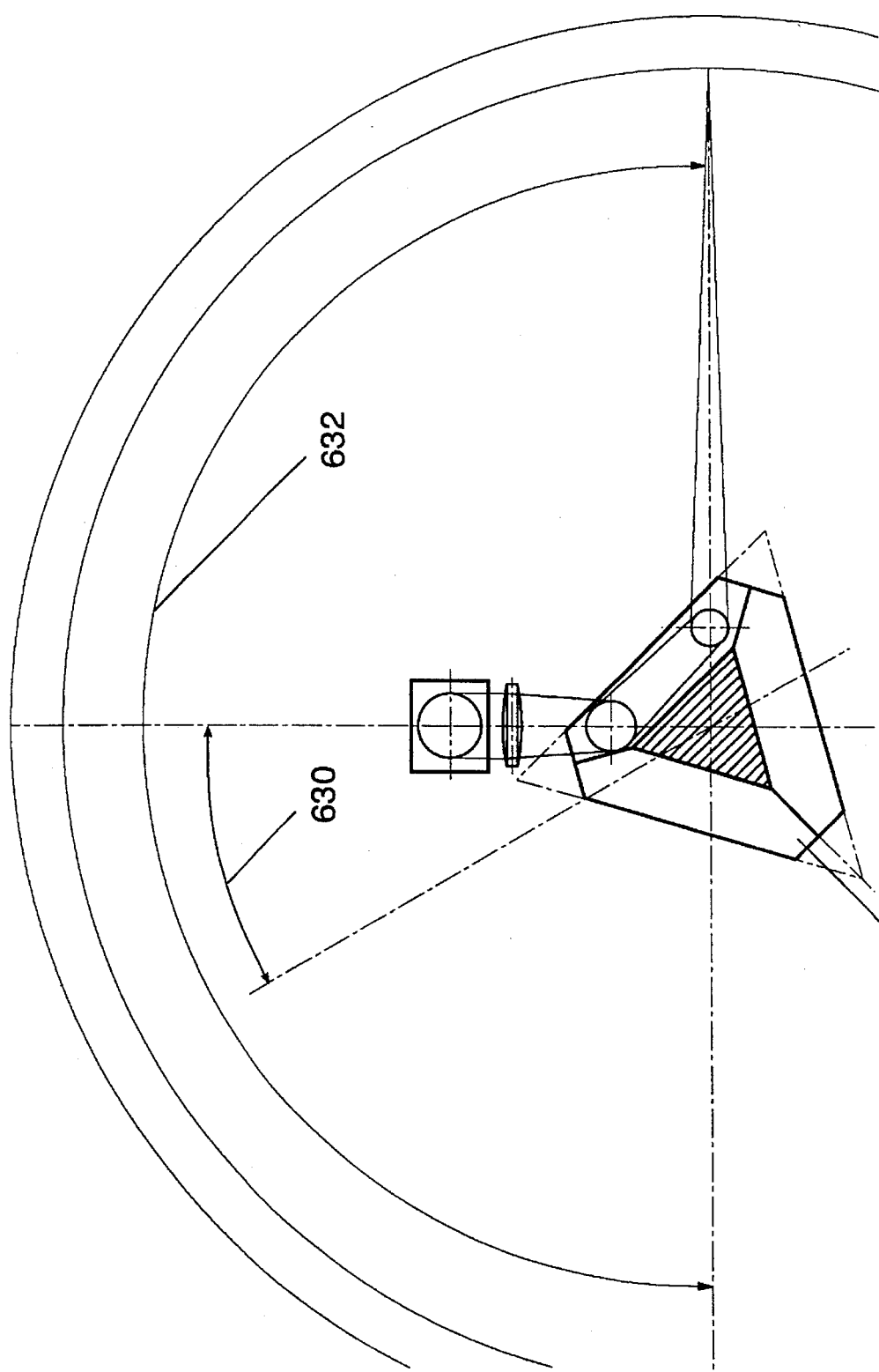
FIG. 37D is a cross sectional view of the spinner of FIG. 37A illustrating the roll-over area thereof.

For example, reference is made briefly to FIG. 37D which shows the roll-over area, indicated by an arrow 630, of a spinner having three facet arrays and a 180 degree scanning angle, indicated by an arrow 632. The term "roll-over area" is used here in the sense that it is used in the above-referenced document by Marshall, to refer to a portion of the azimuth defined by a rotating spinner having a plurality of facet arrays in which no writing or reading may take place due to transition from one facet array of the spinner to another.

Figure 38B:
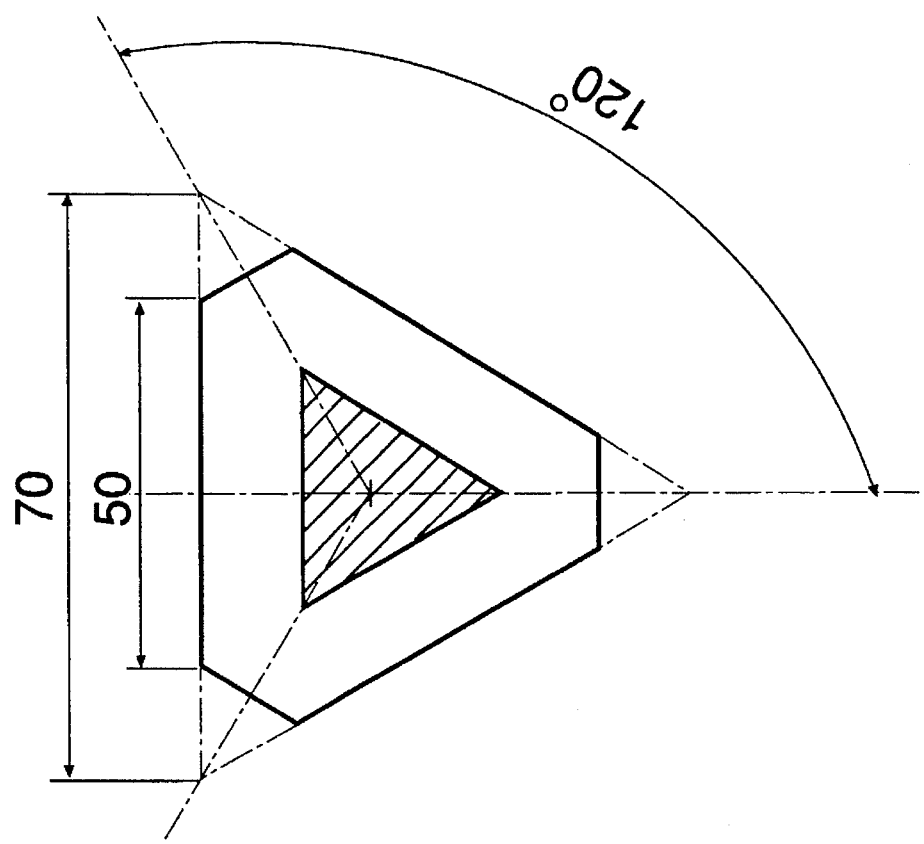
FIGS. 38A and 38B are schematic illustrations showing typical dimensions for the high duty cycle spinner of FIGS. 37A–37D suitable for scanning sheets whose curved dimension is 1050 mm using a sheet wrap angle of 180 degrees.
Figure 38A:
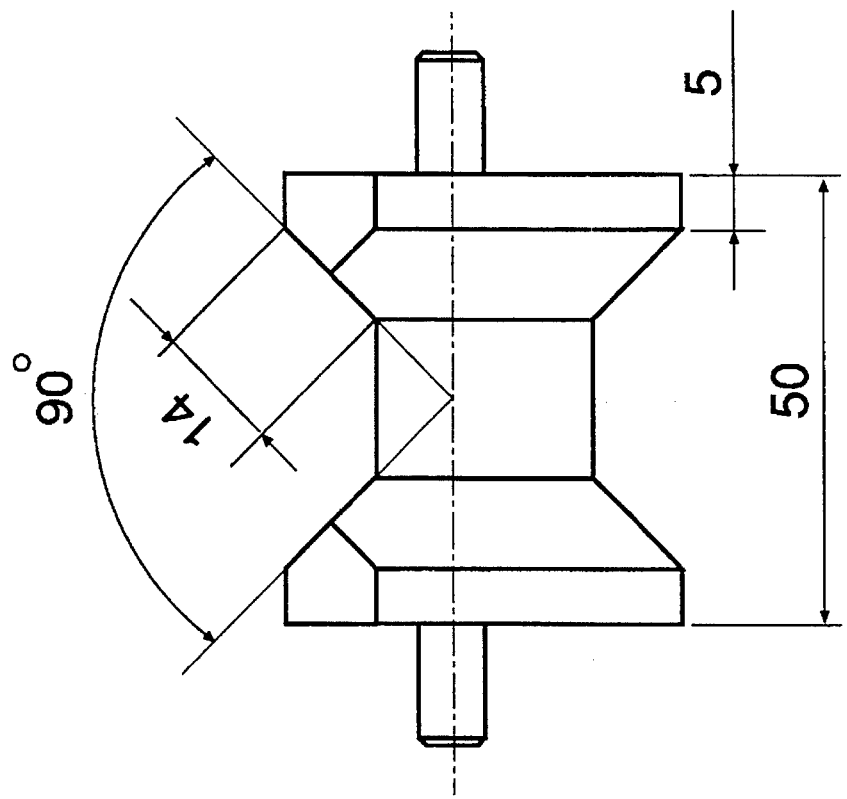

A spinner particularly useful for high duty-cycle scanning with a 180 degree wrap angle is believed to be a spinner having three facet arrays, such as the spinner of FIGS. 38A and 38B.

Figure 34A:
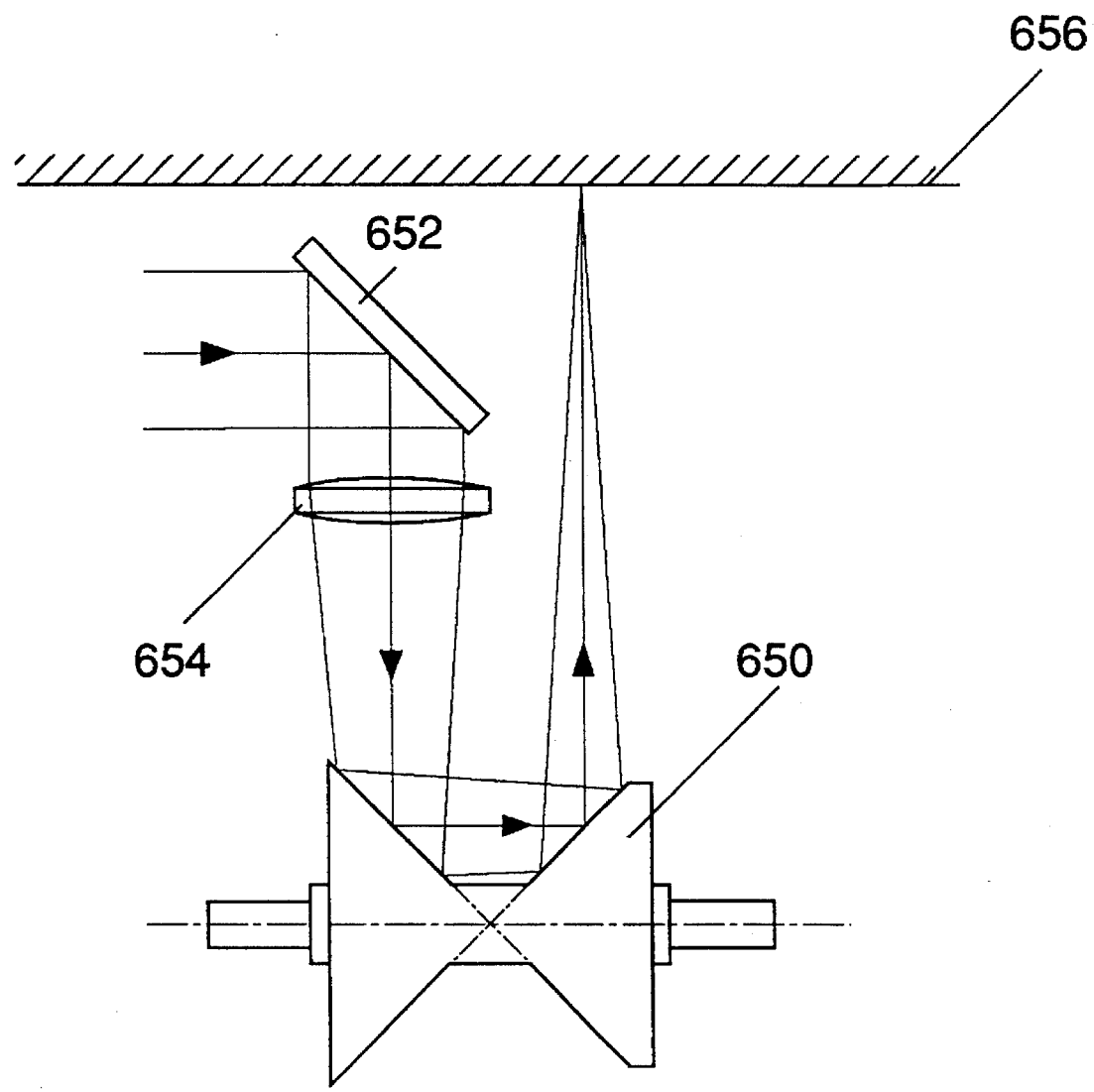
FIG. 34A is a conceptual illustration of high duty cycle scanning apparatus suitable for a 270 degree sheet wrap angle, constructed and operative in accordance with one alternative embodiment of the present invention and including the spinner of FIG. 30 and a folding mirror and focussing lens.
Figure 34B:
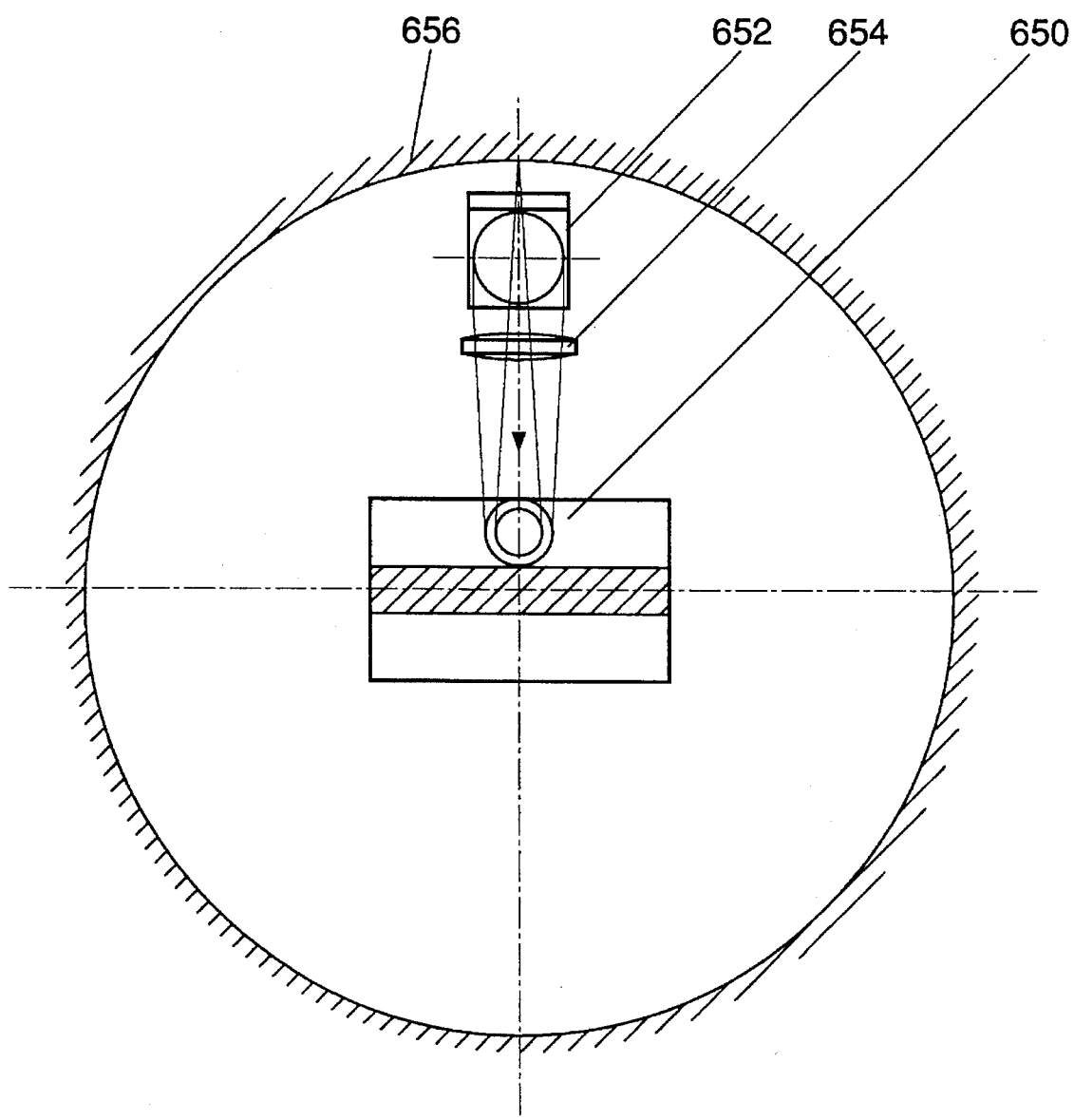
FIG. 34B is a cross sectional view of the apparatus of FIG. 34A with the spinner in a first scanning position.
Figure 34C:
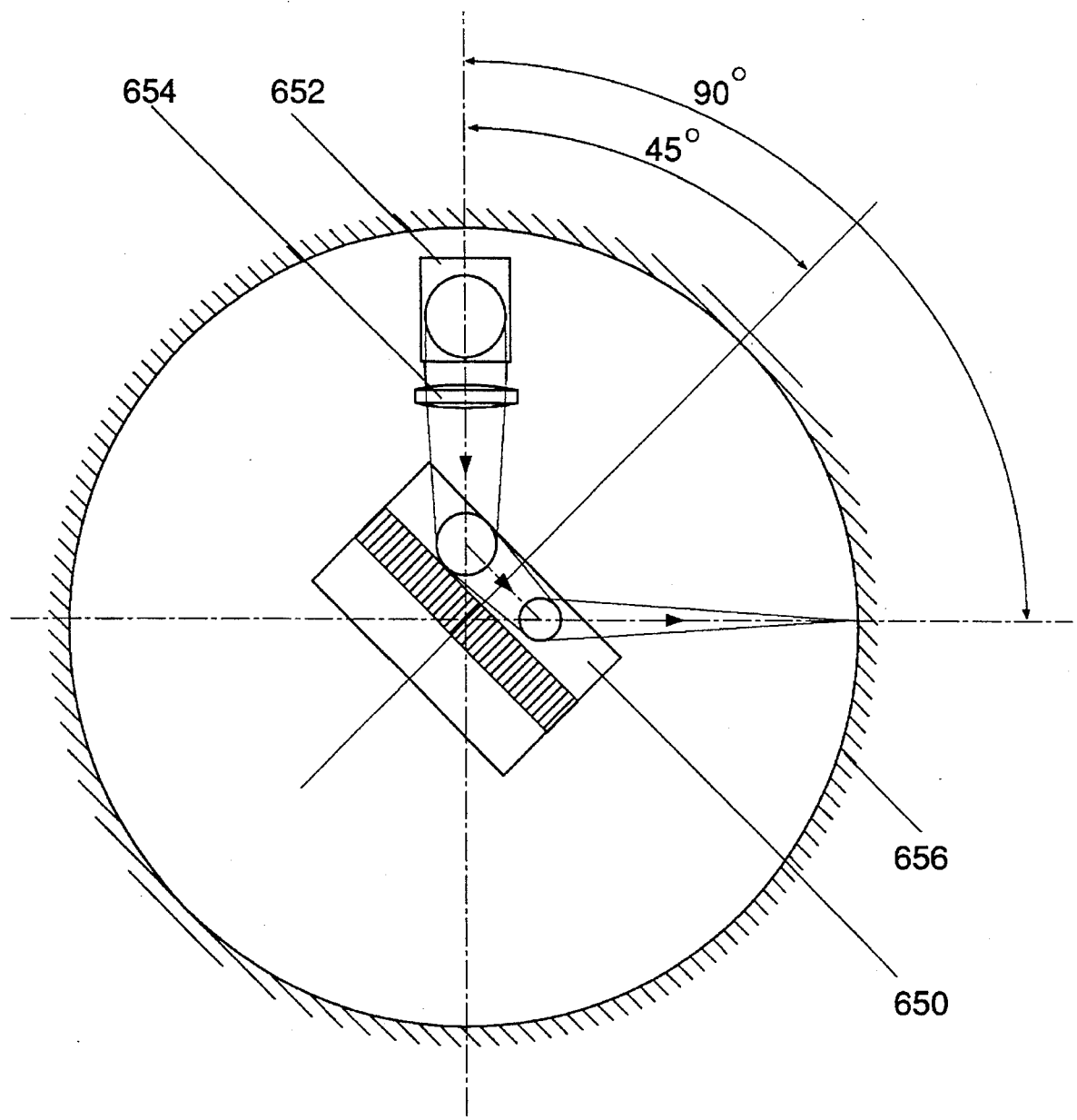
FIG. 34C is a cross sectional view of the apparatus of FIG. 34A with the spinner in a second scanning position shifted 45 degrees from the first scanning position of FIG. 34B.

Reference is now made to FIGS. 34A–34C which illustrate a high duty cycle internal drum scanner having a plate wrap angle of 270 degrees. The apparatus of FIGS. 34A–34C includes a spinner 650 which is generally identical to the spinner of FIG. 30, a folding mirror 652, a focussing lens 654 and a generally inward-facing cylindrical surface 656 to be scanned. The orientation of the apparatus in FIG. 34C is shifted 45 degrees relative to the orientation of the apparatus in FIG. 34B.

Figure 35B:
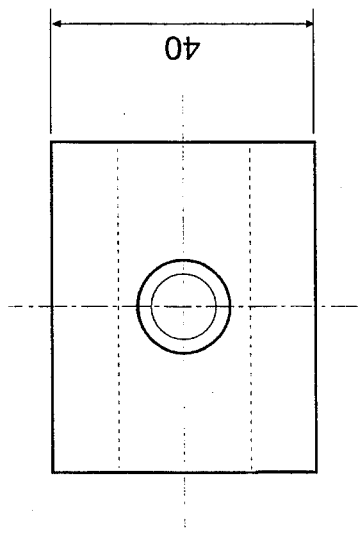
FIGS. 35A–35C are schematic illustrations showing typical dimensions for the high duty cycle spinner of FIG. 30 suitable for scanning sheets whose curved dimension is 1050 mm using a sheet wrap angle of 270 degrees.
Figure 35A:
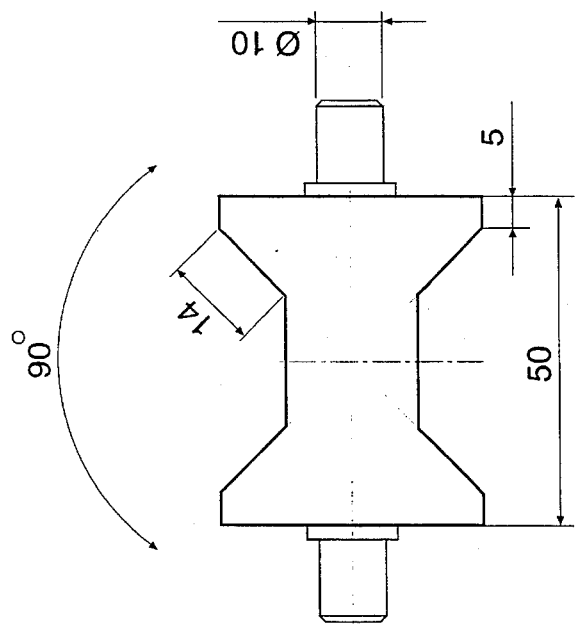
Figure 35C:
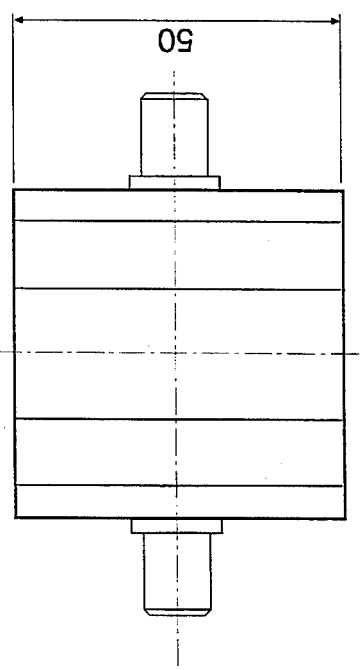

Sample dimensions of a spinner having two facet arrays such as the spinner of FIG. 30 are indicated in millimeters in FIGS. 35A–35C. The dimensions indicated allow a spinner constructed in accordance therewith to be employed in conjunction with scanning apparatus having a scanning length of 1050 mm and a plate wrap angle of 270 degrees. It is appreciated that the dimensions of FIGS. 35A–35C are merely exemplary of suitable dimensions for spinners having two facet arrays and are not intended to be limiting.

Figure 36A:
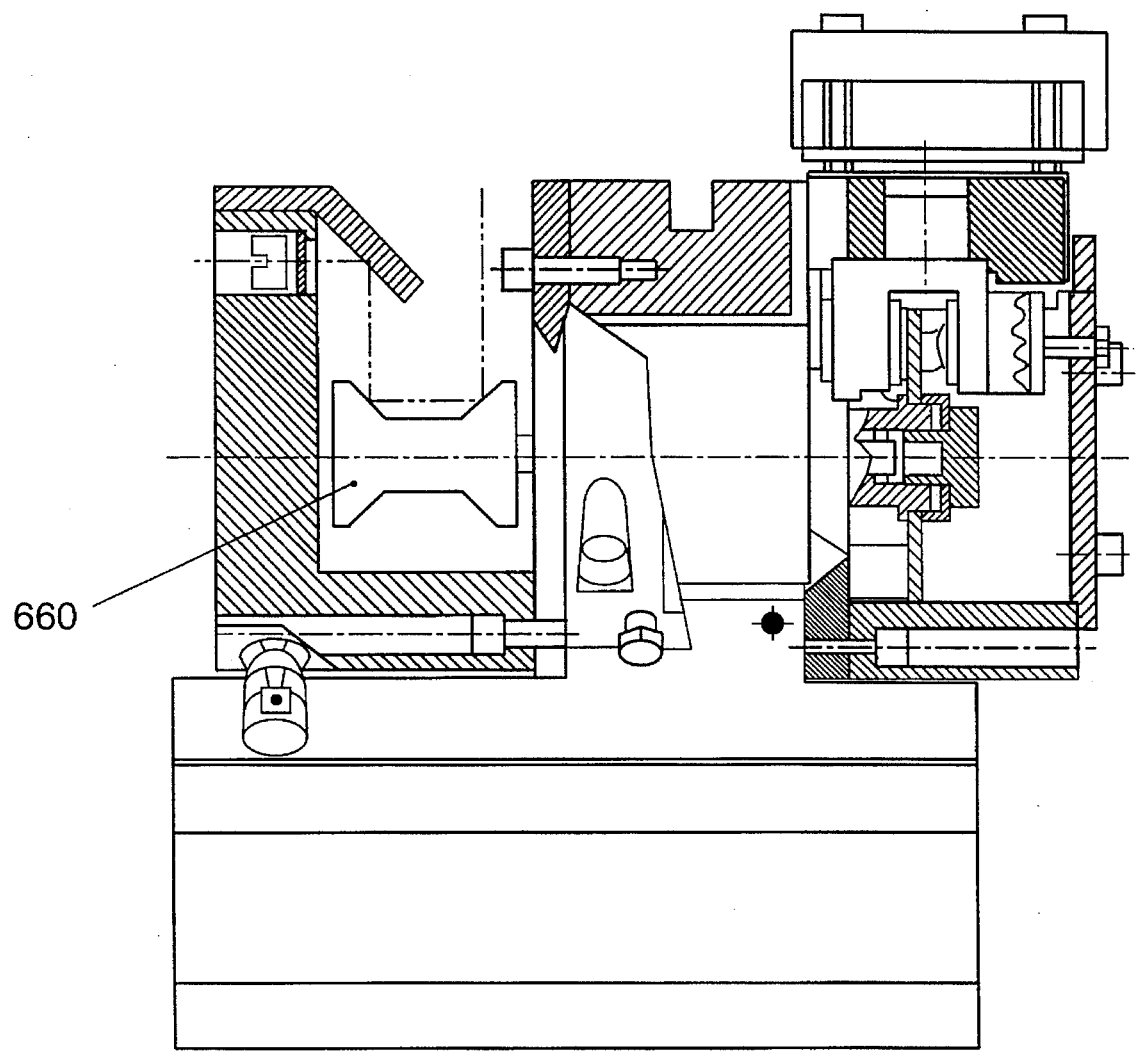
FIGS. 36A and 36B are respective side and top view schematic illustrations of scanning apparatus including the spinner of FIG. 30.
Figure 36B:
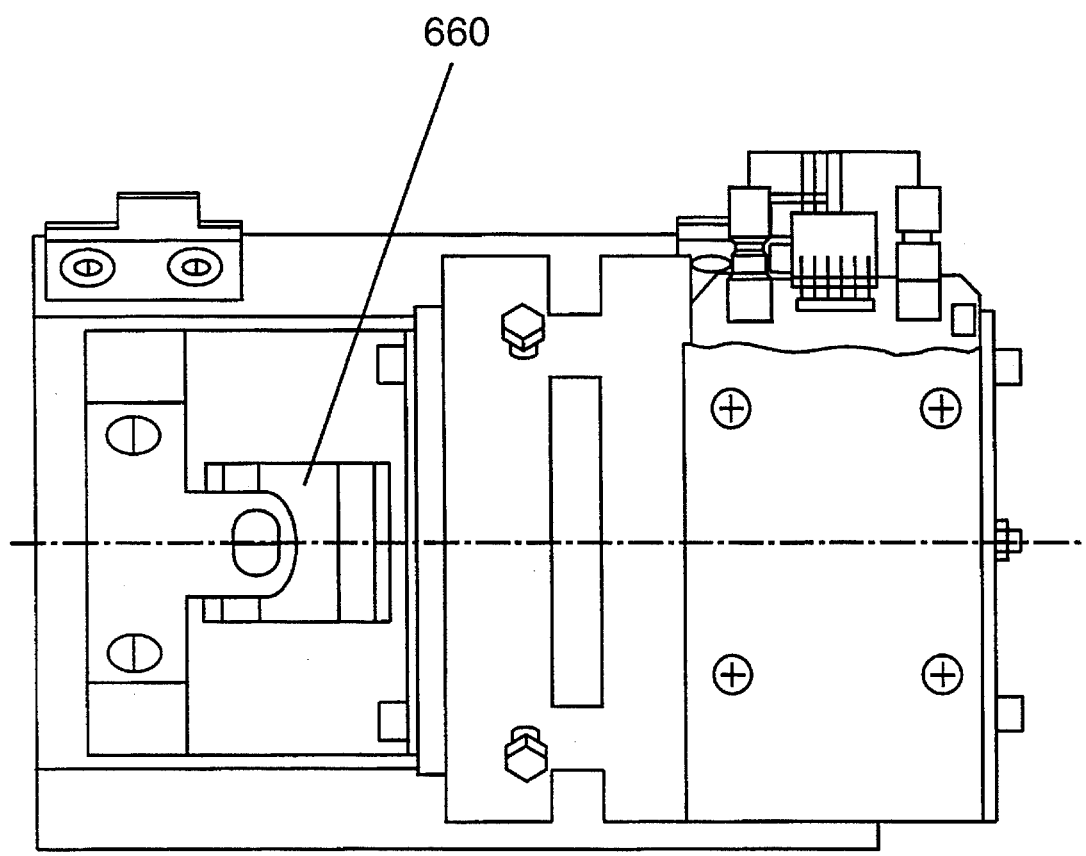

Reference is now made to FIGS. 36A and 36B which illustrate scanning apparatus including a spinner 660 which is similar to the spinner of FIG. 30 except that the spinner 660 has three facet arrays whereas the spinner of FIG. 30 has two facet arrays. The scanning apparatus may otherwise be similar to the Dolev imagesetter, commercially available from Scitex Corporation, Herzlia, Israel, and therefore, the components of the apparatus illustrated in FIGS. 36A and 36B are not described herein in detail.

Reference is now made to FIG. 37A which is a conceptual illustration of scanning apparatus constructed and operative in accordance with one alternative embodiment of the present invention, suitable for scanning a plate arranged in a generally cylindrical configuration and including spinner 624 similar to the spinner of FIG. 30. As shown, the optical components of the scanning apparatus other than spinner 624 may be standard components such as those described in the following document by Tokes, the disclosure of which is incorporated herein by reference: Tokes, S. B. "Applications of multibeam acousto-optical modulators. . . ", SPIE Proceedings #397, 1983, Geneva.

Parameters of the apparatus of FIG. 37A may be computed as explained in detail in the above-referenced documents by Emmel and Tokes.

Example: Sample parameters for the apparatus of FIG. 37A are as indicated in FIGS. 38A and 38B, assuming:
Plate wrap angle: 180 degrees
Scanned area (mm×min): 1050×1050
Resolution (points/inch): 1000
Pixel to pixel distance (micron): 25
Dot overlap: 50%
Scanning dot size (micron): 38

FIGS. 37B and 37C are side view schematic illustrations of two different orientations of the spinner of FIG. 37A. As shown, the configuration of the spinner is preferably truncated triangular rather than strictly triangular, in order to reduce the size of the spinner. A relatively small spinner is aerodynamically preferable and also allows a lens with a relatively short focal length to be employed.

The spinner of FIGS. 37B and 37C may be employed in conjunction with conventional internal drum scanners such as the Dolev, commercially available from Scitex Corporation, Herzlia, Israel. Alternatively, the spinners of FIGS. 37B and 37C may be employed in conjunction with the various plate loading, scanning and unloading devices shown and described herein.

As explained above, FIG. 370 shows the roll-over area, indicated by arrow 630, of the three facet array spinner of FIGS. 37B and 37C. The 180 degree scanning angle of the spinner is indicated by arrow 632.

Sample dimensions of the three facet array spinner of FIGS. 37B–37D are provided in FIGS. 38A and 38B. The dimensions given are suitable for a plate wrap angle of 180 degrees when scanning plates having a curved dimension of 1050 mm. It is appreciated that the dimensions shown in FIGS. 38A and 38B are merely exemplary of suitable dimensions for spinners having three facet arrays and are not intended to be limiting.

Figure 39:
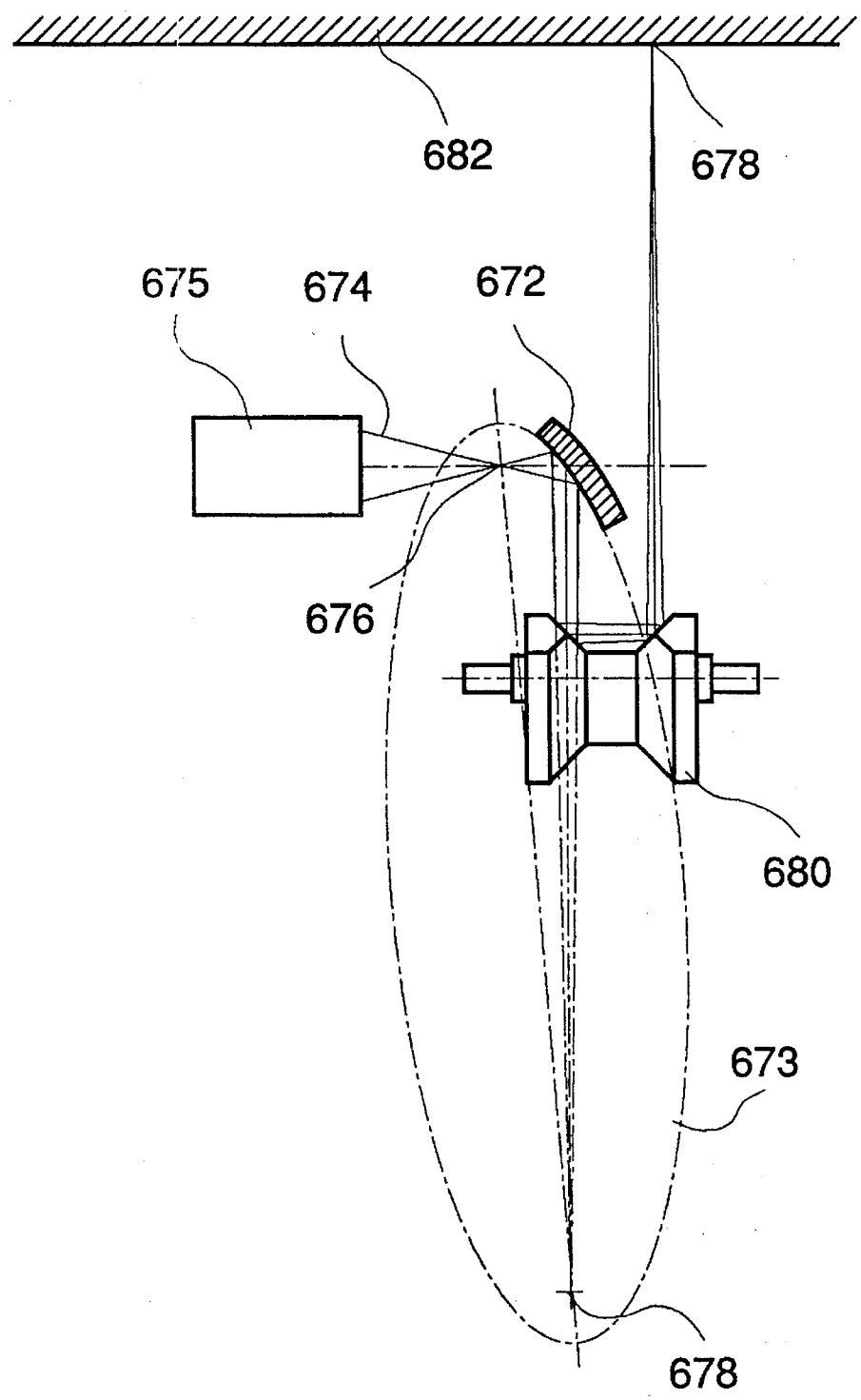
FIG. 39 is a conceptual illustration of high duty cycle achromatic scanning apparatus constructed and operative in accordance with another alternative embodiment of the present invention suitable for a sheet wrap angle of 180 degrees and including the spinner of FIGS. 38A and 38B and an elliptical mirror and focussing system located in front of the spinner.

FIG. 39 illustrates high duty cycle scanning apparatus suitable for a plate wrap angle of 180 degrees and including a spinner 680 similar to the spinner of FIGS. 38A and 38B. The apparatus of FIG. 39 also includes a mirror 672 having a configuration which is a portion of the surface of an ellipsoid 673, thereby providing an achromatic system. In the embodiment of FIG. 39, an incident light beam 674 provided by a conventional optical system 675, such as the optical system described in the above-referenced document by Tokes, is focused at a point 676. Point 676 is one of the two loci of the imaginary ellipsoid which defines the configuration of mirror 672. Due to the ellipsoidal configuration of the mirror, the light focussed at focal point 676 is reflected to the second focal point 678 of the ellipsoid. The mirrors of the spinner 680 deflect the beam onto the surface 682 to be scanned.

A particular advantage of the embodiment of FIG. 39 is that polychromatic light may be used because the light is not refracted. In contrast, in embodiments such as the embodiment of FIGS. 34A–34C, color specific focussing apparatus is employed for reimaging, and therefore, polychromatic light may not be used.

It is appreciated that the various features shown and described herein may be combined in any suitable manner to obtain plate scanning apparatus with or without automatic plate loading/unloading and that the particular combinations of features shown and described herein are not intended to be limiting.

The present specification discloses methods for providing registration pins or other selectably locatable means for supportingly engaging at least one curved edge of a flexible medium whose configuration defines at least a segment of a cylinder. It is appreciated that the applications of these methods are not limited to plate scanning applications, but rather include a wide variety of applications in which it is desired to mount a flexible medium in a configuration which defines a cylinder or a segment thereof.

It will be appreciated by persons skilled in the art that the present invention is not limited to what has been particularly shown and described hereinabove. Rather, the scope of the present invention is defined only by the claims that follow:

We claim:

1. Scanning apparatus for scanning a medium, comprising:

medium support means for supporting a medium in a generally curved orientation by contracting substantially less than an entire surface area of the medium; and scanning means for scanning said medium; and wherein the medium support means supports the medium in the generally curved orientation by engagement with the medium only in the vicinity of the edges thereof.

2. Scanning apparatus according to claim 1 and also comprising means for curving a medium having a generally planar orientation into said curved orientation.

3. Scanning apparatus according to claim 2 and also comprising means for restoring the medium from the curved orientation into a planar orientation.

4. Scanning apparatus according to claim 1 and also comprising means for automatically loading the medium onto the medium support means and unloading the medium therefrom.

5. A method for scanning a medium comprising the steps of:

providing a medium defining a writing area on at least most of the area thereof;

maintaining the medium in a generally cylindrical orientation, while contacting the medium only peripherally of the writing area thereof; and scanning at least a portion of the writing area.

6. A method according to claim 5 and also comprising the step of curving a medium having a generally planar orientation into said generally cylindrical orientation.

7. A method according to claim 6 and also comprising the step of restoring the medium from the cylindrical orientation into a planar orientation.

8. A method according to claim 5 and also comprising the step of automatically loading the medium onto medium support means and unloading the medium therefrom.

9. A method according to claim 6 and also comprising the step of automatically loading the medium onto medium support means and unloading the medium therefrom.

10. A method according to claim 7 and also comprising the step of automatically loading the medium onto medium support means and unloading the medium therefrom.

11. Apparatus according to claim 1 wherein said scanning means comprises means for writing on the medium.

12. Scanning apparatus for scanning a medium comprising:

medium support means for supporting a medium in a generally curved orientation by contracting substantially less than an entire surface area of the medium; and scanning means for scanning said medium;

means for changing the configuration of the medium support means thereby to accommodate media having a variety of dimensions; and wherein the medium support means supports the medium in the generally curved orientation by engagement with the medium only in the vicinity of the edges thereof.

13. Apparatus according to claim 12 wherein said scanning means comprises means for writing on the medium.

14. Spinning apparatus for scanning a medium arranged in a configuration defining at least a segment of a cylinder, such that a writing surface of the medium defines an inner surface of the cylinder, the spinning apparatus comprising:

scanning means for simultaneously scanning a plurality of locations on the writing surface of the medium.

15. Apparatus according to claim 14 and wherein said scanning means provides a plurality of beams impinging upon the medium and defining a mutual orientation therebetween and the scanning means is characterized in that the mutual orientation of the beams is maintained during rotation of the scanning means.

16. Apparatus according to claim 15 and wherein the spacing between the plurality of beams is maintained during rotation of the scanning means.

17. Apparatus according to claims 14 and wherein said scanning means comprises at least one mirrored planar surface arranged such that the axis of the cylinder lies in the plane of the mirrored surface.

18. Apparatus according to claim 17 wherein said at least one mirrored planar surfaces comprise a thin double-sided mirror.

19. Apparatus according to claim 18 wherein said double-sided mirror is supported by two transparent half-spheres arranged on both sides thereof so as to form, together, a focussing sphere, and so as to rotate about the scanning axis.

20. Apparatus according to claim 18 and also comprising:

two transparent half-cylinders for supporting said double-sided mirror, the half-cylinders being arranged on both sides thereof so as to form, together, a cylinder having a given refractive index;

a transparent sphere surrounding the cylinder and having a refractive index generally matching the refractive index of the cylinder; and a fluid disposed between said cylinder and said sphere and having a refractive index generally matching the refractive indices of the cylinder and of the sphere.

21. Scanning apparatus for scanning a medium comprising:

medium support means for supporting a medium in a generally curved orientation by contracting substantially less than an entire surface area of the medium; and scanning means for scanning said medium.

and wherein said scanning means comprises:

a plurality of facet arrays, each individual facet array comprising two facets defining a 90 degree angle therebetween and being arranged such that an imaginary line of intersection between said two facets perpendicularly intersects the axis rotation of the scanning means.

22. Apparatus according to claim 14 and wherein said scanning means comprises:

a plurality of facet arrays, each individual facet array comprising two facets defining a 90 degree angle therebetween and being arranged such that an imaginary line of intersection between said two facets perpendicularly intersects the axis of rotation of the scanning means.

23. Apparatus according to claim 14 wherein the duty cycle of the scanning means exceeds 50%.

24. Apparatus according to claim 21 wherein the duty cycle of the scanning means exceeds 50%.

25. Apparatus according to claim 23 wherein the duty cycle of the scanning means is nearly 100%.

26. Apparatus according to claim 24 wherein the duty cycle of the scanning means is nearly 100%.

27. Scanning apparatus comprising:

means for supporting a medium in a generally curved orientation, the curved orientation defining an axis; and a spinner body for scanning the medium, the spinner body defining an axis of rotation and including at least one facet array, each facet array comprising two facets defining a 90 degree angle therebetween and being arranged such that an imaginary line of intersection between said two facets perpendicularly intersects the axis of rotation.

28. Apparatus according to claim 27 wherein the means for supporting comprises means for supporting the medium in the generally curved orientation by contacting substantially less than the entire surface area of the medium.

29. Scanning apparatus according to claim 12 and also comprising means for curving a medium having a generally planar orientation into said curved orientation.

30. Scanning apparatus according to claim 29 and also comprising means for restoring the medium from the curved orientation into a planar orientation.

31. Scanning apparatus according to claim 12 and also comprising means for automatically loading the medium onto the medium support means and unloading the medium therefrom.

32. Scanning apparatus according to claim 21 and also comprising means for curving a medium having a generally planar orientation into said curved orientation.

33. Scanning apparatus according to claim 32 and also comprising means for restoring the medium from the curved orientation into a planar orientation.

34. Scanning apparatus according to claim 21 and also comprising means for automatically loading the medium onto the medium support means and unloading the medium therefrom.

* * * * *